(12) United States Patent
Khanuja et al.

(10) Patent No.: US 11,907,167 B2
(45) Date of Patent: Feb. 20, 2024

(54) MULTI-CLUSTER DATABASE MANAGEMENT SERVICES

(71) Applicant: Nutanix, Inc., San Jose, CA (US)

(72) Inventors: Kamaldeep Khanuja, Sunnyvale, CA (US); Yashesh Mankad, Sunnyvale, CA (US); Sagar Sontakke, Bangalore (IN); Bakul Banthia, San Ramon, CA (US); Balasubrahmanyam Kuchibhotla, San Ramon, CA (US); Anil Madan, San Ramon, CA (US); Manish Pratap Singh, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/337,197

(22) Filed: Jun. 2, 2021

(65) Prior Publication Data
US 2022/0066993 A1    Mar. 3, 2022

Related U.S. Application Data

(60) Provisional application No. 63/072,638, filed on Aug. 31, 2020.

(30) Foreign Application Priority Data

Aug. 28, 2020    (IN) .............................. 202041037134

(51) Int. Cl.
*G06F 16/17*    (2019.01)
*G06F 16/18*    (2019.01)
(Continued)

(52) U.S. Cl.
CPC ........ *G06F 16/1734* (2019.01); *G06F 16/128* (2019.01); *G06F 16/184* (2019.01); *G06F 16/1865* (2019.01)

(58) Field of Classification Search
CPC ............. G06F 16/1734; G06F 16/1865; G06F 16/184; G06F 16/128; G06F 16/188;
(Continued)

(56) References Cited

U.S. PATENT DOCUMENTS

| | | |
|---|---|---|
| 5,594,859 A | 1/1997 | Palmer et al. |
| 6,064,975 A | 5/2000 | Moon et al. |

(Continued)

FOREIGN PATENT DOCUMENTS

| | | |
|---|---|---|
| CN | 104408071 | 3/2015 |
| CN | 105446828 | 3/2016 |

(Continued)

OTHER PUBLICATIONS

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

(Continued)

*Primary Examiner* — Vaishali Shah
*Assistant Examiner* — Berhanu Mitiku
(74) *Attorney, Agent, or Firm* — Foley & Lardner LLP

(57) ABSTRACT

A multi-cluster configuration of a database management system in a virtual computing system includes a server that defines a first policy for a source database on a first cluster of a plurality of clusters. Each of the plurality of clusters is registered with the server and the first policy defines capture of snapshots and/or transactional logs from the source database on the first cluster. The server defines a second policy for the source database to replicate at least some of the snapshots and/or transactional logs from the first cluster to a second cluster of the plurality of clusters, captures a first snapshot and/or a first transactional log from the source database in accordance with the first policy, and replicates (Continued)

the first snapshot and/or the first transactional log to the second cluster in accordance with the second policy.

33 Claims, 24 Drawing Sheets

(51) Int. Cl.
  *G06F 16/182* (2019.01)
  *G06F 16/11* (2019.01)
(58) Field of Classification Search
  CPC .... G06F 16/383; G06F 16/1748; G06F 16/17; G06F 16/13
  See application file for complete search history.

(56) References Cited

U.S. PATENT DOCUMENTS

| | | | |
|---|---|---|---|
| 6,243,715 | B1 | 6/2001 | Bogantz et al. |
| D508,248 | S | 8/2005 | Ording |
| D521,521 | S | 5/2006 | Jewitt et al. |
| 7,225,189 | B1 | 5/2007 | McCormack et al. |
| 7,389,300 | B1 | 6/2008 | Shah et al. |
| 7,725,671 | B2 | 5/2010 | Prahlad et al. |
| D625,315 | S | 10/2010 | Jewitt et al. |
| 7,814,057 | B2 | 10/2010 | Kathuria et al. |
| 7,840,533 | B2 | 11/2010 | Prahlad et al. |
| 7,953,764 | B2 | 5/2011 | Baffier et al. |
| 8,117,165 | B1 | 2/2012 | Winckelmann et al. |
| D656,948 | S | 4/2012 | Kundsen et al. |
| 8,150,808 | B2 | 4/2012 | Zha et al. |
| 8,250,033 | B1* | 8/2012 | De Souter ........... G06F 16/1734 707/637 |
| 8,291,409 | B2 | 10/2012 | Winner et al. |
| 8,364,648 | B1 | 1/2013 | Sim-Tang |
| 8,429,630 | B2 | 4/2013 | Nickolov et al. |
| 8,447,728 | B2 | 5/2013 | Prahlad et al. |
| 8,448,170 | B2 | 5/2013 | Wipfel et al. |
| D684,160 | S | 6/2013 | Truelove et al. |
| D684,161 | S | 6/2013 | Truelove et al. |
| 8,468,174 | B1 | 6/2013 | Yueh et al. |
| 8,549,518 | B1 | 10/2013 | Aron et al. |
| 8,601,473 | B1 | 12/2013 | Aron et al. |
| 8,612,396 | B1 | 12/2013 | McAlister et al. |
| 8,635,421 | B2 | 1/2014 | Gupta et al. |
| 8,677,085 | B2 | 3/2014 | Vaghani et al. |
| 8,762,335 | B2 | 6/2014 | Prahlad et al. |
| 8,769,537 | B1 | 7/2014 | Ruggiero et al. |
| 8,832,028 | B2 | 9/2014 | Susairaj et al. |
| 8,849,850 | B2 | 9/2014 | Baffier et al. |
| 8,850,130 | B1 | 9/2014 | Aron et al. |
| 8,863,124 | B1 | 10/2014 | Aron |
| 8,874,749 | B1 | 10/2014 | Vittal et al. |
| 8,914,567 | B2 | 12/2014 | Miroshnichenko et al. |
| 8,924,974 | B1 | 12/2014 | Ruggiero et al. |
| 8,972,347 | B1 | 3/2015 | Sim-Tang |
| 9,009,106 | B1 | 4/2015 | Aron et al. |
| 9,069,708 | B2 | 6/2015 | Gill et al. |
| D733,745 | S | 7/2015 | Huang |
| 9,116,737 | B2 | 8/2015 | Aswathanarayana et al. |
| 9,213,727 | B1* | 12/2015 | Esposito ............... G06F 16/217 |
| 9,244,717 | B2 | 1/2016 | Pissay et al. |
| D749,117 | S | 2/2016 | Huang |
| 9,256,383 | B2 | 2/2016 | De Spiegeleer et al. |
| D753,135 | S | 4/2016 | Vazquez |
| D753,140 | S | 4/2016 | Kouvas et al. |
| 9,336,060 | B2 | 5/2016 | Nori et al. |
| 9,336,132 | B1 | 5/2016 | Aron et al. |
| 9,372,758 | B2 | 6/2016 | Ashutosh et al. |
| D761,288 | S | 7/2016 | Cianflone et al. |
| 9,384,254 | B2 | 7/2016 | Tekade et al. |
| 9,389,962 | B1 | 7/2016 | Yueh et al. |
| D763,890 | S | 8/2016 | Pan |
| 9,413,810 | B2 | 8/2016 | Rezvani et al. |
| 9,436,556 | B2 | 9/2016 | Siden et al. |
| D771,102 | S | 11/2016 | Protzman et al. |
| 9,495,435 | B2 | 11/2016 | Zhang et al. |
| 9,507,579 | B2 | 11/2016 | Gambardella et al. |
| 9,529,551 | B2 | 12/2016 | Kesavan et al. |
| D777,747 | S | 1/2017 | Derby et al. |
| D778,296 | S | 2/2017 | Belkin et al. |
| D779,514 | S | 2/2017 | Baris et al. |
| D781,887 | S | 3/2017 | Dziuba et al. |
| 9,600,193 | B2 | 3/2017 | Ahrens et al. |
| 9,639,429 | B2 | 5/2017 | Stewart et al. |
| 9,652,265 | B1 | 5/2017 | Narayanasamy et al. |
| 9,665,437 | B2 | 5/2017 | Bhargava et al. |
| D794,666 | S | 8/2017 | Havaldar et al. |
| D794,667 | S | 8/2017 | Havaldar et al. |
| 9,733,958 | B2 | 8/2017 | Cui et al. |
| 9,740,472 | B1 | 8/2017 | Sohi et al. |
| 9,740,723 | B2 | 8/2017 | Prahlad et al. |
| 9,747,287 | B1 | 8/2017 | Bhardwaj et al. |
| D797,116 | S | 9/2017 | Chapman et al. |
| 9,753,713 | B2 | 9/2017 | Mani et al. |
| 9,760,396 | B2 | 9/2017 | Apte et al. |
| 9,772,866 | B1 | 9/2017 | Aron et al. |
| 9,778,992 | B1 | 10/2017 | Yueh et al. |
| D802,608 | S | 11/2017 | Hicks et al. |
| D803,231 | S | 11/2017 | Guinness et al. |
| D807,902 | S | 1/2018 | Cong et al. |
| 9,858,155 | B2 | 1/2018 | Ashutosh et al. |
| 9,881,168 | B2 | 1/2018 | Chari et al. |
| D809,530 | S | 2/2018 | Matheson et al. |
| D815,652 | S | 4/2018 | Protzman et al. |
| D817,976 | S | 5/2018 | Shilwant et al. |
| 9,960,963 | B2 | 5/2018 | Selvaraj et al. |
| 10,013,313 | B2 | 7/2018 | Zhang et al. |
| 10,033,833 | B2 | 7/2018 | Fu et al. |
| 10,055,300 | B2 | 8/2018 | Zhang et al. |
| 10,057,279 | B1 | 8/2018 | Balduzzi et al. |
| 10,108,685 | B2 | 10/2018 | Amdur et al. |
| 10,146,848 | B2 | 12/2018 | Narayanan et al. |
| D838,288 | S | 1/2019 | Sunshine et al. |
| 10,185,627 | B2 | 1/2019 | Wong et al. |
| D839,913 | S | 2/2019 | Chen et al. |
| 10,210,048 | B2 | 2/2019 | Sancheti |
| 10,212,195 | B2 | 2/2019 | Maskalik et al. |
| D843,388 | S | 3/2019 | Protzman et al. |
| 10,248,657 | B2 | 4/2019 | Prahlad et al. |
| 10,282,201 | B2 | 5/2019 | Tekade et al. |
| 10,339,110 | B2 | 7/2019 | Marinov et al. |
| 10,346,431 | B1 | 7/2019 | Broda et al. |
| 10,372,329 | B1 | 8/2019 | Ahrens et al. |
| 10,379,963 | B2 | 8/2019 | Bhargava et al. |
| D862,512 | S | 10/2019 | Schubart |
| 10,445,298 | B2 | 10/2019 | Ramu et al. |
| 10,447,806 | B1 | 10/2019 | Sahay et al. |
| 10,476,955 | B2 | 11/2019 | Mutalik et al. |
| D870,762 | S | 12/2019 | Mendoza Corominas et al. |
| 10,503,612 | B1 | 12/2019 | Wang et al. |
| 10,509,798 | B2 | 12/2019 | Chow et al. |
| D875,108 | S | 2/2020 | Chitalia et al. |
| D877,753 | S | 3/2020 | Chitalia et al. |
| 10,599,423 | B2 | 3/2020 | Coleman et al. |
| 10,606,578 | B2 | 3/2020 | Kruglikov et al. |
| 10,613,938 | B2 | 4/2020 | Blumenau et al. |
| 10,637,914 | B2 | 4/2020 | Basavaiah et al. |
| 10,700,991 | B2 | 6/2020 | Khinvasara et al. |
| 10,719,407 | B1 | 7/2020 | Chockalingam et al. |
| 10,725,866 | B1 | 7/2020 | Palaiah et al. |
| 10,728,255 | B2 | 7/2020 | Jindal et al. |
| 10,757,036 | B2 | 8/2020 | Tung et al. |
| 10,776,329 | B2 | 9/2020 | Ramohalli Gopala Rao et al. |
| 10,778,750 | B2 | 9/2020 | Ringdahl |
| 10,785,029 | B2 | 9/2020 | Gupta et al. |
| 10,812,582 | B2 | 10/2020 | Spillane et al. |
| 10,817,157 | B2 | 10/2020 | Kuchibhotla et al. |
| 10,824,956 | B1 | 11/2020 | Natanzon et al. |
| D911,356 | S | 2/2021 | Varghese et al. |
| 10,938,924 | B1 | 3/2021 | Jensen et al. |
| 10,951,496 | B2 | 3/2021 | Baker et al. |
| 10,959,098 | B2 | 3/2021 | Cidon et al. |
| 10,999,165 | B2 | 5/2021 | Cidon et al. |

(56) References Cited

U.S. PATENT DOCUMENTS

| | | |
|---|---|---|
| 11,010,336 B2 | 5/2021 | Kuchibhotla et al. |
| 11,010,487 B2 | 5/2021 | Noe et al. |
| D926,200 S | 7/2021 | Murphy et al. |
| D927,507 S | 8/2021 | Norman |
| 11,126,426 B2 | 9/2021 | Zhu et al. |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1 | 4/2022 | Moghe |
| 11,386,058 B2 | 7/2022 | Hung et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |
| 2005/0149757 A1 | 7/2005 | Corbett et al. |
| 2006/0143412 A1* | 6/2006 | Armangau .......... G06F 11/1451 711/162 |
| 2006/0161444 A1 | 7/2006 | Lubrecht et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0126945 A1 | 5/2008 | Munkvold et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0228669 A1 | 9/2009 | Slesarev et al. |
| 2010/0023564 A1 | 1/2010 | Yerneni et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0252420 A1 | 10/2011 | Tung et al. |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2013/0091285 A1 | 4/2013 | Devarakonda et al. |
| 2013/0117441 A1 | 5/2013 | Kuchibhotla et al. |
| 2013/0263119 A1 | 10/2013 | Pissay et al. |
| 2013/0290180 A1 | 10/2013 | Baffier et al. |
| 2014/0006350 A1 | 1/2014 | Fukui et al. |
| 2014/0059226 A1 | 2/2014 | Messerli et al. |
| 2014/0189685 A1 | 7/2014 | Kripalani |
| 2014/0201171 A1 | 7/2014 | Vijayan et al. |
| 2014/0229698 A1 | 8/2014 | Sivasubramanian et al. |
| 2014/0282256 A1 | 9/2014 | Fish et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0227435 A1 | 8/2015 | Ashutosh et al. |
| 2015/0227602 A1 | 8/2015 | Ramu et al. |
| 2015/0301814 A1 | 10/2015 | Chen et al. |
| 2015/0331923 A1 | 11/2015 | Kim |
| 2015/0347987 A1 | 12/2015 | Ali |
| 2015/0358417 A1* | 12/2015 | Patil .................... G06F 9/45533 709/219 |
| 2016/0041997 A1 | 2/2016 | Gokhale et al. |
| 2016/0048408 A1 | 2/2016 | Madhu et al. |
| 2016/0077923 A1 | 3/2016 | Zhang et al. |
| 2016/0078104 A1 | 3/2016 | Clifford et al. |
| 2016/0092535 A1* | 3/2016 | Kuchibhotla ....... G06F 3/04842 707/634 |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0197835 A1 | 7/2016 | Luft |
| 2016/0224259 A1* | 8/2016 | Ahrens .................. G06F 3/067 |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0380809 A1 | 12/2016 | Hou et al. |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0235758 A1* | 8/2017 | Gopalapura Venkatesh ................. H04L 41/06 707/625 |
| 2017/0235950 A1 | 8/2017 | Gopalapura Venkatesh et al. |
| 2017/0264684 A1 | 9/2017 | Spillane et al. |
| 2017/0286517 A1 | 10/2017 | Horowitz et al. |
| 2017/0286518 A1 | 10/2017 | Horowitz et al. |
| 2017/0351584 A1 | 12/2017 | Griffith et al. |
| 2017/0351716 A1 | 12/2017 | Higginson et al. |
| 2017/0374136 A1 | 12/2017 | Ringdahl |
| 2018/0025007 A1 | 1/2018 | Dai |
| 2018/0121494 A1 | 5/2018 | Antonopoulos et al. |
| 2018/0157561 A1 | 6/2018 | Venkatesh et al. |
| 2018/0181469 A1 | 6/2018 | Yueh et al. |
| 2018/0253676 A1 | 9/2018 | Sheth et al. |
| 2018/0275881 A1 | 9/2018 | Ashraf et al. |
| 2018/0285201 A1 | 10/2018 | Bangalore et al. |
| 2018/0307728 A1 | 10/2018 | Crupi et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0230156 A1 | 7/2019 | Mclarty et al. |
| 2019/0235904 A1 | 8/2019 | Epping et al. |
| 2019/0266268 A1 | 8/2019 | Polinati |
| 2019/0310926 A1 | 10/2019 | Hashimoto et al. |
| 2019/0324865 A1 | 10/2019 | Weissman et al. |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0362004 A1 | 11/2019 | Oks et al. |
| 2019/0384496 A1 | 12/2019 | Abdul Rasheed et al. |
| 2019/0391880 A1 | 12/2019 | Wang et al. |
| 2020/0034178 A1 | 1/2020 | Gupta et al. |
| 2020/0034245 A1 | 1/2020 | Kohler |
| 2020/0050522 A1 | 2/2020 | Coleman et al. |
| 2020/0059411 A1* | 2/2020 | Olmsted-Thompson .................... H04L 41/0893 |
| 2020/0081704 A1 | 3/2020 | Bafna et al. |
| 2020/0097177 A1 | 3/2020 | Ashokkumar et al. |
| 2020/0099692 A1 | 3/2020 | Jindal et al. |
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0193388 A1 | 6/2020 | Tran-Kiem et al. |
| 2020/0201526 A1* | 6/2020 | Kuchibhotla ......... G06F 3/0481 |
| 2020/0210378 A1 | 7/2020 | Kuchibhotla et al. |

(56) References Cited

U.S. PATENT DOCUMENTS

| | | | |
|---|---|---|---|
| 2020/0210379 A1 | 7/2020 | Kuchibhotla et al. | |
| 2020/0250046 A1 | 8/2020 | Wong et al. | |
| 2020/0285608 A1 | 9/2020 | Chakankar et al. | |
| 2020/0285652 A1 | 9/2020 | Wang et al. | |
| 2020/0349018 A1 | 11/2020 | Meadowcroft et al. | |
| 2020/0379793 A1 | 12/2020 | Parihar et al. | |
| 2021/0064512 A1* | 3/2021 | Sirov | G06F 11/3636 |
| 2021/0117293 A1 | 4/2021 | Luo et al. | |
| 2021/0133031 A1 | 5/2021 | Moldvai et al. | |
| 2021/0144060 A1 | 5/2021 | Cencini et al. | |
| 2021/0200643 A1* | 7/2021 | Luo | G06F 11/203 |
| 2021/0406717 A1 | 12/2021 | Tauheed et al. | |

FOREIGN PATENT DOCUMENTS

| | | |
|---|---|---|
| CN | 108664660 | 10/2018 |
| CN | 113010599 | 6/2021 |
| EP | 1 654 683 | 5/2006 |
| LU | 102236 B1 | 11/2020 |
| TW | 201600970 A1 | 1/2016 |
| WO | WO-2016/069029 | 5/2016 |
| WO | WO-2020/072338 | 4/2020 |
| WO | WO-2021/108075 A1 | 6/2021 |

OTHER PUBLICATIONS

Matijaca, Ante, "Dashboard" Dribble, published Dec. 21, 2015, retrieved Feb. 11, 2022 from <https://dribbble.com/shots/2417233-Dashboard> (Year: 2015).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).

Foreign Action other than Search Report on EP 21192308.1 dated Apr. 6, 2022.

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. Received from https://docs.dremio.com/deployment/provisioning-ec2.html (Year: 2020).

Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017/07/designing-perfect-date-time-picker/> (Year: 2017).

Geier, Eric, "Using Static IP Addresses on Your Network" Cisco Press. Sep. 14, 2009. Received from https://www.ciscopress.com/articles/article.asp?p=1393495. (Year: 2009).

Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).

Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

M. A. Metawai et al. "Load balancing in distributed multi-agent computing systems" Ain Shams Engineering Journal. ASEJ. May 23, 2012. p. 237-249. (Year: 2012).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

(56) References Cited

OTHER PUBLICATIONS

Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always on availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
NetApp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
NetApp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).
Non-Final Office Action on U.S. Appl. No. 16/228,728 dated Mar. 24, 2020.
Non-Final Office Action on U.S. Appl. No. 16/234,547 dated Apr. 15, 2021.
Non-Final Office Action on U.S. Appl. No. 16/234,553 dated Jan. 6, 2021.
Notice of Allowance on U.S. Appl. No. 16/228,728 dated Jul. 1, 2020.
Notice of Allowance on U.S. Appl. No. 16/234,553 dated Mar. 30, 2021.
Notice of Allowance on U.S. Appl. No. 29/673,554 dated Apr. 17, 2020.
Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJW0ZPW22N (Year: 2020).
Opster, "High Availability in Elasticsearch—Cross Cluster Replication and Alternatives" Opster. 2020. Received from https://opster.com/blogs/elasticsearch-cross-cluster-replication-overview/ (Year: 2020).
Opster, "Multi-Cluster Load Balancer-An Alternative to Cross Cluster Replication" Opster. 2020. Received from https://opster.com/elasticsearch-multi-cluster-load-balancer/ (Year: 2020).
Oracle Communications, "Provisioning Database Interface User's Guide, Release 16.0" (Sep. 2014) Oracle, p. 1-174.
Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Red Hat "Chapter 4. Configuring the Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).
Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).
Sharit, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2017.
The Nutanix Bible; from https://nutanixbible.com/; accessed on Jun. 8, 2017.
The Nutanix Bible; from https://nutanixbible.com/; accessed on Jun. 9, 2016.
VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
Warren, "Internet Archive Wayback Machine Introduces New Beta Version With Calendar View." warren's blog, published Jan. 23,

(56) References Cited

OTHER PUBLICATIONS 2011 (Retrieved from the Internet Apr. 7, 2020). Internet URL: <warrenduecker.blogspot.com/2011/01/internet-archive-wayback-machine.html> (Year: 2011).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Balasubramanian, Sudhir, "Virtual vols. for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Fenton, Tom, "How to Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual vols. on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

Meadowcroft, Ben, "Virtual Volumes First Year in Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Storti, Brian "A Primer on Database Replication" Brianstorti.com (May 23, 2017) from https://www.brianstorti.com/replication/ (accessed Jun. 28, 2021).

Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).

VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).

VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).

VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).

VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).

VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).

Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Extended European Search Report re EP21192308.1 dated Jan. 24, 2022.

Extended European Search Report re EP21192379.2 dated Jan. 26, 2022.

Google Cloud, "Architectures for high availability of PostgreSQL clusters on Compute Engine" Google Cloud Architecture Center,

(56) References Cited

OTHER PUBLICATIONS (Jan. 21, 2021) from https://cloud.google.com/architecture/architectures-high-availability-postgresql-clusters-compute-engine (accessed Dec. 14, 2021).
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7891-1 (Year: 2017).
Microsoft SQL, "Upgrading Always on Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Nyffenegger et al., "SQL Server Instance" 2017, from https://renenyffenegger.ch/notes/development/databases/SQL-Server/architecture/instance (retrieved Jan. 25, 2022).
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
Warner, Alex et al., "Chapter 16—Canarying Releases" (published 2018) Google Workbook published by O'Reilly Media, Inc., from https://sre.google/workbook/canarying-releases/ (accessed Sep. 14, 2021).
BackupAssist, "https://backupassist.com/support/en/backupassist/manage/calendar.htm", Jul. 1, 2017 (Year: 2017).
"Configure cross-tenant access settings for B2B collaboration", Azure AD, Microsoft Entra, May 24, 2022, 21pp.
Amazon Web Services, "SaaS Tenant Isolation Strategies. Isolating Resources in a Multi-Tenant Environment", (Aug. 2020).
AWS Serverless SaaS Workshop—Lab4 : Isolating tenant data in a pooled model—Adding the missing code.
AWS Serverless SaaS Workshop—Lab4 : Isolating tenant data in a pooled model—Revisiting Authentication, Authorization, & Tenant Isolation.
Cunnhingham, "Introducing PlanetScale Managed Cloud", Nov. 3, 2021, https://planetscale.com/blog/introducing-planetscale-managed-cloud.
Geek University, "VM snapshot files," VMware ESXi course, retrieved Sep. 11, 2022 from https://geek-university.com/vm-snapshot-files/.
Guevara, Introducing PlanetScale Insights: Advanced query monitoring, May 26, 2022, https://planetscale.com/blog/introducing-planetscale-insights-advanced-query-monitoring.
Lctree, "Lctree," Linked Clone Tree Visualizer for vCloud Director, published (Nov. 28, 2012).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Mulford, Juan, "vSphere 7—Describe Instant Clone Architecture and Use Cases," Mulcas Cloudy Infrastructures, published Dec. 28, 2021, retrieved Sep. 11, 2022 from https://mulcas.com/vsphere-7-describe-instant-clone-architecture-and-use-cases/.
Notion, "Database templates," Notion Help Center, retrieved Sep. 29, 2022 from https://www.notion.so/help/database-templates.
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetid=Nutanix-Beam-User-Guide:bea-servicenow-template-create-cg-t.html.
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL-compatible serverless database platform, 2022, https://planetscale.com.
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Stone, "Cross Tenant Access", LoanPro Help, https://help.loanpro.io/article/vyy37c5bhd-cross-tenant-access, accessed Jun. 29, 2022.
Tang, "Multi-tenant access control for cloud services", Aug. 2014, The University of Texas at San Antonio College of Sciences.
Tessel for Oracle, "Fully-managed, high-performance Oracle databases with enterprise-grade data protection, security, and compliance@ your terms", 2022, https://www.tessell.io/services/oracle.
VMware Tanzu, "Innovate and grow your business on any and many clouds-fast", 2022.
VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.
VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.

(56) References Cited

OTHER PUBLICATIONS

VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.

VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.

VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.

VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.

VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.

VMware, "VMware Horizon 7 Instant-Clone Desktops And RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

Zhang, Junchi, "vFabric Data Director 2.7 customer deck," published May 17, 2013, retrieved Sep. 11, 2022 from https://www.slideshare.net/harryaya/vfabric-data-director-27-customer-deck.

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.

Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.

Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.

Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.

Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.

Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.

"Amazon RDS Now Supports Setting Up Connectivity Between Your RDS Database and EC2 Compute Instance in 1-Click", Amazon Web Services, https://aws.amazon.com/rds.

"Azure Arc extends the Azure control plane", https://infohub.delltechnologies.com/l/techbook-dell-emc-integrated-system-for-microsoft-azure-stack-hci-2/azure-arc-extends-the-azure-control-plane-14.

"Connected Machine Agent Prerequisites", Sep. 27, 2022, https://learn.microsoft.com/en-us/azure/azure-arc/servers/prerequisites.

"Control Plane", https://docs.controlplane.com.

"Exadata Database Service onCloud@Customer Administrator'sGuide", https://docs.oracle.com/en/engineered-systems/exadata-cloud-at-customer/ecccm/ecc-network-requirements.htmL#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Alhamazani, et al., "Cross-Layer Multi-Cloud Real-Time Application QoS Monitoring and Benchmarking as-a-Service Framework", https://arxiv.org/ftp/arxiv/papers/1502/1502.00206.pdf.

Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

(56) References Cited

OTHER PUBLICATIONS

Anthos Technical Overview, https://cloud.google.com/anthos/docs/concepts/overview.
AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.
AWS Prescriptive Guidance, "PostgreSQL Pool Model", https://docs.aws.amazon.com/prescriptive-guidance/latest/saas-multitenant-managed-postgresql/pool.html.
AWS Prescriptive Guidance, "Row-Level Security Recommendations", https://docs.aws.amazon.com/prescriptive-guidance/latest/saas-multitenant-managed-postgresql/rls.html.
Bucur, et al., "Multi-Cloud Resource Management Techniques for Cyber-Physical Systems", MDPI, Dec. 15, 2021, https://www.ncbi.nlm.nih.gov/pmc/articles/PMC8706026/.
MVware, "Horizon Architecture", https://techzone.vmware.com/resource/horizon-architecture#introduction.
Oracle Cloud, "Using Oracle Autonomous Database on Shared Exadata Infrastructure" published Dec. 2022.
Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.
Oracle, "Oracle Exadata Cloud@Customer X9M", Version 1.17, 2022, https://www.oracle.com/dk/a/ocom/docs/engineered-systems/exadata/exacc-x9m-ds.pdf.
Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.
VMware Horizon, "Horizon Control Plane Services Architecture", Sep. 2021, https://images.techzone.vmware.com/sites/default/files/resource/horizon_control_plane_services_architecture_noindex.pdf.
VMware, "Horizon Cloud on Microsoft Azure Architcture", https://techzone.vmware.com/resource/horizon-cloud-on-microsoft-azure-architecture#introduction.
VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.
VMware, "Horizon Control Plane Services Architecture", Sep. 2021, https://images.techzone.vmware.com/sites/default/files/resource/horizon_control_plane_services_architecture_noindex.pdf.
VMware, "Horizon Messaging", https://docs.vmware.com/en/VMware-Horizon-7/7.13/horizon-architecture-planning/GUID-39B5D03B-F619-4355-A30A-F8544D95539C.html.
VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.
VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.
VMware, Cloud Control Plane Management, "Horizon Control Plane Services", https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.
YouTube Video screenshots for Nutanix, "Nutanix Era .NEXT 2019 Demo", YouTube, May 10, 2019, https://youtu.be/PAWHHdCEArc [youtube.com].
Actifio Enablement Team, "https:/Awww.youtube.com/watch?v=7mCcJTXxFM3l", "Oracle Advanced Data Protection and Workflows", May 15, 2018 ) (Year: 2018).

AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).
AWS. "Amazon EC2 M5 Instances" Amazon DocumentDB. Amazon EC2. Retrieved from https://aws.amazon.com/ec2/instance-types/m5/ (accessed Apr. 6, 2023).
AWS. "Amazon ECS clusters" Amazon Elastic Container Service. Retrieved from https://docs.aws.amazon.com/AmazonECS/latest/developerguide/clusters.html (accessed Apr. 6, 2023).
AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).
AWS. "AWS glossary" AWS General Reference Guide. Retrieved from https://docs.aws.amazon.com/general/latest/gr/glos-chap.html (accessed Apr. 6, 2023).
AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).
AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).
AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Retrieved from https://aws.amazon.com/kubernetes/#:~:text=Kubernetes%20manages%20clusters%20of%20Amazon,premises%20and%20in%20the%20cloud (accessed Apr. 6, 2023).
AWS. "Storage" Amazon Elastic Compute Cloud. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).
AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).
AWS. "What Is an Instance in Cloud Computing?" Amazon Web Services. Retrieved from https://aws.amazon.com/what-is/cloud-instances/#:~:text=You%20can%20run%20multiple%20virtual,of%20sharing%20and%20scaling%20resources (accessed Apr. 6, 2023).
AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).
Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Final Office Action on U.S. Appl. No. 16/234,547 dated May 11, 2023.
Final Office Action on U.S. Appl. No. 16/805,581 dated Jul. 6, 2022.

(56) References Cited

OTHER PUBLICATIONS

Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).

Microsoft. "Basic Always on availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).

Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).

Non-Final Office Action on U.S. Appl. No. 16/805,581 dated Jan. 14, 2022.

Non-Final Office Action on U.S. Appl. No. 16/805,581 dated Oct. 12, 2022.

Notice of Allowance on U.S. Appl. No. 16/805,581 dated Apr. 3, 2023.

Nutanix Inc., "Prism 5.5, Prism Central Guide" (Jul. 7, 2020) pp. 1-618.

Nutanix, Inc. "Prism Central Guide", Acropolis 5.0, (Oct. 18, 2018), pp. 1-374.

Nutanix, Inc., "Acropolis Advance Administration Guide" Acropolis 5.0 Feb. 9, 2018, pp. 1-60.

Nutanix, Inc., "Acropolis Advanced Administration Guide" Acropolis 5.1, Jul. 11, 2018, pp. 1-63.

Nutanix, Inc., "Prism Central Guide", Acropolis 5.1, (Oct. 18, 2018), pp. 1-410.

Nutanix, Inc., "Prism Web Console Guide" Prism 5.8, (Mar. 19, 2019), pp. 1-808.

PlanetScale. "PlanetScale is the world's most advanced serverless MySQL platform" PlanetScale. Retrieved from https://planetscale.com/ (accessed Apr. 6, 2023).

Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).

Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).

Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).

Tessell. "Differentiated Infrastructure. Delightful Management." Tessell. Retrieved from https://query.prod.cms.rt.microsoft.com/cms/api/am/binary/RW13XNT (accessed Apr. 6, 2023).

Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).

Tessell. "The Tessell platform provides unparalleled security for your data and users" Tessell. Retrieved from https://query.prod.cms.rt.microsoft.com/cms/api/am/binary/RW13XNU (accessed Apr. 6, 2023).

Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).

AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).

AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).

AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).

Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).

Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).

Notice of Allowance on U.S. Appl. No. 17/727,554 dated Jun. 8, 2023.

AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).

AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).

AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).

AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).

Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).

Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).

Google Cloud. "REST Resource: subnetworks" Compute Engine. Jul. 1, 2019. Retrieved from https://cloud.google.com/compute/docs/reference/rest/beta/subnetworks (accessed Sep. 6, 2023).

Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).

MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).

Non-Final Office Action on U.S. Appl. No. 17/951,632 dated Sep. 14, 2023.

(56) References Cited

OTHER PUBLICATIONS

Tudip Digital. "What is Deployment Manager?" Tudip. Jun. 24, 2019. Retrieved from https://tudip.com/blog-post/what-is-deployment-manager/ (accessed Sep. 6, 2023).

YouTube Video screenshots for Cloud Advocate. "Google Cloud Deployment Manager—Getting Started" YouTube. Aug. 28, 2020. https://youtu.be/qVKp7W1bfrE [youtube.com].

Foreign Search Report on PCT dated Sep. 7, 2023.

Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).

Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).

Kubernetes. "Authenticating" Kubernetes Documentation. Jul. 12, 2018. Retrieved from https://kubernetes.io/docs/reference/access-authn-authz/authentication/ (accessed Oct. 11, 2023).

Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

Kubernetes. "Nodes" Kubernetes Documentation. Jul. 14, 2017. Retrieved from https://kubernetes.io/docs/concepts/architecture/nodes/ (accessed Oct. 11, 2023).

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).

Progress. "Simple tenancy" Progress Documentation. Apr. 12, 2017. Retrieved from https://docs.progress.com/bundle/openedge-database-management-117/page/Simple-tenancy.html (accessed Sep. 28, 2023).

Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).

Progress. "Tenant-ID() method" Progress Documentation. Jun. 2011. Retrieved from https://docs.progress.com/bundle/abl-reference/page/TENANT-ID-method.html# (accessed Sep. 28, 2023).

Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).

YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).

AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).

AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).

DBInsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).

GOOGLE. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).

Jain, Viral. "How to Create SQL Database in AWS" C-Sharp Corner. May 4, 2018. Retrieved from https://www.c-sharpcorner.com/article/how-to-create-sql-database-in-aws/ (accessed Jul. 26, 2023).

Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).

YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].

YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGoIVFBuU [youtube.com].

YouTube Video screenshots for Alibaba Cloud. "How-to | Set Up a Multi tier WordPress Site on Alibaba Cloud" YouTube. Jun. 25, 2018. https://youtu.be/yWXhibyIW6M [youtube.com].

YouTube Video screenshots for Nutanix University. "How to Provision a PostgreSQL cluster using Nutanix Era | Nutanix University" YouTube. Aug. 8, 2019. https://youtube.com/watch?v=FoDGtORWNnU [youtube.com].

Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).

AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).

AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).

AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).

AWS. "Maintaining a DB instance" Amazon Relational Database Service. Sep. 5, 2015. Retrieved from https://docs.aws.amazon.com/

(56) References Cited

OTHER PUBLICATIONS

AmazonRDS/latest/UserGuide/USER_UpgradeDBInstance. Maintenance.html#OS_Updates (accessed Aug. 30, 2023).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).
Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).
Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Matijaca, Ante, "Dashboard" Dribbble, published Dec. 21, 2015, retrieved Feb. 11, 2022 from <https://dribbble.com/shots/2417233-Dashboard> (Year: 2015).
MongoDB. "mongo Shell Methods" Reference. Aug. 2019. Retrieved from https://www.mongodb.com/docs/v4.2/reference/method/ (accessed Aug. 30, 2023).
MongoDB. "mongodb" GitHub. Mar. 2015. Retrieved from https://github.com/mongodb/docs/blob/v4.2/source/core/replica-set-priority-0-member.txt (accessed Aug. 30, 2023).
MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).
MongoDB. "Replica Set Elections" MongoDB Manual. Aug. 2019. Retrieved from https://www.mongodb.com/docs/manual/core/replica-set-elections/ (accessed Aug. 30, 2023).
MongoDB. "Replica Set Members" Replication. Aug. 2019. Retrieved from https://www.mongodb.com/docs/v4.2/core/replica-set-members/#replica-set-secondary-members (accessed Aug. 30, 2023).
MongoDB. "The mongo Shell" MongoDB. Aug. 2019. Retrieved from https://www.mongodb.com/docs/v4.2/mongo/ (accessed Aug. 30, 2023).
MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).
MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).
Non-Final Office Action on U.S. Appl. No. 17/694,964 dated Aug. 9, 2023.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).
Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).
Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).
Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).
Quest. "Creating custom User-defined Database Groups" Support. Aug. 16, 2017. Retrieved from https://support.quest.com/kb/4229519/creating-custom-user-defined-database-groups (accessed Aug. 30, 2023).
Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).
Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).
Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).
Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).
YouTube Video for Delphix Corp., "How to Create Database Copies with Delphix," YouTube, Apr. 3, 2018, https://www.youtube.com/watch?v=1EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
YouTube Video screenshots for "Nutanix Business Critical Applications & Databases—.NEXT Europe 2019," YouTube, Oct. 16, 2019, https://www.youtube.com/watch?v=KI7IEmm6j60 [youtube.com].
YouTube Video screenshots for "Nutanix Era .NEXT 2019 Demo," YouTube, May 10, 2019, https://www.youtube.com/watch?v=8hbpfrOSwOU [youtube.com].
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].

\* cited by examiner

MULTI-CLUSTER DATABASE MANAGEMENT SERVICES

CROSS-REFERENCE TO RELATED APPLICATIONS

This application claims priority from U.S. Provisional Application No. 63/072,638, filed on Aug. 31, 2020 and Indian Application No. 202041037134, filed on Aug. 28, 2020, the entireties of which are incorporated by reference herein.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a system is disclosed. The system includes a memory having computer-readable instructions thereon and a processor of a server executing the computer-readable instructions to define a first policy for a source database on a first cluster of a plurality of clusters. Each of the plurality of clusters is registered with the server to form a multi-cluster configuration of a database management system in a virtual computing system, and the first policy defines capture of snapshots and/or transactional logs from the source database on the first cluster. The processor further executes the computer-readable instructions to define a second policy for the source database to replicate at least some of the snapshots and/or transactional logs from the first cluster to a second cluster of the plurality of clusters, capture a first snapshot and/or a first transactional log from the source database in accordance with the first policy, and replicate the first snapshot and/or the first transactional log to the second cluster in accordance with the second policy.

In accordance with some other aspects of the present disclosure, a method is disclosed. The method includes defining, by a processor of a server executing computer-readable instructions, a first policy for a source database on a first cluster of a plurality of clusters. Each of the plurality of clusters is registered with the server to form a multi-cluster configuration of a database management system in a virtual computing system, and the first policy defines capture of snapshots and/or transactional logs from the source database on the first cluster. The method also includes defining, by the processor, a second policy for the source database for replicating at least some of the snapshots and/or transactional logs from the first cluster to a second cluster of the plurality of clusters, capturing, by the processor, a first snapshot and/or a first transactional log from the source database in accordance with the first policy, and replicating, by the processor, the first snapshot and/or the first transactional log to the second cluster in accordance with the second policy.

In accordance with some other aspects of the present disclosure, a non-transitory computer-readable media having computer-readable instructions stored thereon is disclosed. The computer-readable instructions when executed by a processor of a server cause the processor to define a first policy for a source database on a first cluster of a plurality of clusters. Each of the plurality of clusters is registered with the server to form a multi-cluster configuration of a database management system in a virtual computing system, and the first policy defines capture of snapshots and/or transactional logs from the source database on the first cluster. The computer-readable instructions further cause the processor to define a second policy for the source database to replicate at least some of the snapshots and/or transactional logs from the first cluster to a second cluster of the plurality of clusters, capture a first snapshot and/or a first transactional log from the source database in accordance with the first policy, and replicate the first snapshot and/or the first transactional log to the second cluster in accordance with the second policy.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
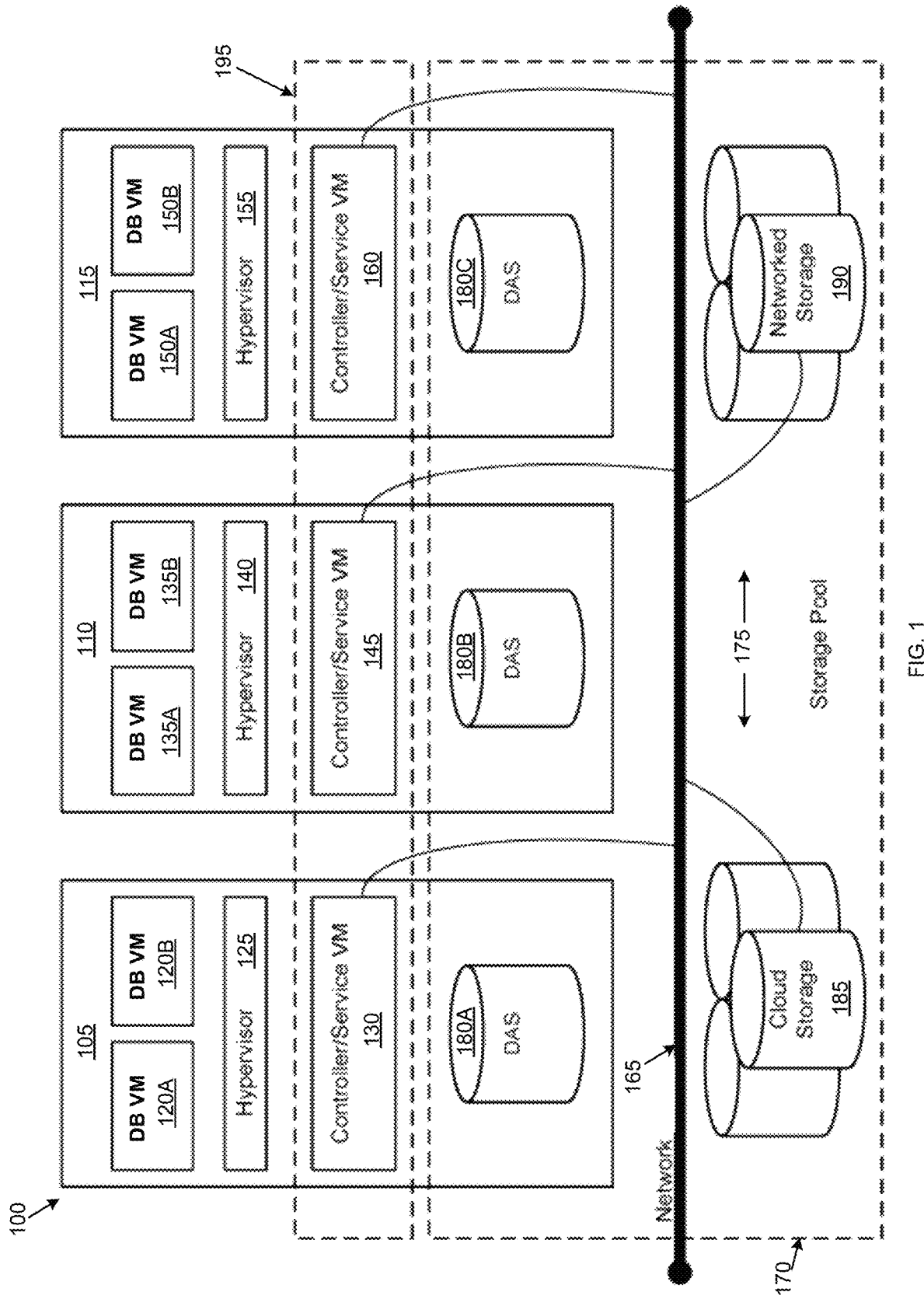
FIG. 1 is an example block diagram of a cluster in a multi-cluster configuration of a database management system in a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system having a plurality of clusters, with each of the plurality of clusters having a plurality of nodes. Each of the plurality of nodes includes one or more virtual machines and other entities, which may be managed by an instance of a monitor such as a hypervisor. These and other components may be part of a datacenter, which may be managed by a user (e.g., an administrator or other authorized personnel). A distributed storage system, for providing storage and protection capabilities, may be associated with the virtual computing system and shared at least partially by each of the plurality of nodes. The virtual computing system may be configured as a database system for providing database management services. For example, at least some of the one or more virtual machines within the virtual computing system may be configured as database server virtual machines for storing one or more databases. These databases may be managed by a database management system. The database management system may provide a plurality of database services. For example, in some embodiments, the database management system may provide database provisioning services and copy data management services.

Database provisioning services involve creating new databases. Creating a new database may be a complex and long drawn process. A user desiring to create a new database with a provider of the database management system may make a new database creation request with the database provider. The user request may pass through multiple entities (e.g., people, teams, etc.) of the database provider before a database satisfying the user request may be created. For example, the user may be required to work with a first entity of the database provider to specify the configuration (e.g., database engine type, number of storage disks needed, etc.) of the database that is desired. Upon receiving the database configuration, another entity of the database provider may configure a database server virtual machine for hosting the database, while yet another entity may configure the networking settings to facilitate access to the database upon creation. Yet another entity of the database provider may configure database protection services to backup and protect the database. All of these tasks may take a few to several days. Thus, creating a database may be a time intensive process and inconvenient for the user. The user may not have the time or desire to wait for multiple days to create a database. Further, creating the database using the above procedure requires the user to rely on other entities. If these other entities become unavailable, the user may have no choice but to wait for those entities to become operational again. Additionally, the user may not be fully privy to or even understand the various configurational details of the desired database that the user may be asked to provide to the other entities for creating the database. The present disclosure provides technical solutions to the above problems.

Specifically, the database management system of the present disclosure greatly simplifies the database provisioning service. The database management system of the present disclosure allows the user to quickly and conveniently create a new database and associate the database with the database management system without the need for contacting and working with multiple entities. The entire process of creating and associating the database with the database management system may be completed by the user within a span of a few minutes (or less) instead of the multiple days mentioned above. The database management system of the present disclosure provides a user friendly, intuitive user interface that solicits information from and conveniently walks the user through the various steps for creating a new database within minutes. The database management system may include a catalog of standardized configurations, which the user may select from the user interface for creating the database. The user may modify the standardized configurations or create custom configurations to suit their needs. By virtue of providing standardized configurations, the present disclosure simplifies the database creation process for the user. The user interface also hides the complexity of creating the database from the user. For example, the user need not worry about creating, partitioning, or associating storage space (e.g., storage disk space) with the database that is being created. The user may simply specify a size of the database that is desired in the user interface and the database management system may automatically translate that size into storage space. Thus, based upon the needs of the user, the user is able to specifically tailor the database during creation and create the database easily and quickly using the user interface.

The database management system may also provide the ability to register an existing database with the database management system. Such existing databases may have been created outside of the database management system (e.g., by a different database provider or vendor). Users having existing databases may desire to associate their databases with the database management system (e.g., when changing vendors). Similar to creating a new database in the database management system, registering an existing database with the database management system of the present disclosure is easy, convenient, and may be completed within a span of a few minutes (or less) via the user interface. As with the creation of a new database, the user interface walks the user through the registration process, provides standardized configurations for the user to select from, ability to modify the standardized configurations, and create new configurations. Upon registering the database with the database management system, the database may take advantage of other database management services offered by the database system.

Another database management service may include copy data management. Copy data management services involve protecting a database. Protecting a database means replicating a state of the database for creating a fully functional copy of the database. Replicating the state of the database may involve creating fully functional clones (e.g., back-ups) of the database. Replicating the state of the database may also include restoring a database. Since the clones are fully functional copies of the original or source database, a user may perform operations on the cloned copy that would otherwise be performed on the original database. For example, the user may perform reporting, auditing, testing, data analysis, etc. on the cloned copy of the original database. A cloned database or restored database may be created by periodically capturing snapshots of the database. A snapshot stores the state of the database at the point in time at which the snapshot is captured. The snapshot is thus a point in time image of the database. The snapshot may include a complete encapsulation of the virtual machine on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. From the snapshot, the source database may be recreated to the state at which the snapshot was captured.

However, the number of snapshots that are captured in a given day may be limited. Specifically, because capturing a snapshot requires quiescing (e.g., pausing) the database and entering a safe mode in which user operations are halted, it may be desirable to take only a minimum number of snapshots in a day. Thus, choices of state that may recreated from a snapshot may be limited. If a state is desired that falls between the capture of two snapshots, the user may be out of luck. Thus, the desire to limit the number of snapshots in a day results in a significant technical problem that results in losing changes made to a database since the last snapshot capture or between two snapshot captures. The present disclosure provides technical solutions to these problems.

Specifically, the present disclosure automatically creates an instance of a database protection system for each database (e.g., source database) that is created within (or registered with) the database management system. The database protection system instance may be configured to protect the database by automatically capturing snapshots of the database. Additionally, to avoid losing changes in state between two snapshot captures or since the last snapshot capture, the database system may capture transactional logs. A transactional log may be a text, image, disk, or other type of file that records every transaction or change that occurs on the source database since a last snapshot capture. In some embodiments, the transactional logs may be captured by copy-on-write, redirect-on-write, or any other suitable method. Thus, by using the snapshots or a combination of snapshots and transactional logs, any state of the source database down to the last second (or even fractions of seconds or other time granularities) may be recreated. Specifically, states of the source database that fall between the capture of two snapshots may be recreated by using a combination of snapshots and transactional logs.

The frequency of capturing transactional logs may be higher than the frequency of capturing snapshots in a day. For example, in some embodiments, a transactional log may be captured every 30 minutes. In other embodiments, the user may define the frequency of capturing transactional logs. Further, since the source database is not quiesced (paused) for capturing the transactional log, user operations may continue while the transactional logs are being captured. Further, since the transactional logs only capture the changes in the database since the last snapshot capture, the transactional logs do not consume a lot of space. Thus, clones of the database can be created to a point in time by using a combination of transactional logs and snapshots (e.g., between two snapshot captures), or based upon available snapshots (e.g., at the point of snapshot capture).

Further, the frequency with which the snapshots and transactional logs are captured by the database system may depend upon the level of protection desired by the user. The database management system may solicit a protection schedule and definition of a Service Level Agreement ("SLA") from the user while creating the database (or registering the database). For convenience, the database management system may include built-in defaults of the protections schedule and SLA levels that the user may select from. The user may modify the defaults or define new parameters for the protection schedule and SLA. Thus, the level of protection accorded to each database associated with the database management system may be individually tailored based upon the requirements of the user. The protection schedule may allow the user to define the frequency of snapshots and transactional logs to be captured each day, and the time-period for capturing daily, weekly, monthly, and/or quarterly snapshots based upon the SLA.

Additionally, in some embodiments, upon capturing snapshots and transactional logs, at least some of those snapshots and/or transactional logs may be desired to be replicated (e.g., copied) to another location for backup purposes, high availability purposes, etc. In some embodiments, the same database may be desired to be accessed from multiple locations. The replication of the snapshots and/or transactional logs may provide access to the source database from multiple locations. The present disclosure provides an easy and convenient mechanism to replicate snapshots and/or transactional logs in a multi-cluster configuration of a database management system, as well as mechanisms to scrub snapshots and/or transactional logs to remove sensitive or other types of information from the snapshots and/or transactional logs before replication.

In addition to provisioning and copy data management services, the database management system of the present disclosure may be configured for performing a variety of other database services, such as patching, load balancing database snapshot replication for improved scalability (particularly in a multi-cluster configuration), cross availability zone database as a service, a singular database as a service for a multi-cloud environment, etc.

Further, in some embodiments, the database management system may be configured to reside on and manage databases that are located on the same cluster as the one that the database management system resides on. Such a configuration may be referred to as a single-cluster configuration. However, databases in a customer setup may have databases that span across multiple clusters. For example, in some embodiments, a database deployed in pre-production/staging, production, and backup/disaster recovery environments may be located on multiple clusters because each of those environments may have a different set of requirements (e.g., require different resources). However, a database management system that is configured to manage only those databases that are located on the same cluster as the database management system is limited in its use and operation. Providing multiple instances of the database management system to manage the databases on different clusters is complex, expensive, requires magnitudes of additional resources to deploy and manage the different database management systems, and therefore, is undesirable. In some embodiments, the database management systems across the different clusters may not even communicate with each other, thereby preventing the databases across the multiple clusters to be linked or share resources.

The present disclosure provides technical solutions that enable the database management system that is located on a particular cluster to manage databases located on other clusters. Such a configuration may be referred to as a multi-cluster configuration. Thus, a single database management system may be configured to manage multiple databases spanning across multiple clusters, thereby providing effective and convenient management of those databases.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database virtual machines") 120A and 120B (collectively referred to herein as "database virtual machines 120"), a hypervisor 125 configured to create and run the database virtual machines, and a controller/service virtual machine 130 configured to manage, route, and otherwise handle workflow requests between the various nodes of the cluster 100. Similarly, the second node 110 includes database virtual machines 135A and 135B (collectively referred to herein as "database virtual machines 135"), a hypervisor 140, and a controller/service virtual machine 145, and the third node 115 includes database virtual machines 150A and 150B (collectively referred to herein as "database virtual machines 150"), a hypervisor 155, and a controller/service virtual machine 160. The controller/service virtual machine 130, the controller/service virtual machine 145, and the controller/service virtual machine 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database virtual machines (e.g., the database virtual machines 120, the database virtual machines 135, the database virtual machines 150) are shown on each of the first node 105, the second node 110, and the third node 115, in other embodiments, the number of the database virtual machines on each of the first, second, and third nodes may vary to include other numbers of database virtual machines. Further, the first node 105, the second node 110, and the third node 115 may have the same number of database virtual machines (e.g., the database virtual machines 120, the database virtual machines 135, the database virtual machines 150) or different number of database virtual machines.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service virtual machine 130, the controller/service virtual machine 145, and the controller/service virtual machine 160, and/or the hypervisor 125, the hypervisor 140, and the hypervisor 155.

Also, although not shown, one or more of the first node 105, the second node 110, and the third node 115 may include one or more processors configured to execute instructions. The instructions may be carried out by a special purpose computer, logic circuits, or hardware circuits of the first node 105, the second node 110, and the third node 115. The processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors, thus, execute an instruction, meaning that they perform the operations called for by that instruction.

The processors may be operably coupled to the storage pool 170, as well as with other elements of the first node 105, the second node 110, and the third node 115 to receive, send, and process information, and to control the operations of the underlying first, second, or third node. The processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processors may execute instructions without first copying the instructions to the RAM. Further, the processors may include a single stand-alone processor, or a plurality of processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service virtual machine 130, the controller/service virtual machine 145, the controller/service virtual machine 160, and/or the hypervisor 125, the hypervisor 140, and the hypervisor 155. In some embodiments, the various storage components in the storage pool 170 may be configured as virtual disks for access by the database virtual machines 120, the database virtual machines 135, and the database virtual machines 150.

Each of the database virtual machines 120, the database virtual machines 135, the database virtual machines 150 is a software-based implementation of a computing machine. The database virtual machines 120, the database virtual machines 135, the database virtual machines 150 emulate the functionality of a physical computer. Specifically, the hardware resources, such as processor, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database virtual machines 120, the database virtual machines 135, the database virtual machines 150 that may run its own operating system and applications on the underlying physical resources just like a real computer. By encapsulating an entire machine, including CPU, memory, operating system, storage devices, and network devices, the database virtual machines 120, the database virtual machines 135, the database virtual machines 150 are compatible with most standard operating systems (e.g., Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database virtual machines 120, the database virtual machines 135, and the database virtual machines 150 with each virtual machine sharing the resources of that one physical server computer, potentially across multiple environments. For example, each of the hypervisor 125, the hypervisor 140, and the hypervisor 155 may allocate memory and other resources to the underlying virtual machines (e.g., the database virtual machines 120, the database virtual machines 135, the database virtual machine 150A, and the database virtual machine 150B) from the storage pool 170 to perform one or more functions. In some embodiments, a different type of monitor (or no monitor) may be used instead of the hypervisor 125, the hypervisor 140, and the hypervisor 155.

By running the database virtual machines 120, the database virtual machines 135, and the database virtual machines 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database virtual machines are created (e.g., installed) on the first node 105, the second node 110, and the third node 115, each of the new database virtual machines may be configured to be associated with certain hardware resources, software resources, storage resources, and other resources within the cluster 100 to allow those virtual machines to operate as intended.

The database virtual machines 120, the database virtual machines 135, the database virtual machines 150, and any newly created instances of the database virtual machines may be controlled and managed by their respective instance of the controller/service virtual machine 130, the controller/service virtual machine 145, and the controller/service virtual machine 160. The controller/service virtual machine 130, the controller/service virtual machine 145, and the controller/service virtual machine 160 are configured to communicate with each other via the network 165 to form a distributed system 195. Each of the controller/service virtual machine 130, the controller/service virtual machine 145, and the controller/service virtual machine 160 may be considered a local management system configured to manage various tasks and operations within the cluster 100. For example, in some embodiments, the local management system may perform various management related tasks on the database virtual machines 120, the database virtual machines 135, and the database virtual machines 150.

The hypervisor 125, the hypervisor 140, and the hypervisor 155 of the first node 105, the second node 110, and the third node 115, respectively, may be configured to run virtualization software, such as, ESXi from virtual machines are, AHV from Nutanix, Inc., XenServer from Citrix Systems, Inc., etc. The virtualization software on the hypervisor 125, the hypervisor 140, and the hypervisor 155 may be configured for running the database virtual machines 120, the database virtual machines 135, the database virtual machine 150A, and the database virtual machine 150B, respectively, and for managing the interactions between those virtual machines and the underlying hardware of the first node 105, the second node 110, and the third node 115. Each of the controller/service virtual machine 130, the controller/service virtual machine 145, the controller/service virtual machine 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database virtual machine (e.g., the database virtual machines 120, the database virtual machines 135, or the database virtual machines 150) may direct an input/output request to the controller/service virtual machine (e.g., the controller/service virtual machine 130, the controller/service virtual machine 145, or the controller/service virtual machine 160, respectively) on the underlying node (e.g., the first node 105, the second node 110, or the third node 115, respectively). Upon receiving the input/output request, that controller/service virtual machine may direct the input/output request to the controller/service virtual machine (e.g., one of the controller/service virtual machine 130, the controller/service virtual machine 145, or the controller/service virtual machine 160) of the leader node. In some cases, the controller/service virtual machine that receives the input/output request may itself be on the leader node, in which case, the controller/service virtual machine does not transfer the request, but rather handles the request itself.

The controller/service virtual machine of the leader node may fulfil the input/output request (and/or request another component within/outside the cluster 100 to fulfil that request). Upon fulfilling the input/output request, the controller/service virtual machine of the leader node may send a response back to the controller/service virtual machine of the node from which the request was received, which in turn may pass the response to the database virtual machine that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service virtual machine 130, the controller/service virtual machine 145, the controller/service virtual machine 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
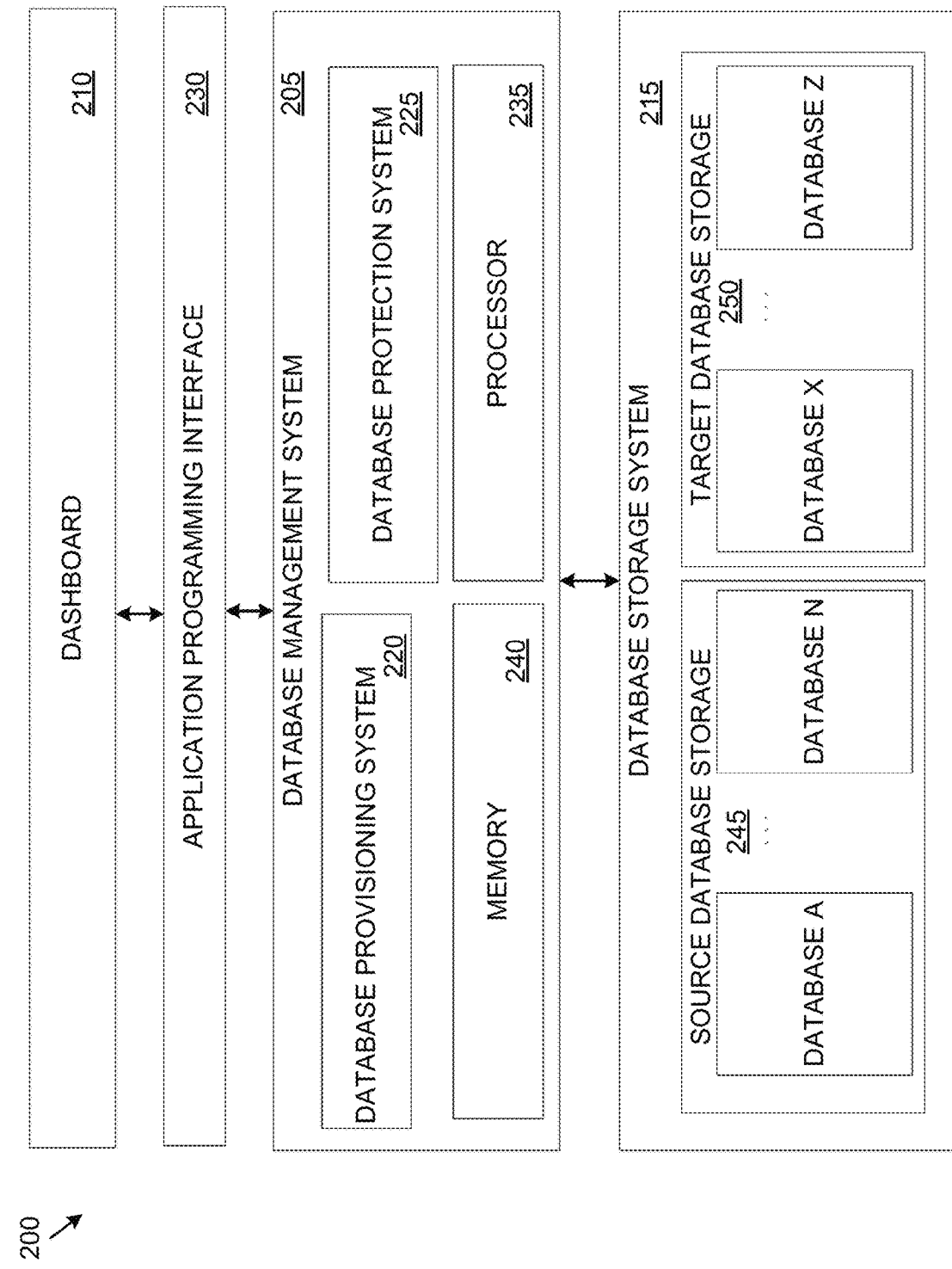
FIG. 2 is an example block diagram showing additional details of the multi-cluster configuration in the virtual computing system of FIG. 1, in accordance with some embodiments of the present disclosure.

Referring now to FIG. 2, an example block diagram of a database system 200 is shown, in accordance with some embodiments of the present disclosure. The database system 200 or portions thereof may be configured as utility software for creating and implementing database management services. The database system 200 is configured to provide various database management services. The various elements of the database system 200 described below may be part of a single cluster (e.g., the cluster 100) or may span across multiple clusters of a virtual computing system. When part of a single cluster, the various elements discussed below may be associated with one or more nodes of the single cluster. When part of multiple clusters, in some embodiments, some elements of the database system 200 may be located on one cluster, while other elements may be located on one or more other clusters.

The database system 200 includes a database management system 205 that is configured to receive input from and provide output to a user via a dashboard 210. The database management system 205 is also associated with a database storage system 215 that is configured to store one or more databases under management of the database system 200. In association with the dashboard 210 and the database storage system 215, the database management system 205 is configured to implement one or more database management services of the database system 200.

For example, the database management system 205 may be configured to provide database provisioning services to create new databases and register existing databases with the database system 200 using a database provisioning system 220. The database management system 205 may also be configured to protect databases created or registered by the database provisioning system 220 via a database protection system 225, as well as provide other types of database management services. Although the database provisioning system 220 and the database protection system 225 are shown as separate components, in some embodiments, the database provisioning system and the database protection system may be combined, and the combined component may perform the operations of the individual components. Although not shown, the database management system 205 may include other or additional components that provide other or additional database management services. Thus, the database management system 205 may also be referred to herein as a "database service," "Era service," or "Era server."

The database system 200 may be installed on a database virtual machine (e.g., the database virtual machines 120, the database virtual machines 135, the database virtual machines 150 of FIG. 1). The database system 200 may be installed via the controller/service virtual machine (e.g., the controller/service virtual machine 130, the controller/service virtual machine 145, the controller/service virtual machine 160) of the node (e.g., the first node 105, the second node 110, and the third node 115) on which the database system is to be installed. For example, an administrator desiring to install the database system 200 may download a copy on write image file (e.g., qcow or qcow2 image file) on the controller/service virtual machine to define the content and structure of a disk volume to be associated with the database system 200. In some embodiments, instead of a copy on write image file, another type of disk image file, depending upon the type of underlying hypervisor, may be installed. Further, the administrator may create or one or more new database virtual machines on which the database system 200 is to reside. As part of creating the database virtual machines, the administrator may allocate a particular number of virtual central processors (vCPU) to each of the database virtual machines, define the number of cores that are desired in each vCPU, designate a specific amount of memory to each of the database virtual machines, and attach a database storage device (e.g., a virtual disk from the storage pool 170) with each of the database virtual machines. In some embodiments, at least a portion of the database storage device attached to the database system 200 may form the database storage system 215. The administrator may also create a new network interface (e.g., associate a virtual local area network (VLAN), assign an Internet Protocol ("IP") address to access the database system 200, etc.) with each of the database virtual machines. The administrator may perform additional and/or other actions to create the database virtual machines on which the database system 200 resides upon creation and installation of the disk image file.

In some embodiments, the database virtual machines on which the database system 200 resides may all be located on a single node (e.g., one of the first node 105, the second node 110, and the third node 115). In other embodiments, the database virtual machines on which the database system 200 resides may be spread across multiple nodes within a single cluster, or amongst multiple clusters. When spread across multiple clusters, each of the associated multiple clusters may be configured to at least indirectly communicate with one another to facilitate operation of the database system 200. Upon installing the database system 200, a user (e.g., the administrator or other user authorized to access the database system) may access the dashboard 210. The dashboard 210, thus, forms the front end of the database system 200 and the database management system 205 and the database storage system 215 form the backend of the database system.

The database system 200 may be accessed via a computing device associated with the virtual computing system (e.g., of FIG. 1). In other embodiments, instead of or in addition to being accessible via a particular computing device, the database system 200 or at least portions thereof may be hosted on a cloud service and may be accessed via the cloud. In some embodiments, the database system 200 may additionally or alternatively be configured as a mobile application suitable for access from a mobile computing device (e.g., a mobile phone). In some embodiments, the database system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database system 200 is installed.

In some embodiments and when the dashboard 210 is configured for access via the API 230, the user may access the dashboard via a web browser and upon entering a uniform resource locator ("URL") for the API such as the IP address or other indicator of the database system 200 or other web address. Using the API 230 and the dashboard 210, the users may then send instructions to the database management system 205 and receive information back from the database management system. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the database management system 205 and facilitating communication between the users and the database management system. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database system 200 may be configured for access in other ways.

The dashboard 210 provides a user interface that facilitates human-computer interaction between the users and the database management system 205. The dashboard 210 is configured to receive user inputs from the users via a graphical user interface ("GUI") and transmit those user inputs to the database management system 205. The dashboard 210 is also configured to receive outputs/information from the database management system 205 and present the outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database management system 205 to perform the functions described herein.

Thus, the dashboard receives a user request (e.g., an input) from the user and transmits that user request to the database management system 205. In some embodiments, the user request may be to request a database management service. For example, in some embodiments, the user request may be to request a database provisioning service or a copy data management service. In response to the user request for a database provisioning service, the database management system 205 may activate the database provisioning system 220 or the database protection system 225, respectively.

The database management system 205, including the database provisioning system 220 and the database protection system 225 may be configured as, and/or operate in association with, hardware, software, firmware, or a combination thereof. Specifically, the database management system 205 may include a processor 235 configured to execute instructions for implementing the database management services of the database system 200. In some embodiments, each of the database provisioning system 220 and the database protection system 225 may have their own separate instance of the processor 235. The processor 235 may be implemented in hardware, firmware, software, or any combination thereof. "Executing an instruction" means that the processor 235 performs the operations called for by that instruction. The processor 235 may retrieve a set of instructions from a memory for execution. For example, in some embodiments, the processor 235 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 235 may be configured to execute instructions without first copying those instructions to the RAM. The processor 235 may be a special purpose computer, and include logic circuits, hardware circuits, etc. to carry out the instructions. The processor 235 may include a single stand-alone processor, or a plurality of processors that use the same or different processing technology. The instructions may be written using one or more programming language, scripting language, assembly language, etc.

The database management system 205 may also include a memory 240. The memory 240 may be provisioned from or be associated with the storage pool 170. In some embodiments, the memory 240 may be separate from the storage pool 170. The memory 240 may be any of a variety of volatile and/or non-volatile memories that may be considered suitable for use with the database management system 205. In some embodiments, the memory 240 may be configured to store the instructions that are used by the processor 235. Further, although not shown, in some embodiments, the database provisioning system 220 and the database protection system 225 may each, additionally or alternatively, have their own dedicated memory. In some embodiments, the memory 240 may be configured to store metadata associated with managing the various databases in the database system 200. Thus, in some embodiments, the memory 240 may be a repository for metadata and other types of data that may be needed to provide the database management services (the terms database management services, database services, and the like are used interchangeably herein).

Further, the database management system 205 may be configured to handle a variety of database engine types. For example, in some embodiments, the database management system 205 may be configured to manage PostgreSQL, Oracle, Microsoft SQL server, and MySQL database engine types. In other embodiments, the database management system 205 may be configured to manage other or additional database engine types. Each database that is provisioned (e.g., created or registered) within the database system 200 may be of a particular "database engine type." The database engine type may identify the type of database management system (e.g., Oracle, PostgreSQL, etc.) of a particular database. By virtue of creating or registering a database with a particular database engine type, that database is managed in accordance with the rules of that database engine type. Thus, the database management system 205 is configured to be operable with and manage databases associated with a variety of database engine types.

It is to be understood that only some components of the database management system 205 are shown and discussed herein. In other embodiments, the database management system 205 may also include other components that are considered necessary or desirable in implementing the various database management services discussed herein. Similarly, the database provisioning system 220 and the database protection system 225 may have components that are considered necessary or desirable in implementing the various database management services discussed herein.

Referring still to FIG. 2, the database storage system 215 may include a source database storage 245 and a target database storage 250. The source database storage 245 may be configured to store the original instances of the databases (also referred to herein as source databases) that are created within or registered with the database system 200. In some embodiments, the source database storage 245 may also be configured to store restored databases of the source databases. The target database storage 250 may be configured to store the clones of the source databases (also referred to herein as cloned databases).

In some embodiments, the source database storage 245 and the target database storage 250 may be provisioned from the storage pool 170 and may include virtual disk storage that is associated with the database virtual machines (e.g., the database virtual machines 120, the database virtual machines 135, the database virtual machines 150) on which the database system 200, the source databases, and the cloned databases reside. For example, in some embodiments, the source database storage 245 may be associated with one or more source database virtual machines (referred to herein as source database virtual machines or source database server virtual machines) and the source databases stored within the source database storage may be stored within the virtual disks associated with the source database virtual machines. Similarly, in some embodiments, the target database storage 250 may be associated with one or more database virtual machines (referred to herein as target database virtual machines or target database server virtual machines) and the databases stored within the target database storage may be stored within the virtual disks associated with the target database virtual machines. In some embodiments, one or more source databases and/or one or more cloned databases may be stored on a cloud. In some embodiments, each source database virtual machine may be configured to store one or more source databases and each target database virtual machine may be configured to store one or more target databases. In other embodiments, the source database storage 245 and the target database storage 250 may additionally or alternatively be provisioned from other types of storage associated with the database system 200.

Further, depending upon the size of a particular database and the size of the storage space associated with a particular source database virtual machine, a source database may be stored in its entirety on a single source database virtual machine or may span multiple source database virtual machines. Further, as the size of that source database increases, the source database may be moved to another source database virtual machine, may be stored onto multiple source database virtual machines, and/or additional storage space may be provisioned to the source database virtual machines to house the increased size of the source database. Similarly, depending upon the size of a cloned database and the size of the storage space associated with a particular target database virtual machine, the cloned database may be stored on a single or multiple target database virtual machines. Further, as the size of the cloned database increases, the cloned database may be moved to another target database virtual machine of appropriate size, may be divided amongst multiple target database virtual machines, and/or additional storage space may be provisioned to the target database virtual machine. Thus, the database storage system 215 is structured with the flexibility to expand and adapt to accommodate databases of various sizes.

Additionally, in some embodiments, the databases of the source database storage 245 and/or the target database storage 250 may be stored on a single cluster or span across multiple clusters. For example, in some embodiments, the databases of the source database storage 245 may span across a first set of clusters and the databases of the target database storage 250 may span across a second set of clusters. In some embodiments, the source databases and the cloned databases may be stored on separate designated clusters. In other embodiments, a cluster may be configured to store both source and cloned databases.

For example, in some embodiments, the source database storage 245 may be associated with a first cluster and the target database storage 250 may be associated with a second cluster. The first cluster and the second cluster may be part of the same datacenter, part of separate datacenters located in the same location (e.g., same city, same state, same country, same continent, etc.) or generally close to one another (e.g., within a designated distance), may be part of a cloud (e.g., public or private cloud), and/or located in geographically different locations (e.g., different cities, different states, different countries, different continents, etc.).

Additionally, as indicated above, in response to the user request for a copy data management service, the database management system 205 may activate the database protection system 225. The database protection system 225 is configured to protect databases associated with the database system 200. During creation or registration of a database with the database system 200, an instance of the database protection system 225 may be created for that database. In some embodiments, the database protection system 225 is referred to as a "time machine" and provides a mechanism to achieve/facilitate copy data management services. In particular, in some embodiments, the "time machine" takes automated database backups, creates copies (e.g., clones) of these databases (e.g., from the backups) for various purposes like testing, staging, etc., as well as provide a way to manage the backups and copies with ease.

Thus, upon the creation or registration of a database with the database system 200, that database may be protected by the associated instance of the database protection system 225. Thus, the database protection system 225 may include multiple instances of the database protection system (e.g., multiple instances of time machines)—one for each database that is created or registered within the database system 200. Each instance of the database protection system 225 may receive a variety of user defined constraints in accordance with which the associated database is protected. Each database protection system instance may be associated with a source database stored within the source database storage 245 and may be configured to protect that source database. By virtue of having a database protection system instance for each source database, the protection of each of those source databases may be customized and tailored to suit the user's needs.

To protect a source database stored within the source database storage 245, the associated database protection system instance may take snapshots and transactional logs of that source database. The snapshots and transactional logs may be used to create clones of that source database (e.g., upon receiving a user request to create a clone). A clone of the source database (e.g., the cloned database) may be stored within the target database storage 250. One or more cloned databases may be created from each source database.

A cloned database may be considered operationally same (or substantially similar) to the source database from which it is created. The cloned database may be refreshed/updated to incorporate any changes that may have occurred in the source database since the cloned database was created. In some embodiments, the operations that are performed on the source database may be performed on the cloned database as well. Thus, in some embodiments, instead of using the source database, the cloned database may be used for performing operations (e.g., analyzing data). The cloned database may be created from snapshots and transactional logs captured from the source database. In some embodiments, the cloned database may be created upon receiving a user request. The user may request to clone a particular a source database to a point in time or to a specific snapshot. For example, the user may request a cloned database of a particular source database as that source database existed at 11:00 AM on a particular date. Alternatively, the user may specifically identify a snapshot and request a cloned database of the source database based on that snapshot. Creating a cloned database may involve replicating a state of the source database. The "state" of the source database may include the configuration of the source database, the user data stored within the source database, metadata stored within the source database, and any other information associated with the source database. In other words, a cloned database may be an exact or substantially exact copy of the source database.

Thus, upon receiving a user request to create a cloned database from a source database, the time machine associated with that source database may retrieve snapshots and transactional logs of the source database from a repository where the snapshots and transactional logs are stored. If the user request is to clone the source database to a point in time, the time machine associated with that source database may retrieve all snapshots and transactional logs captured of the source database at that point in time (or up to that point in time) and create a cloned database from those snapshots and transactional logs. The cloned database represents the state of the source database at the requested point in time. If the user request is to clone the source database based on a particular available snapshot, the time machine associated with that source database may retrieve that particular snapshot and create a cloned database from that particular snapshot. The cloned database represents the state of the source database at the time the requested snapshot was captured.

Figure 3:
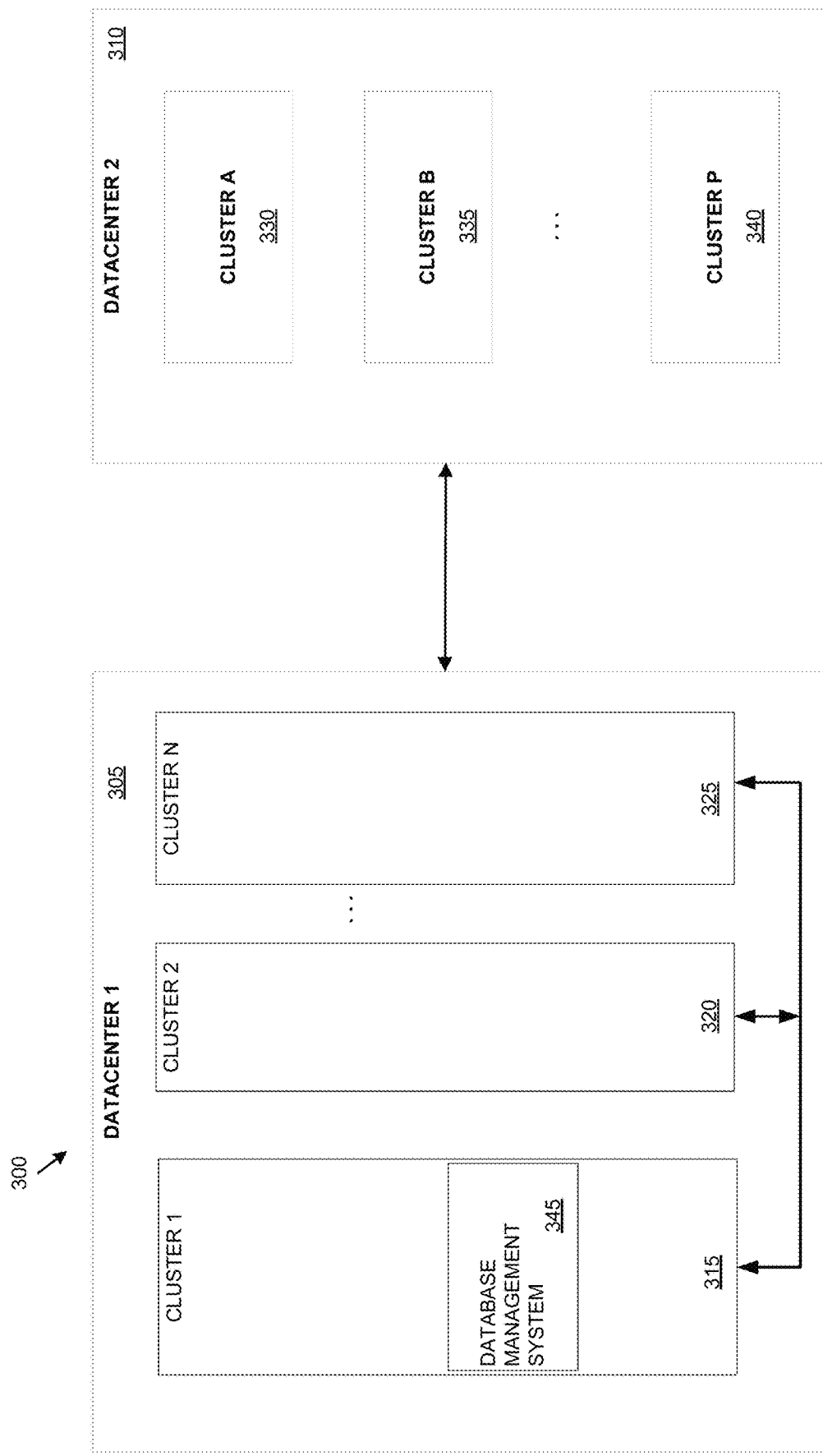
FIG. 3 is an example block diagram showing additional details of the multi-cluster configuration in the virtual computing system of FIG. 1, in accordance with some embodiments of the present disclosure.

Turning to FIG. 3, an example block diagram showing a multi-cluster configuration of a database system 300 is shown, in accordance with some embodiments of the present disclosure. Although not shown, the database system 300 is intended to include or be associated with the elements discussed above in FIG. 2. For example, the database system 300 may include an API, a dashboard, a database management system, and a database storage system, as discussed above in FIG. 2. The database system 300 may also be configured to provide various database management services.

In some embodiments, the database system 300 may be configured to manage databases spread across multiple clusters. The multiple clusters may be located on a single datacenter or spread across multiple datacenters. For example, and as shown in FIG. 3, the database system 300 may include a datacenter 305 and a datacenter 310. Although only two datacenters are shown in FIG. 3, the database system 300 may include a single datacenter or more than two datacenters.

In some embodiments, the datacenters 305 and 310 may be geographically located in the same location, while in other embodiments, those datacenters may be in different geographical locations. For example, in some embodiments, the datacenters 305 and 310 may be located in the same or different cities, same or different states, same or different countries, same or different continents, etc. The term "geographical location" may be defined based on any physical features of an area. The database system 300 may, thus, be configured to manage databases stored in the datacenters 305 and 310. In some embodiments, the datacenter 305 and the datacenter 310 may be part of one or more availability zones and/or all-availability groups.

Each of the datacenters 305 and 310 may include one or more clusters. For example, the datacenter 305 may include clusters 315, 320, 325, while the datacenter 310 may include clusters 330, 335, 340. Although each of the datacenters 305 and 310 is shown as having three respective clusters, in other embodiments, each of those datacenters may have less than three or greater than three clusters. Further, each of the clusters 315-340 may be similar to the cluster 100. The database management services of the database system 300 may be provided by a database management system 345. In some embodiments, the database management system 345 may reside on one datacenter (e.g., the datacenter 305, as shown in FIG. 3) and may be configured to manage the databases located on the datacenter 305, as well as the datacenter 310. For example, the database management system 345 may be configured to manage databases (whether source, cloned, etc.) located on the clusters 315, 320, 325 of the datacenter 305. Similarly, the database management system 345 may be configured to manage databases (whether source, cloned, etc.) located on the clusters 330, 335, 340 of the datacenter 310.

In some embodiments, the database management system 345 may include a server (e.g., controller), as well as an agent located on each of the clusters 315-340 that facilitates communication between the database management system and the databases residing on those clusters. The database management system 345 may be configured similar to the database management system 205 in that the database management system 345 may communicate via an API with a dashboard and be associated with a database storage system, as discussed above in FIG. 2. Thus, the database management system 345 is not described again.

By provisioning/replicating databases across multiple datacenters (e.g., the datacenters 305, 310) and having the database management system 345 manage those databases across the multiple datacenters, the database system 300 provides resiliency against datacenter and regional failures. The database system 300 also improves quality of service. For example, consider a database running on a datacenter (e.g., the datacenter 305) located in New York. If that database is being accessed by a user located in San Francisco, that user in San Francisco experiences a significant latency while accessing the database located in New York. To improve performance, a cluster (e.g., on the datacenter 310) may be created in San Francisco. Thus, by being able to provision databases across multiple clusters and multiple datacenters, the database can be provisioned such that copies of the same database resides on two nodes (e.g., a two-node database) where one node is located in a cluster of the datacenter located in New York and the other node is located in a cluster of the datacenter located in San Francisco. Both nodes may be managed by the same instance of the database management system 345. Thus, by providing the ability to provision databases across datacenters, while providing a single point of management of all those databases, users may access the database from the node closest to them for better quality of service.

Further, in some embodiments, cloned databases, copies of the source databases, snapshots of the source and/or cloned databases, and/or transactional logs of the source and/or cloned databases may be stored in either or both of the datacenters 305 and 310 to provide high availability, back-up and restore capabilities, and to otherwise protect the databases.

Figure 4:
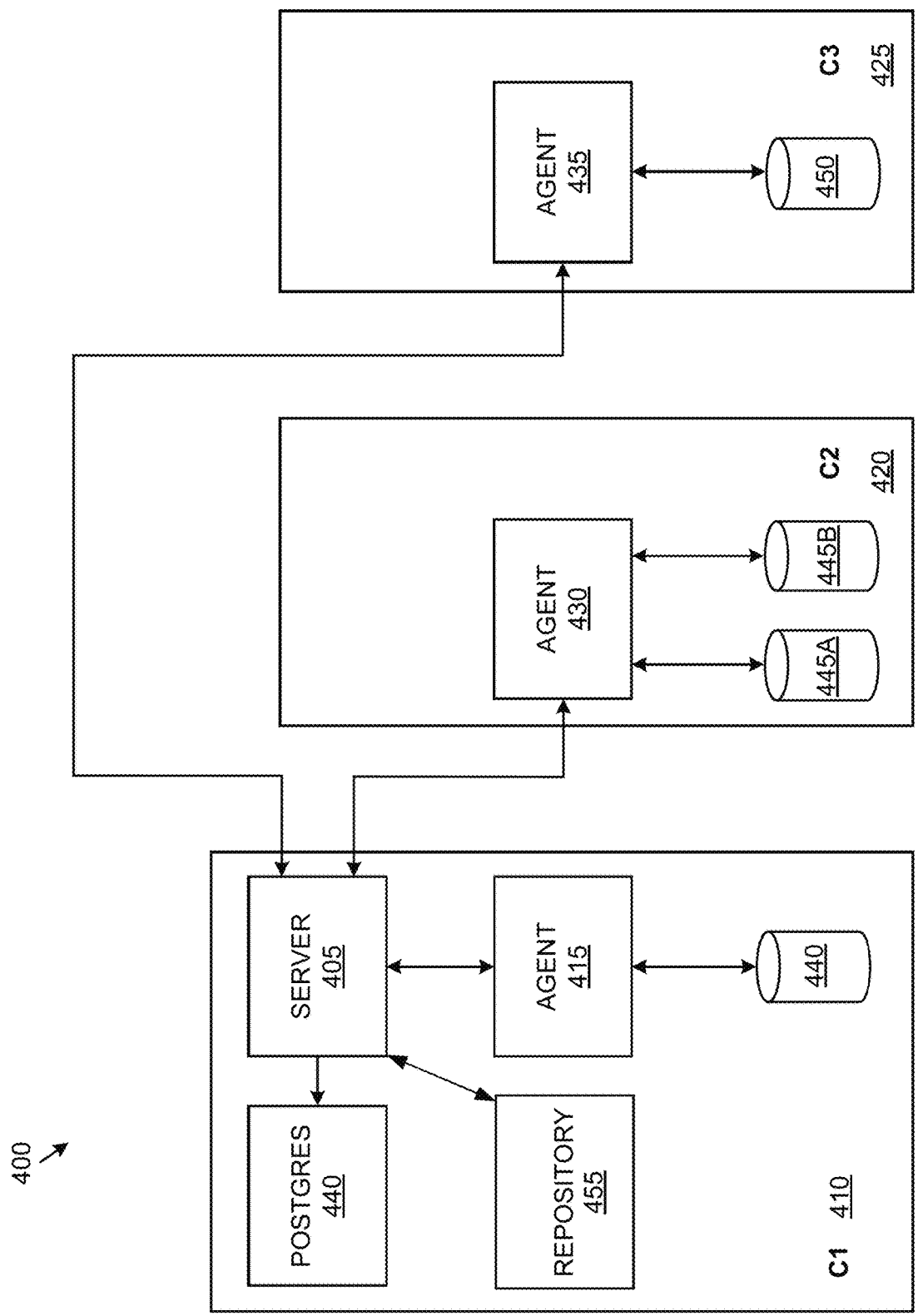
FIG. 4 is an example block diagram showing additional details of the database management system in the multi-cluster configuration of FIG. 3, in accordance with some embodiments of the present disclosure.

Referring now to FIG. 4, additional details of a database management system 400 are shown, in accordance with some embodiments of the present disclosure. The database management system 400 is similar to the database management systems 205, 345. As indicated above, the database management system may be configured to manage databases stored across multiple clusters. To manage databases spanning multiple clusters, the database management system 400 may be implemented in a multi-cluster configuration (e.g., a master-slave/leader-follower configuration or a multi-master configuration). For example, in some embodiments, the database management system 400 may include a server 405 that resides on a cluster 410. The database management system 400 may also include a plurality of agents that reside on each cluster that the database management system is intended to manage. For example, and as shown in FIG. 4, the cluster 410 may include an agent 415 that communicates with the server 405. Similarly, clusters 420 and 425 may each have an agent 430 and 435, respectively, that communicates with the server 405. Although only three clusters are shown in FIG. 4, it is to be understood that the server 405 may be configured to manage greater than or fewer than three clusters. Further, the clusters 410-425 may be part of the same datacenter or different datacenters. Each cluster that is intended to be managed by the server 405 may have an agent installed thereon to facilitate communication between the server and the cluster on which that particular agent is installed.

The agent 415 may serve as an intermediary between the server 405 and database 440 on the cluster 410. The agent 430 may serve as an intermediary between the server 405 and databases 445A and 445B stored on the cluster 420, while the agent 435 may serve as an intermediary between the server and database 450 stored on the cluster 425. Although the databases 440 and 450 are shown to include a single database and the databases 445A and 445B are shown to include two databases, the number of databases that each of the agents 415, 430, 435 may be associated with may vary. Further, in some embodiments, one or more of the databases 440-450 may be different databases. In other embodiments, one or more of the databases 440-450 may be copies or clones of each other. For example, in some embodiments, the database 450 may be a copy of the database 440 (e.g., to provide high availability). In yet other embodiments, a particular database may be spread across multiple clusters. For example, in some embodiments, the databases 440 and 450 may each be a portion of a large database that is split across multiple clusters. The databases 440-450 may be part of the database storage system 215 and may be configured as described above in FIG. 2.

A multi-cluster configuration may also include a repository 455 (e.g., a storage for storing metadata and other data needed to manage the various databases (e.g., the databases 440, 445, 450) and the agents 415, 430, 435). Thus, a multi-cluster configuration may include a repository (e.g., the repository 455), a server (e.g., the server 405), API (e.g., the API 230—not shown in FIG. 4), a common driver (e.g., the agents 415, 430, 435), and database engines and associated drivers 460. Although the data engine type shown in FIG. 4 is Postgres, in other embodiments, other database engine types may be used. Generally speaking, the database management system 400 may be configured to manage various database engine types. Thus, for each database engine type handled by the database management system 400, associated drivers (e.g., similar to the drivers 460) may be provided on the cluster 410 to provide the protocols for managing databases of that database engine type.

The server 405 may be located on a virtual machine on the cluster 410 and the common drivers (e.g., the agents) may be distributed across the various clusters such that the common drivers are able to interact independently with the server. The server 405 may host the API (e.g., the API 230) and interacts with the repository 455. Although the repository 455 is located on the cluster 410, in some embodiments, the repository may be located on the clusters 420 or 425, and the server 405 may access the repository through the agents 430 and 435, respectively, located om those clusters. The server 405 may be configured as software, hardware, firmware, or a combination thereof. Although not shown, the server 405 may be associated with a processor (e.g., the processor 235) and a memory (e.g., the memory 240) for performing the functions described herein.

In some embodiments, the server 405 may include two components: (1) an application server (e.g., Apache Tomcat) that serves the API (e.g., the API 230) and the GUI (e.g., the dashboard 210), and (2) the repository 455 to store "state" information of the databases 440, 445, and 450, as well as any other information that may be needed in managing the agents 415, 430, 435 and the databases 440-450. In some embodiments, the repository may be called the "data-tier" and the application server may be called a "mid-tier."

In some embodiments, the agents 415, 430, and 435 may be configured as software, hardware, firmware, or a combination thereof. Each of the agents 415, 430, and 435 may, in some embodiments, be an autonomous software program that is configured for performing one or more specific and approved operations. The agents 415, 430, 435 may be associated with resources (e.g., CPU, memory, etc.) on the cluster that they reside on. In some embodiments, the agents 415, 430, and 435 may be installed on a virtual machine of the cluster that they reside on. For example, the agent 415 may reside on a virtual machine on the cluster 410. In some embodiments, the agent 415 may reside on a virtual machine that is different from the virtual machine on which the server 405 resides. In some embodiments, the agents 415, 430, 435 may be configured to perform operations under control by the server 405. Thus, the agents 415, 430, 435 may be mostly "stateless."

The agents 415, 430, 435 interact with the server 405 to pick up work and execute. In other words, the server 405 sends requests or instructions to the agents 415, 430, 435 for operations or tasks to be performed by those agents. Upon receiving the instructions from the server 405, a respective one of the agents 415, 430, 435 that receives those instructions may perform the requested tasks or operations by calling an appropriate script based on the type of work needed. For example, to create a clone of a database, the agent may invoke a cloning script. As another example, the agents 415, 430, 435 may also be requested to gather transactional logs (also referred to herein as logs or log drives) for replicating and/or protecting databases. Upon completing their assigned task(s), the agents 415, 430, 435 may respond back to the server 405 indicating that the tasks or operations are completed and wait to receive the next task or operation from the server. Example operations that each of the agents 415, 430, 435 may perform may include database provisioning, database server provisioning (e.g., creating a database server virtual machine), database cloning, database server cloning (e.g., cloning a database server virtual machine), registering a database, registering a database server virtual machine, copy log operations, resiliency and curation operations, profile (e.g., network, software, compute, etc.) creation, capturing snapshots, cleanup operations, etc.

In some embodiments, each of the agents 415, 430, 435 may have a process running thereon that may regularly (e.g., every 10 seconds) poll the server 405 for any tasks or operations to be performed. If the server 405 determines that a task or operation is needed, the server may send instructions to that polling agent. In some embodiments, the agents 415, 430, 435 may poll the server 405 by calling an API on the server. In other embodiments, the agents 415, 430, 435 may use other mechanisms to poll the server 405.

As indicated above, in some embodiments, the multi-cluster configuration may be configured either as a leader-follower model or a multi-master model. In a leader-follower model, the server of a single-cluster architecture may be split into the server 405 and the agent 415. Upon splitting, additional agents on additional clusters may be deployed.

The server 405 interacts with the repository 455, either directly or through the agent 415. The server 405 may be considered "stateful." The agent 415 (as well as the agents 430, 435) may be considered "stateless," as noted above, and may be configured to run the driver code, as discussed above. Thus, in a leader-follower model, a single server (e.g., the server 405) serves as the leader and each of the agents 415, 430, 435 serves as a follower. The leader sends requests to the followers and the followers perform operations to satisfy the requests. Thus, the followers operate under control of the leader. All user requests are directed to the server 405 and the server then allocates the requests to an appropriate one or more of the agents 415, 430, 435. For example, to service a request from the databases 445A, the user may send a request to the server 405, which may then forward that request to the agent 430. The agent 430 may fulfil that request from the databases 445A and send a response back to the server 405. The server 405 may then respond back to the user.

In a multi-master model, multiple instances of the server 405 may be provided. For example, in some embodiments, an instance of the server 405 may be run on each cluster (e.g., the clusters 410, 420, 425) that is part of the multi-cluster configuration. Each instance of the server may be associated with an agent. For example, each of the clusters 410, 420, and 425 may be configured similar to the cluster 410 having the server 405, the agent 415, the repository 455, and the drivers 460. The server on each cluster may control the agent located on that same cluster. In some embodiments, a leader server may be selected from all the servers. In some embodiments, a single instance of the repository 455 may be provided and controlled by the leader server. To service requests, in some embodiments, a user may send a request to the server located on the cluster from which the request is to be serviced. In other embodiments, a user may send a request to the leader server and the leader server may forward the request to the server on the cluster from which the request is to be serviced.

It is to be understood that only some elements of the database management system 400 are shown herein. The database management system 400 may include other or additional elements that may be needed or considered desirable to have in performing the functions described herein. Further, it is to be understood that the configuration of the various clusters in the multi-cluster configuration may vary from one another. For example, in some embodiments, the various clusters in the multi-luster configuration may have different hypervisors. Thus, the multi-cluster configuration may be considered hypervisor agnostic. Similarly, other features may vary between clusters of a multi-cluster configuration.

Figure 5:
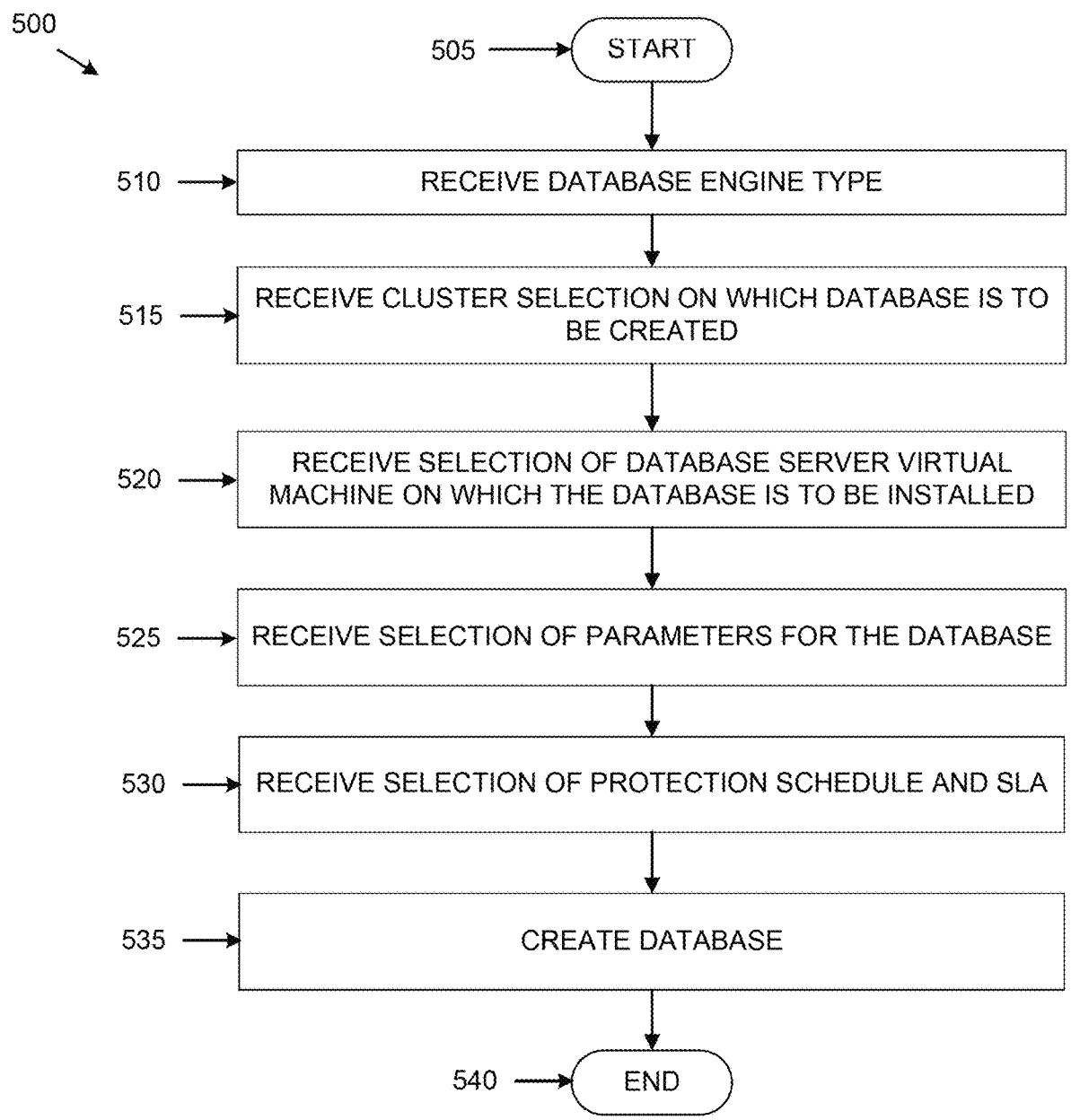
FIG. 5 is an example flowchart outlining operations for provisioning a database in the multi-cluster configuration of FIG. 4, in accordance with some embodiments of the present disclosure.
Figure 6A:
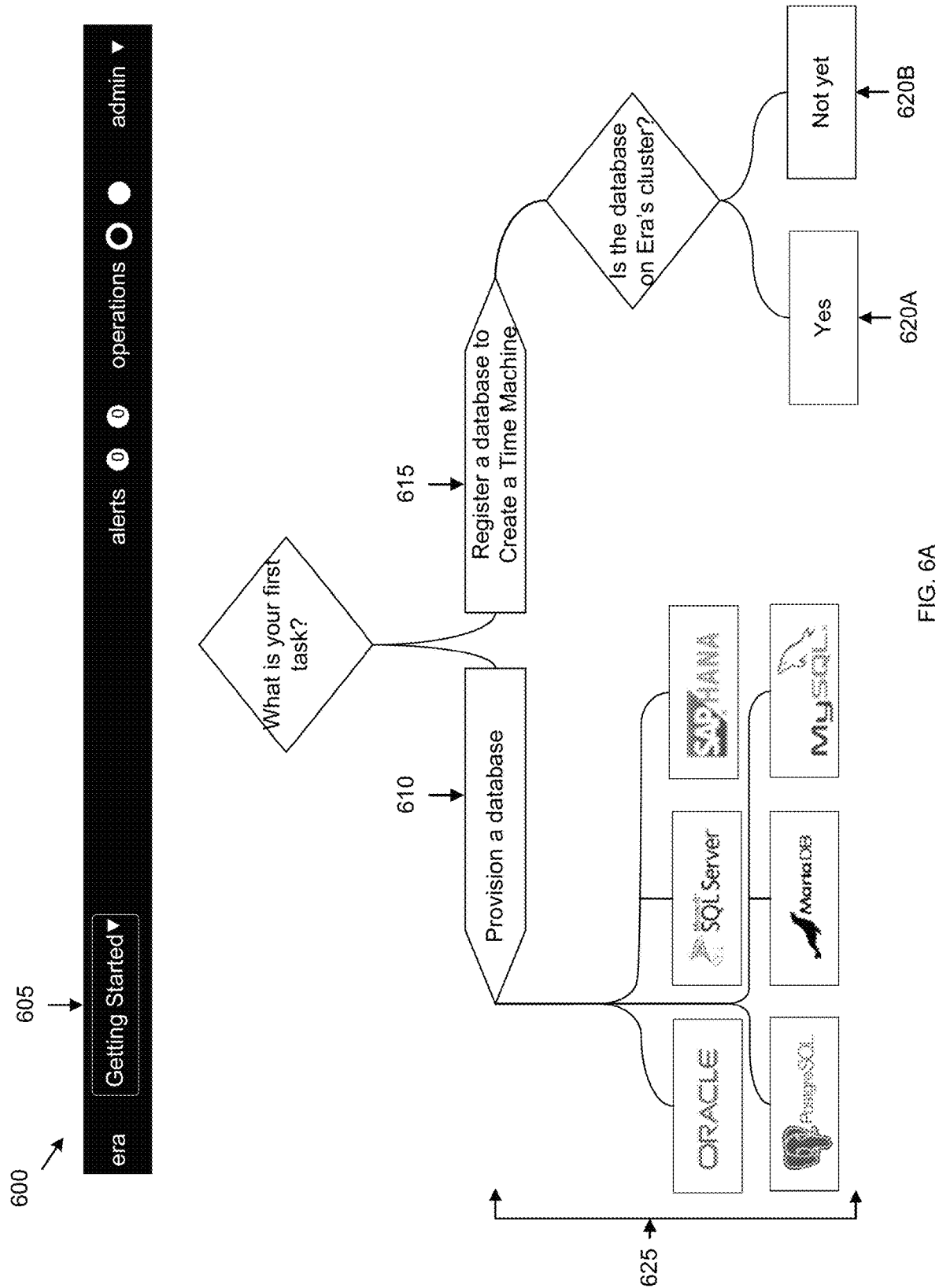
FIGS. 6A-6D are example user interfaces showing database provisioning of FIG. 5, in accordance with some embodiments of the present disclosure.
Figure 6B:
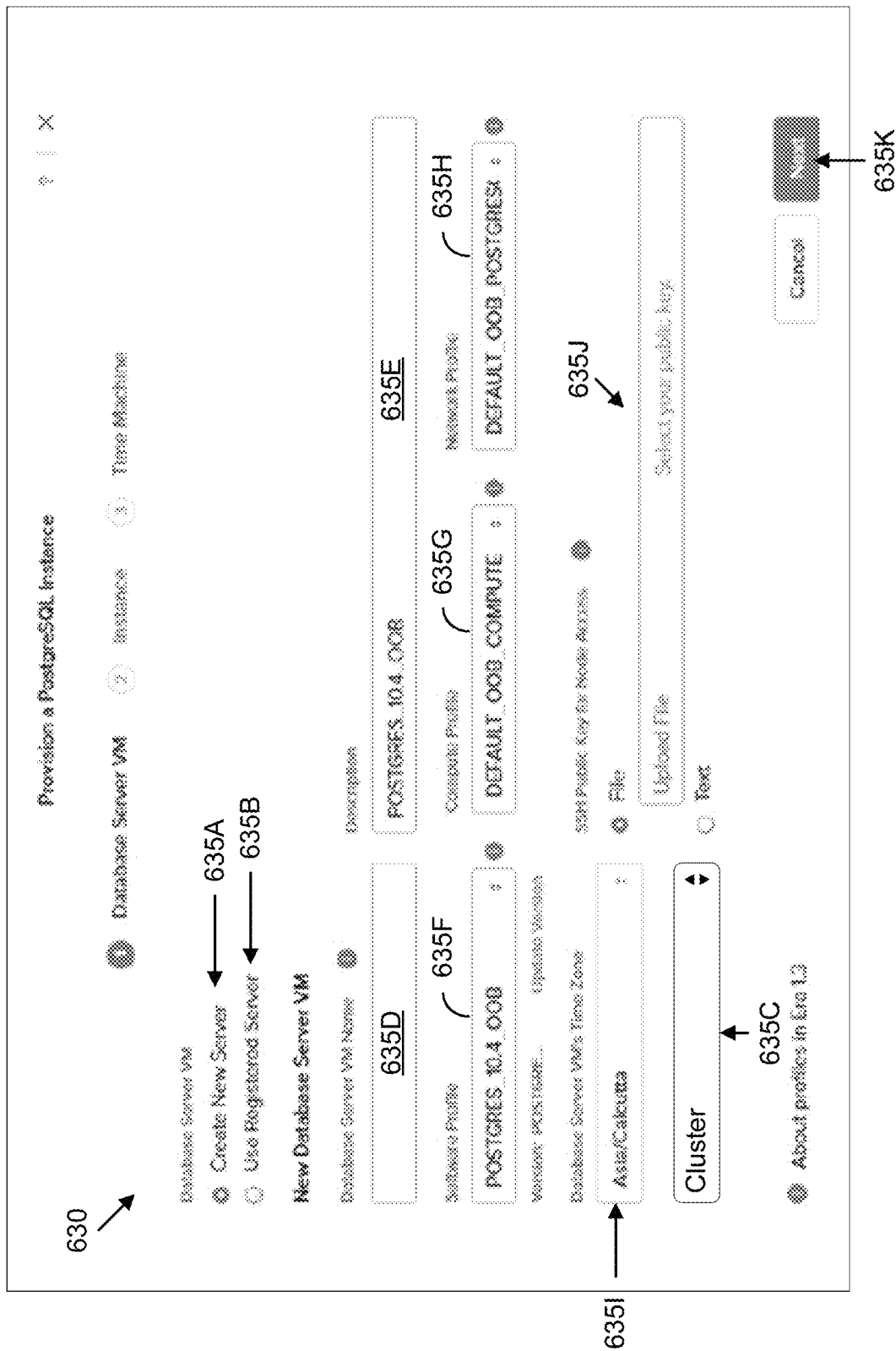
Figure 6C:
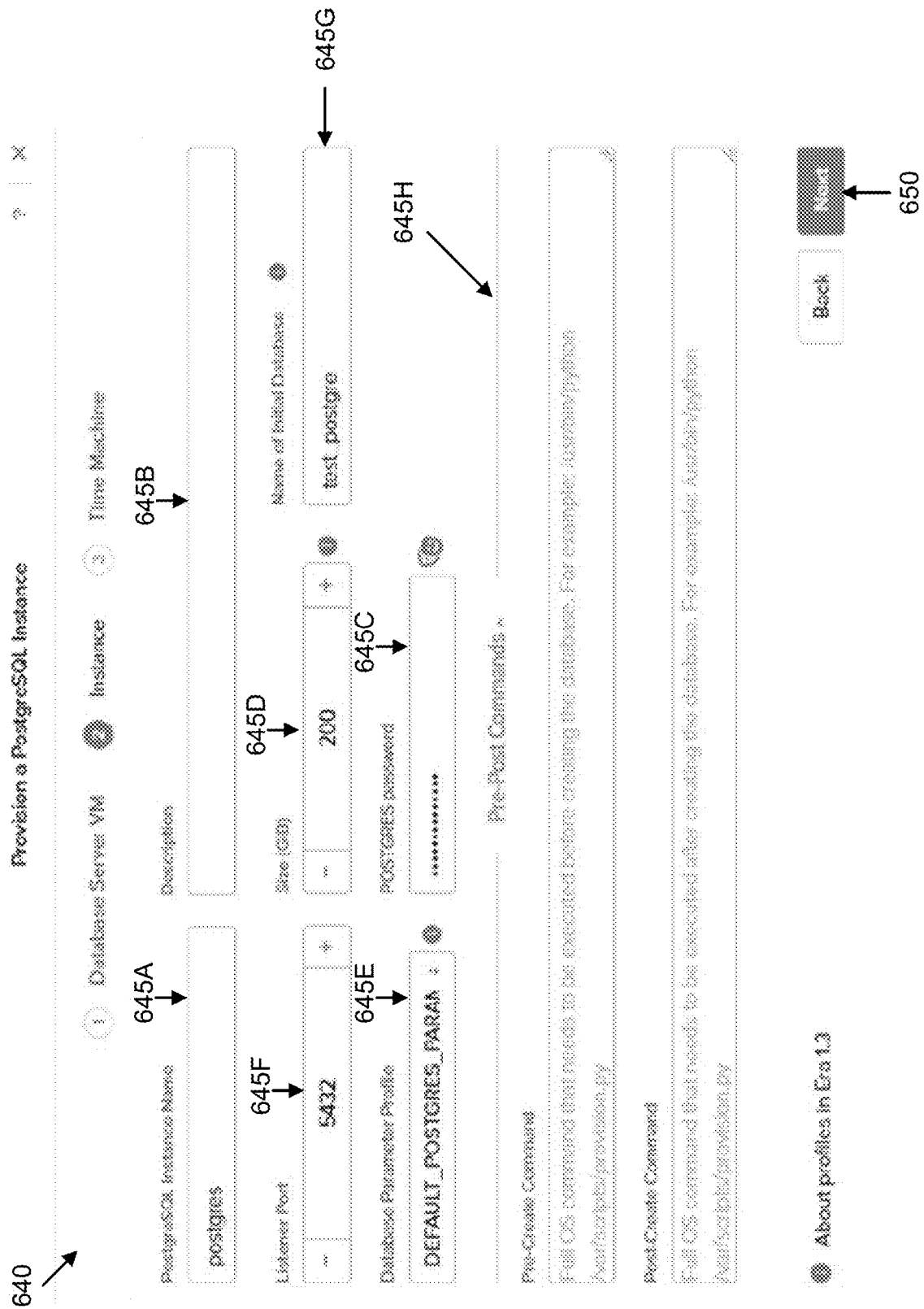
Figure 6D:
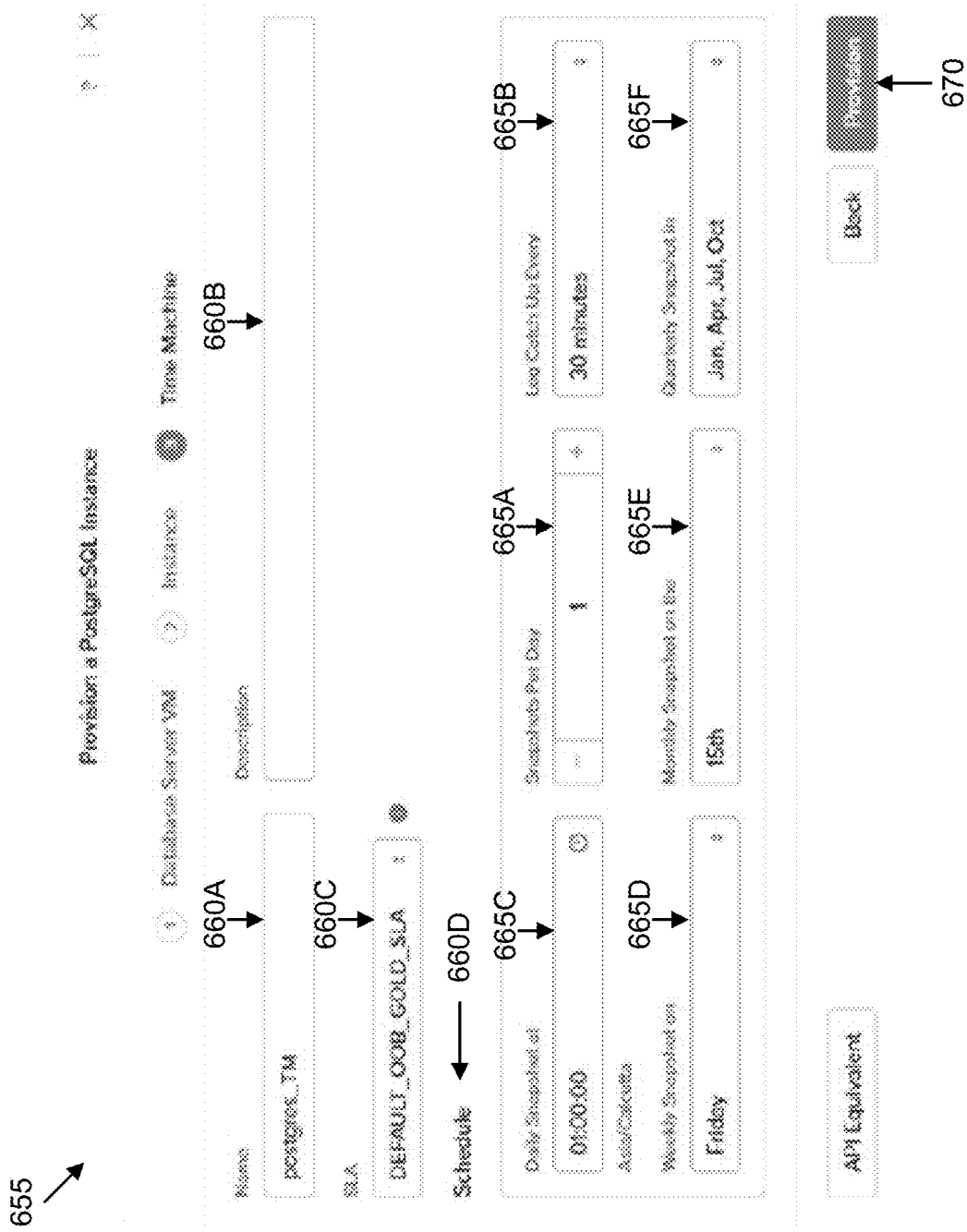

Turning now to FIG. 5, an example flow chart outlining operations of a process 500 is shown, in accordance with some embodiments of the present disclosure. The process 500 may include other or additional operations, depending on the particular embodiment. The process 500 may be used to implement database provisioning services in a multi-cluster configuration. Thus, the process 500 may be used to create a new database in the database management system 400. The process 500 is discussed in conjunction with FIGS. 2 and 4 and is implemented by the database provisioning system 220 in conjunction with the dashboard 210. Specifically, the database provisioning system 220 receives inputs from the user via the dashboard 210 and performs operations in response to those inputs for creating a new database. More specifically, the server 405 receives the inputs and instructs one or more of the agents 415, 430, 435 to perform the operations for creating the database. The newly created database is referred to herein as a source database.

Thus, the process 500 starts at operation 505 with the server 405 receiving a user request via the dashboard 210 for creating a new database. Specifically, once the database system 200 is installed and the user is able to access the dashboard 210, the dashboard may present an option to create a new database. If the user desires to create a new database, the user may select a database creation option from the dashboard 210 and send inputs to the server 405. The server 405 may present one or more user interfaces to the user for soliciting various data for creating a new database.

For example, at operation 510, the server 405 receives selection of a database engine type. In some embodiments, the server 405 may present, via the dashboard 210, a user interface for requesting the database engine type of the database to be created. The dashboard 210 may present the available database engine types that are supported by the server 405. The user may select one of the various database engine types presented on the dashboard 210. As noted above, the database engine type defines the rules and protocols to be applied to the database being created. For example, if the user desires to create a database with the database engine type Oracle, and if Oracle is presented as an option on the dashboard at the operation 510, the user may select Oracle on the dashboard.

In some embodiments, the server 405 may configure the remaining user interfaces that are presented to the user on the dashboard 210 based on the database engine type selected by the user at the operation 510. For example, in some embodiments, if the user selected Oracle as the database engine type at the operation 510, the server 405 may configure the remaining database creation process to solicit data that is needed for creating an Oracle database. Thus, in some embodiments, at operations 515-535, the server 405 presents one or more user interfaces to the user, via the dashboard 210, for requesting a variety of selections for creating a new database. In some embodiments, the data collected at the operations 515-535 may be tailored to the database engine type selected at the operation 510.

At the operation 515, the server 405 receives a selection of one or more clusters on which the database is to be created or registered. In some embodiments, the user may desire to create the database on one or more nodes of a single cluster of a multi-cluster configuration. In such embodiments, the user may input the cluster (e.g., by identifying an identity of the cluster, by providing a network information (e.g., network profile) of the cluster, selecting a cluster from a list of available clusters, etc.) into the dashboard 210. In other embodiments, the user may desire to create the database on one or more nodes that are spread across multiple clusters of the multi-cluster configuration. In such embodiments, the user may input (e.g., by identifying an identity of the cluster, by providing a network information of the cluster, selecting a cluster from a list of available clusters, etc.), via the dashboard 210, each of the clusters where the source database is to reside.

For example, if the user desires to create a 3-node database, in some embodiments, the user may desire to have all the 3 nodes on a single cluster. In this case, the user may select a single cluster for the database and designate three database server virtual machines on three separate nodes of that cluster for the database. In other embodiments, the user may desire to have each of the 3 nodes on a separate cluster. In such embodiments, the user may select three clusters and designate a database server virtual machine on each of the 3 clusters for the database.

In addition to receiving the cluster(s) selection, the server 405 receives selection of one or more database server virtual machines on which the database is to be created at the operation 520. In some embodiments, the user may designate an existing database server virtual machine for the database being created. In some embodiments, the server 405 may present a list of existing database server virtual machines created previously and that have space available to receive the database being created. The user may select one or more database server virtual machines from the list. The server 405 may facilitate the user selection of an existing database server virtual machine in other manners (e.g., by allowing the user to browse to a location, etc.).

In other embodiments, the user may create a new database server virtual machine. As indicated above, a database server virtual machine is a virtual machine on which the created database resides. In other words, the database server virtual machine may be associated with a storage device (e.g., virtual disk(s)) and the created database may be stored within that storage device and accessible via the database server virtual machine. If the user desires to create a new database server virtual machine for the database, the server 405 requests additional details from the user for creating the database server virtual machine at the operation 525.

For example, the server 405 may request information for a software profile, a network profile, a compute profile, and a database parameter profile for creating the database server virtual machine. In other embodiments, the server 405 may request other or additional types of information from the user for creating the database server virtual machine. In some embodiments, the server 405 may present one or more standardized profiles for one or more of the software profiles, network profile, compute profile, and database parameter profile. The user may select from the standardized profiles in some embodiments. In some embodiments, the server 405 may also allow the user to modify a standardized profile and/or create new profiles from scratch based upon the user's preferences.

A software profile defines the software and operating system parameters for the database engine type that is selected at the operation 510. For example, if at the operation 510, the database engine type is selected as PostgreSQL, the software profile may include one or more software and operations system image profiles associated with PostgreSQL. Each software profile may define the rules that are to be applied in managing the database being created. In some embodiments, one or more sample software profiles may be available for the user to select. In other embodiments, the user may create their own custom software profile or modify an existing software profile to suit their needs. When creating their own custom software profile or modifying an existing software profile, in some embodiments, the user may be required to create/modify the software profile before starting the process 500, while in other embodiments, the user may be able to create the custom software profile as part of the operation 525. In some embodiments, the same software profile may be replicated and applied to each cluster on which the source database is to exist. In other embodiments, the user may provide a separate software profile for each cluster.

A network profile identifies the network location of the cluster and/or the database server virtual machine. Similar to the software profile, the server 405 may make a sample network profile available for the user to select. Alternatively, the user may create a new network profile or modify an existing network profile either before starting the process 500 or during the operation 525. In some embodiments, the user may need to provide a network profile for each cluster and/or each database server on which the source database is to reside. Unlike the software profile, in some embodiments, the network profile may not be replicated to each cluster, and thus, may need to be provided for each cluster.

A compute profile defines the size/configuration of the database server. For example, the compute profile may define the number of vCPUs, number of cores per vCPU, and memory capacity to be associated with the database server. In other embodiments, the compute profile may define other or additional configurational parameters. In some embodiments, the compute profile may be replicated across the various clusters. In other embodiments, the user may provide a separate compute profile for each cluster.

At the operation 525, the server 405 may also request the database parameter profile from the user. The database parameter profile defines the custom parameters that are applied to the database being created. Again, the server 405 may make sample compute profiles and/or a sample database parameter profiles available for the user to select in some embodiments. Alternatively, the user may create custom compute and/or database parameter profiles or modify existing compute and/or database parameter profiles, either before starting the process 500 or during the operation 525. The database parameter profile may be replicated across the clusters or the user may provide a separate profile for each cluster.

In some embodiments, the server 405 may pre-select a default option for the user for one or more of the software profiles, compute profile, network profile, and the database parameter profile. The server 405 may allow the user to change the default options by selecting another standardized option, modifying a standardized option, or creating a new profile. Thus, at the operation 525, the server 405 receives selection of the various parameters for creating a new database server on each of the selected cluster(s).

The server 405 may also request additional parameters (e.g., configurational details) for the database being created. For example, the server 405 may request a database name and a description of the database being created to distinguish that database from other databases within the database system 200. The server 405 may also request a database password to restrict access to the database to only authorized users, a database size to determine how much storage space is needed for storing that base, and/or any additional or other parameters that may be considered necessary or desirable in creating the database. In some embodiments, certain default values may be pre-selected for the user and the user may be allowed to change those values.

At the operation 530, the server 405 may also present one or more user interfaces, via the dashboard 210, to request selection of parameters for creating an instance of a database protection system (e.g., the database protection system 225) for the database being created by the process 500. In some embodiments, the database protection system 225 may be associated after creating a source database. Thus, in some embodiments, the operation 530 may be optional. The database protection system 225 may also be referred to as a "time machine" and may be used to protect databases. To create a time machine, the server 405 may request a name and description for the time machine, a level of a Service Level Agreement ("SLA"), and a protection schedule to define rules based on which the time machine operates. The SLA and the protection schedule may be considered a first policy of the source database.

An SLA is an agreement between a service provider (e.g., the owner of the database system 200) and the user (e.g., the owner of the database) that outlines, among other things, the protection scope of the database. The protection scope defines for how long data from the database being created or registered is retained. Thus, the protection scope defines the database retention policy. In some embodiments, the SLA may define various protection parameters such as continuous, daily, weekly, monthly, quarterly, or yearly protection parameters for determining the protection scope of the database being created/registered. In other embodiments, the SLA may define other or additional protection parameters.

Each database for which an instance of the time machine is created may be protected by capturing snapshots and/or transactional logs. The number of snapshots and transactional logs to be captured on each day may be defined by the user in the protection schedule. As used herein, a "day" may be any 24-hour period (e.g., from midnight to Noon). In some embodiments, the protection schedule may define default values to define the frequency of capturing snapshots and transactional logs, which the user may modify. Thus, based upon the frequency of capturing snapshots and transactional logs defined in the protection schedule, the instance of the database protection system 225 may be configured to capture one or more snapshots and one or more transactional logs each day. Generally speaking, the number of transactional logs that are captured each day may be higher than the number of snapshots that are captured on that day. Since it is impractical and expensive to indefinitely store the captured snapshots and the transactional logs, the protection parameters in the SLA define the duration for how long those snapshots and transactional logs are stored.

For example, the continuous protection parameter within the SLA defines the duration in days for which all captured snapshots and transactional logs are retained. For example, if the continuous protection parameter is defined as 30 days, the time machine is configured to retain all snapshots and transactional logs that are captured within the last 30 days. By retaining all snapshots and the transactional logs, the user may replicate any or substantially any state of the database (down to a second or even a fraction of a second).

The SLA may also define a daily protection parameter, which defines the duration in days for which a daily snapshot is stored. For example, if the daily protection parameter is 90 days, the time machine is configured to store a daily snapshot for 90 days after the expiration of the number of days indicated in the continuous protection parameter. The protection schedule may define the time of day to identify the snapshot that is designated as the daily snapshot. For example, if the user specifies that the snapshot captured at 11:00 AM every day is the daily snapshot and the SLA defines the daily protection parameter for 90 days, the time machine may be configured to store a daily snapshot that was captured at or closest to 11:00 AM and store the daily snapshot for 90 days.

Similarly, the SLA may define weekly, monthly, and quarterly protection parameters. A weekly protection parameter in the SLA may define the duration in weeks for which a weekly snapshot is stored after the expiration of the number of days indicated in the daily protection parameter. The protection schedule may define the day of the week to identify which snapshot is designated as the weekly snapshot. For example, if the user defines in the protection schedule that the snapshot captured on Monday is to be designated as the weekly snapshot, and the weekly protection parameter in the SLA specifies a duration of 8 weeks, the time machine may store the snapshot captured every week on Monday for 8 weeks. If multiple snapshots are captured each day, the protection schedule may also define which snapshot captured on the designated day of the week (e.g., Monday) serves as the weekly snapshot. In some embodiments, the time defined in the protection schedule for capturing a daily snapshot may be used. For example, if the protection schedule defines that the snapshot captured at 11:00 AM is the daily snapshot, and the weekly snapshot is to be captured on Monday, the instance of the database protection system 225 may store the snapshot captured at or closest to 11:00 AM every Monday as the weekly snapshot. In other embodiments, another time period may be used.

Likewise, a monthly protection parameter in the SLA may define a duration in months for which a monthly snapshot is to be stored after the expiration of the number of weeks indicated in the weekly protection parameter. The user may specify the date within the protection schedule for identifying which snapshot corresponds to the monthly snapshot. For example, the user may specify storing the snapshot captured on the $20^{th}$ of every month as the monthly snapshot in the protection schedule, and the monthly protection parameter may specify a duration of 12 months for storing the monthly snapshot. Thus, the time machine stores a monthly snapshot captured on the $20^{th}$ of every month and stores that monthly snapshot for 12 months. A quarterly protection parameter in the SLA may define a duration in quarters for which a quarterly snapshot is to be stored after the expiration of the number of months indicated in the monthly protection parameter. The user may specify in the protection schedule which months correspond to the various quarters. For example, the user may specify January, April, July, and October as the quarters and the quarterly protection parameter may specify storing the quarterly snapshots for 20 quarters. Thus, the time machine may designate a snapshot captured on the first day of January, April, July, and October (e.g., January 1, April 1, July 1, and October 1) as the quarterly snapshot and store the quarterly snapshot for 20 quarters.

It is to be understood that the various protection parameters and the protection schedules mentioned above are only examples and may vary from one embodiment to another as desired. Further, when the duration specified by a protection parameter expires, any snapshots or transactional logs that are expired (e.g., past their duration) may be deleted. As an example, if a snapshot is to be stored for 30 days, on the $31^{st}$ day, that snapshot may be deleted. Thus, each snapshot and transactional log is managed based on the SLA and protection schedule independent from other snapshots and transactional logs.

Additionally, to simplify user selection, in some embodiments, various levels of SLA may be pre-defined within the server 405. Each level of the SLA may have default values of the various protection parameters. For example, in some embodiments, the various levels of SLA may be GOLD, SILVER, BRONZE and the various protection parameters for these levels may be as follows:

| Name | Continuous | Daily | Weekly | Monthly | Quarterly |
| --- | --- | --- | --- | --- | --- |
| GOLD | 30 Days | 90 Days | 16 Weeks | 12 Months | 75 Quarters |
| SILVER | 14 Days | 60 Days | 12 Weeks | 12 Months | 0 Quarters |
| BRONZE | 7 Days | 30 Days | 8 Weeks | 6 Months | 0 Quarters |

It is to be understood that the nomenclature of the GOLD, SILVER, BRONZE levels of the SLA is only an example and the levels may be given different names in other embodiments. Further, although three levels of the SLA are described herein, in other embodiments, greater or fewer than three SLA levels may be used. Additionally, the values of the protection parameters in each level of the SLA may vary from one embodiment to another. The server 405 may present the various pre-defined SLA levels to the user at the operation 530 to select from. In some embodiments, the server 405 may allow the user to modify the values of one or more protection parameters in the pre-defined SLA levels. For example, if the user desires to select the GOLD level, but would like continuous protection for 45 days instead of the default value of 30 days shown in the table above, the user may modify the continuous protection parameter of the GOLD level. Thus, the pre-defined SLA levels provide the convenience and flexibility of tailoring the various protection parameters to suit the user's needs. Alternatively, the server 405 may allow the user to create a new SLA at the operation 530.

To create a new SLA, upon receiving input from the user at the operation 530 indicating creation of a new SLA, the server 405 may present one or more user interfaces to the user requesting certain information. For example, the server 405 may request an SLA name, description, and values for the continuous, daily, weekly, monthly, and quarterly protection parameters. In a multi-cluster architecture, the user may desire to store the snapshots and transactional logs on a different cluster than the cluster on which the source database is located. Thus, in some embodiments, the server 405 may request selection of the cluster(s) on which the snapshots and transactional logs are to be stored. The server 405 may request other or additional details as well. Upon receiving the various inputs from the user for creating the new SLA, the server 405 may create the new SLA and allow the user to select that SLA at the operation 530. In some embodiments, the user may have the ability to modify the SLA and/or the protection schedule after creating or registering the database.

Therefore, the server 405 receives selection of a first policy (e.g., the SLA and the protection schedule) for creating a time machine for the database being created/registered at the operation 530. In some embodiments, the server 405 may also receive an additional SLA that may be used to replicate snapshots and/or transactional logs captured on the basis of the SLA described above. In other embodiments, the additional SLA may be associated with the time machine after creating the source database. In some embodiments, the additional SLA may be a Data Access Management (DAM) policy. In some embodiments, the DAM policy may also define whether the snapshots and/or transactional logs are to be sanitized before replication in accordance with the additional SLA in the DAM policy. In some embodiments, the DAM policy may be associated with a sanitization policy to sanitize snapshots and/or transactional logs before replication. The DAM policy and the sanitization policy may be considered a second policy associated with the source database.

Upon receiving the various user selections at the operations 510-530, the server 405 creates a new database at operation 535. To create the database, the server 405 may request one or more of the agents 415, 430, 435 to perform one or more operations. In some embodiments, the server 405 may send the request to the agent(s) located on the cluster(s) on which the database server virtual machine(s) is(are) to be created. In some embodiments, the agent(s) may initiate a series of operations upon receiving the request from the server 405. For example, the agent(s) may create one or more database server virtual machines on the respective cluster, convert the database size into a number of virtual disks associated with that cluster and that are needed to house the database, create a database profile having a database name, description, network information, etc., attach the software and parameters of the database engine type with the database, create an instance of the time machine, associate the SLA and schedule with the database protection system, designate storage for storing snapshots and transactional logs, etc. Once the database is created, database management services (e.g., copy data management services) may be applied to the database. Further, when the database is created, the time machine starts capturing snapshots and transactional logs from the database.

Thus, the server 405 provides an easy, convenient, and flexible mechanism to create a new database using a user friendly and intuitive user interface. Instead of requiring multiple days to create a database, using the user interface of the present disclosure, the database may be created within minutes. Once created, additional database management services may be implemented on those databases. Further, details on database provisioning can also be found in U.S. application Ser. No. 16/228,728, filed Dec. 20, 2018, the entirety of which is incorporated by reference herein. The process 500 ends at operation 540.

Referring now to FIGS. 6A-6D, example user interfaces for creating a database are shown, in accordance with some embodiments of the present disclosure. Databases may be created by accessing a database provisioning utility through the dashboard 210. To create a database, a user authorized to request database provisioning services may navigate to a user interface 600 of the database provisioning utility using the dashboard 210 and select a "get started" option 605 to start the database creation process of FIG. 5. Upon selecting the get started option 605, the user may be presented with a first option 610 to provision a database or a second option 615 to register a database. Provisioning a database includes creating a new database within the database management system 400.

Registering a database may include bringing an existing database that was created outside of the database management system 400 into the database management system's management. In some embodiments, the existing database may be part of a cluster that is not yet registered with the database management system 400. In such a case, the cluster may be registered with the server 405 and a time machine may be associated with the database. In other embodiments, the existing database may have been created by a different vendor. In such cases, the server 405 may create a database server virtual machine on a cluster registered with the server 405 to bring the database within the database management system 400. Thus, creating a new source database may include provisioning a new database within the database management system 400 or registering a database created outside of the database management system.

If the user desires to register a database, the user may select the second option 615 and specify whether the database is already part of a cluster that has not yet been registered with the server 405 by selecting an option 620A. If the database was created by another vendor, the user may select option 620B. Upon selecting the option 620A, the server 405 may request the user to provide the SLA and protection schedule for the database. In some embodiments, instead of registering the cluster with the server 405, the database server on which the database resides may be migrated to a cluster that is already registered with the server. Since the database is already created and residing on a cluster, creation of the database server and the various profiles may not be needed. Selecting the option 620B may be similar to provisioning a new database (e.g., selecting the first option 610) the process.

To provision a new database, the user may select a database engine type from one or more database engine types 625 that are supported by the server 405. For example, to provision a PostgreSQL database, the user may select PostgreSQL from the from one or more database engine types 625. Upon selecting the database engine type, the user may be directed to user interface 630 of FIG. 6B. The user interface 630 identifies the various steps of creating the new database and highlights the current step. For example, the user interface 630 has the "Database Server virtual machine" step highlighted. By virtue of identifying the various steps of creating the new database, the dashboard 210 keeps the user informed as to which step the database creation process is on and which steps are coming up next.

The user interface 630 maybe used to designate a database server virtual machine for the database being created. In some embodiments, the user may select an option 635A to create a new database server virtual machine or an option 635B to use an existing database server virtual machine. In the user interface 630, the option 635A for creating a new database server virtual machine is shown selected. Thus, the user interface 630 requests user selection of one or more parameters for creating a new database server virtual machine. For example, the user interface 630 may request a cluster 635C to identify the cluster on which the database is to be created. In some embodiments, the cluster 635C may be presented as a drop-down list and may include clusters that are already registered with the server 405. In some embodiments, if the user desires to create the database on multiple clusters (e.g., a copy of the database on multiple clusters), the user interface 630 may allow the user to select multiple clusters. For each cluster, the user may need to provide at least a network profile (e.g., to identify the location of the database server virtual machine on that cluster). In some embodiments, software profiles may be replicated across clusters. Further, in some embodiments, compute and database parameter profiles may be same across multiple clusters registered with the server 405.

The user interface 630 may also request the user to provide a name 635D for the database server virtual machine, a description 635E of the database server virtual machine, a software profile 634F, a compute profile 635G, a network profile 635H, a time zone/location of the database server virtual machine 635I, and security options 635J. The user interface 630 may also request a parameter profile for the database server virtual machine. In other embodiments, the user interface 630 may request additional or other information for creating a new database server virtual machine.

Although not shown, if the user selects the option 635B for using an existing database server virtual machine, the user interface 630 may display options for allowing the user to identify an existing database server virtual machine. Upon selecting a "Next" button 635K, the various user selections of the user interface 630 may be sent to the server 405, which may then present a user interface 640 of FIG. 6C to the user on the dashboard 210.

The user interface 640 identifies that the database creation process is at the "Instance" step at which various parameters for the database are received from the user. The user interface 640 may be used to receive a name 645A and description 645B for the database being created, a password 645C to restrict access to the database, a size 645D of the database to be created, a database parameter profile 645E, a listener port 645F for the database engine type selected (e.g., PostgreSQL), an initial database name 645G (which may or may not be the same as the name 645A), and any other details (e.g., details 645H) that may be needed or considered desirable to have in creating the database. When the user is satisfied with the selections on the user interface 640, the user may select a "Next" button 650 to send the selections to the server 405. The server 405 may then present a user interface 655 of FIG. 6D.

The user interface 655 identifies that the database creation process is at the last step of creating the "Time Machine." The user interface 655 may be configured to request selection of SLA and protection schedule from the user for creating an instance of the time machine for the database being created. The user interface 655, thus, requests a name 660A and description 660B for the time machine, an SLA 660C (e.g., to define a protection level of the source database), and a protection schedule 660D. As discussed above, the SLA defines the retention policy of the snapshots and transactional logs (e.g., duration for which snapshots and transactional logs are saved). The protection schedule defines when snapshots and transactional logs are captured. Within the protection schedule 660D, the user interface 655 may request the user to provide a number of snapshots 665A desired each day, a frequency of capturing transactional logs 665B, and time periods 665C for identifying which snapshot to designate as the daily snapshot, 665D for identifying which snapshot to designate as the weekly snapshot, 665E for identifying which snapshot to designate as the monthly snapshot, and 665F for identifying which snapshot to designate as the quarterly snapshot. Upon providing the various parameters in the user interface 655, the user may select a "Provision" button 670 to send the selections to the server 405 and start the database creation process. Specifically, in some embodiments, the server 405 may create one or more operations for the agent 415, 430, or 435 of the cluster 635C to create a new database server virtual machine and create a database on a storage device (e.g., virtual disk) that is associated with that database server virtual machine.

In some embodiments, the server 405 and/or the agent performing the operations may convert the database size 645D into an amount of storage that is needed. For example, in some embodiments, the server 405 and/or the agent performing the operations may determine a number of virtual disks that may be needed for a database of the desired size. In some embodiments, the size of the database may change (e.g., increase) upon creation. In such embodiments, the server 405 and/or the agent performing the operations may allocate additional storage to the database.

It is to be understood that the configurations of the various user interfaces of FIGS. 6A-6D may vary from one embodiment to another. For example, the various selections may be displayed as drop-lists, as radio buttons, or in other ways. Similarly, some fields may be pre-filled with default values and allowed to be changed by the user if desired. The placement of the various fields, the size, orientation, and other design aspects of those fields may be varied as well. Additionally, some fields may be considered mandatory, while other fields may be designated as mandatory to be filled in by the user. The dashboard 210 thus provides an easy mechanism for creating a new database in a simple, user friendly, and intuitive user interface. Upon provisioning the database, the time machine starts capturing snapshots and transactional logs from the database, and other database services (e.g., copy data management services) may be performed on the database.

In some embodiments, and as discussed above in FIG. 2, upon creating a database (e.g., a source database), the time machine associated with that source database starts capturing snapshots and transactional logs. Those snapshots and transactional logs may be used for various purposes (e.g., providing high availability, disaster recovery, etc.). For example, in some embodiments, the snapshots and/or transactional logs may be used for disaster recovery. In some embodiments, a client may enter into an SLA (e.g., the SLA 660C) with a site operator of a disaster recovery site for using the disaster recovery site. The disaster recovery site may be a highly engineered and reliable virtual computing system that provides data recovery and data backup facilities to a source database in accordance with the SLA and maintains a continuity of operation in the aftermath of a disaster condition.

A disaster condition may include planned outages, performance related failures, component failures, power failures, natural calamities, or any other condition that hampers the normal operation of the clusters at the client sites. Generally speaking, and as used herein, a disaster condition is any condition that causes hardware failure or otherwise prevents a hardware component from operating as intended, or results in a downtime at the client site. For example, a condition that causes a malfunction of a cluster on which a source database is located or that significantly hampers the normal operation of the cluster may be referred to as a disaster condition. The disaster condition is also referred to herein as a failover event. When the downtime of the cluster is preplanned, the disaster condition or failover event may be a planned failover event. When the disaster condition of failover event is not preplanned, the disaster condition or failover event may be an unplanned failover event.

To use snapshots and/or transactional logs for disaster recovery, in some embodiments, the snapshots and/or transactional logs captured from a source database may be replicated (e.g., copied) to a remote site (e.g., a disaster recovery site or another datacenter). In some embodiments, a user may designate or select the remote site where the snapshots and/or transactional logs are replicated to. In other embodiments, the database system may be configured to replicate the snapshots and/or transactional logs to a designated remote site. In some embodiments, the cluster on which the source database is located whose snapshots and/or transactional logs are captured may be part of a "source site." The cluster on which those snapshots and/or transactional logs are replicated to may be part of a "remote" site. In some embodiments, the source site and the remote site may be different clusters of the same datacenter. In other embodiments, the source site and the remote site may be part of different datacenters. Further, the datacenters that form part of the source site and/or the remote site may be either on-premise or on the cloud.

In other embodiments, the snapshots and/or transactional logs may be replicated to a remote site for other purposes. For example, in some embodiments, the snapshots and transactional logs may be replicated to a remote site to create a cloned database on the remote site. The cloned database on the remote site may then be used to access the source database from the remote site instead of the source site. In some embodiments, the cloned database may be used for certain operations (e.g., testing, auditing, archiving, validation, application development, etc.) instead of the source database on the source site. Similarly, in other embodiments, the snapshots and/or transactional logs may be replicated for other reasons to a remote site.

In some embodiments, the remote site may be located far away from the source site where the snapshots and/or transactional logs are being captured. For example, in some embodiments, the source site where the snapshots and/or transactional logs are being captured and the remote site may be located in different geographical locations (e.g., different cities, different states, different countries, different continents, etc.). Replicating across large distances increases the amount of time and the network bandwidth that is needed to replicate the snapshots and/or transactional logs. In some embodiments, the latency or delay to replicate the snapshots and/or transactional logs across such large distances may be large, unpredictable, and generally undesirable. The greater the latency, the greater the chances of failure due to intermittent network or other issues.

Further, replicating snapshots and/or transactional logs may be a compute (e.g., CPU and memory) and network intensive operation. In some embodiments, there may be a cap on the amount of data (e.g., of the snapshots and/or transactional logs) that may be replicated any given unit of time (e.g., every hour) to ensure that enough compute and network resources are available for other operations. In such cases, replicating snapshots and/or transactional logs may take a long time, leading to poor customer service. Further, if the source site malfunctions or otherwise goes offline unexpectedly before the replication of the snapshots and/or transactional logs is complete, the source database may be unable to be recovered on the remote site, thereby impacting the continuity of operation. Even if the source site and the remote site are not separated by a large distance, at least some of the concerns above may still apply. Thus, technical problems exist in replicating snapshots and/or transactional logs across multiple locations. The present disclosure provides technical solutions for load-balancing and optimizing snapshot and/or transactional replication to a remote site, as discussed below.

In some embodiments, the replication of snapshots and/or transactional logs may be optimized and load-balanced by localization of snapshots and/or transactional logs, by distributing API requests, and/or by using cascade replication, as discussed in greater detail below.

Figure 7:
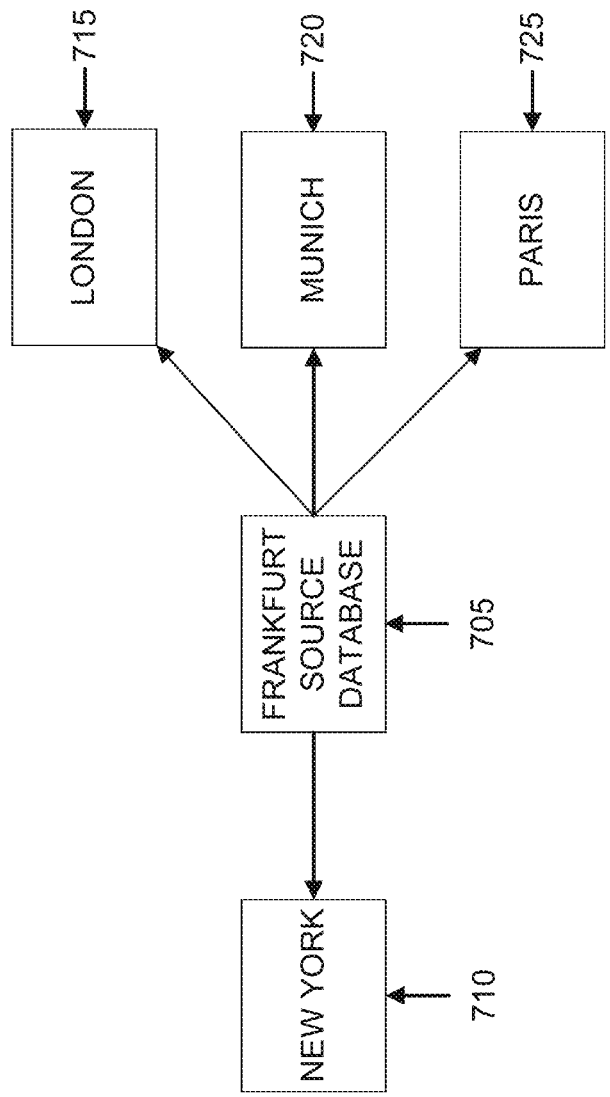
FIG. 7 is an example block diagram showing snapshot replication and load balancing in the multi-cluster configuration of FIG. 4, in accordance with some embodiments of the present disclosure.

Localization may include replicating the snapshots and/or transactional logs to a remote site that is geographically in the same or similar location as the source site or close to the source site. FIG. 7 shows an example of localization. For example, if the source database is located on a source site 705 that is in Frankfurt, Germany, it may be inefficient (for at least the reasons mentioned above such as latency, network bandwidth, etc.) to store the snapshots and/or transactional logs of the source database on a remote site 710 that is located in New York, USA since New York is geographically far away from Frankfurt and since the snapshots and/or transactional logs may also be needed on another cluster in in Frankfurt. It may be more efficient to store the snapshots and/or transactional logs of the source database on a remote site that is located as close as possible (e.g., in terms of distance) to the location of the source site 705. For example, remote sites 715, 720, or 725 located in London, Munich, or Paris, respectively, may be closer to Frankfurt than the remote site 710 located in New York.

Thus, the server 405 may identify a remote site that is closest to the source site 705, and the agent (e.g., the agent 415 or the agent on the suitable cluster) may replicate the snapshots and/or transactional logs to that remote site. In some embodiments, the server 405 may identify a remote site based on predetermined conditions. For example, in some embodiments, the server 405 may be configured to identify a remote site from the clusters that are registered as a remote site with the server 405. Configuring a site as a remote site is discussed in greater detail below. In some embodiments, the server 405 may identify the location of the source site 705. In some embodiments, the server 405 may maintain metadata about each of the clusters that are registered with the server. Based on the metadata, the server 405 may identify the location of the cluster on the source site 705.

Upon identifying the location of the source site 705, the server 405 may identify the distances between the source site and other clusters (e.g., remote sites) that are registered with the server. In some embodiments, the server 405 may designate the cluster that is closest to the source site 705 as the remote site. In other embodiments, the server 405 may select all clusters that are located (e.g., in terms of distance) within a specified distance from the source site 705. In some embodiments, upon identifying the one or more suitable remote sites, the server 405 may further determine which of those suitable remote sites have sufficient space to receive the snapshots and/or transactional logs. In other embodiments, the server 405 may be configured with other or additional conditions to select a suitable remote site.

Upon selecting a suitable remote site, the server 405 may designate that selected remote site for replicating the snapshots and transactional logs of the source database located on the source site 705. By selecting a remote site that is closer to the source site 705, the speed of replication may be increased, and the number of failures may be reduced.

In some embodiments, in addition to localization of snapshots and/or transactional logs, API requests for replication may be distributed. Replication to a remote site may take a large amount of time (e.g., hours). When replication is ongoing, the source site may continuously poll the remote site to check the progress (success, failure, in-progress, waiting/queued, etc.) of replication. This polling, in some embodiments, may be done by calling a REST API on the remote site by the source site 705. In some embodiments, the remote site may have a limit on how many API requests the remote site may be allowed to process every designated unit of time (e.g., every minute). To minimize the number of API calls during polling, in some embodiments, if any snapshot (and/or transactional log) of a particular source database was previously replicated from the source site 705 to a remote site (e.g., the remote site 715), for any subsequent replication requests (e.g., for upcoming snapshots/transactional logs) for that same source database, the replication may occur from the source site, but the polling may occur from the remote site (e.g., instead of from the source site).

When the polling occurs from the remote site (e.g., the remote site 715), the remote site may notify the source site 705 of the status of replication periodically. By shifting the polling of the API requests from the source site 705 to the remote site (e.g., the remote site 715), the burden of polling is shifted from the source site. This may be particularly beneficial when the snapshots and/or transactional logs are being replicated to multiple remote sites. For example, if the snapshots and/or transactional logs are being replicated to the remote sites 715, 720, and 725, instead of the source site 705 sending polling requests to each of those remote sites, those sites may instead send polling requests to the source site. Thus, the polling request load from the source site 705 is distributed between the various remote sites, allowing faster replication and fewer failures.

In some embodiments, in addition to localization and distributing API requests for replication, in some embodiments, cascade replication may be used. Cascade replication may be particularly beneficial when a snapshot/transactional log is replicated to multiple remote sites. For example, if the source database from the source site 705 is being replicated to each of the remote sites 715-725, in some embodiments, a cascade replication may be used. For example, the server 405 may determine that of the three remote sites (e.g., the remote sites 715-725), the remote site 715 is closest to the source site 705. Thus, the snapshots and/or transactional logs may be replicated from the source site 705 to the remote site 715. The replicated snapshots and/or transactional logs from the remote site 715 may then be replicated to the remote sites 720 and 725. Since the remote sites 720 and 725 are closer to the remote site 715 than the source site 705, the cascading replication optimizes the replication of the snapshots and/or transactional logs.

In some embodiments, the snapshots and/or transactional logs may be replicated from the remote site 715 to either the remote site 720 or the remote site 725, whichever is closer to the remote site 715. For example, in some embodiments, the snapshots and/or transactional logs may be replicated from the remote site 715 to the remote site 720 since the remote site 720 is closer to the remote site 715 than the remote site 725. The remote site 720 may then replicate the snapshots and/or transactional logs to the remote site 725. Thus, based upon the location of the various remote sites and the source site, the replication of the snapshots and/or transactional logs may be cascaded.

It is to be understood that although the description above is with respect to replicating both snapshots and/or transactional logs, in some embodiments, only snapshots may be replicated or only transactional logs may be replicated. Further, in some embodiments, only one of the above mechanisms may be used for optimizing the replication. In other embodiments, a combination of two or more of the replication optimization mechanisms may be used. By optimizing the replication as discussed above, the present disclosure provides a load-balancing of the replication.

Figure 8:
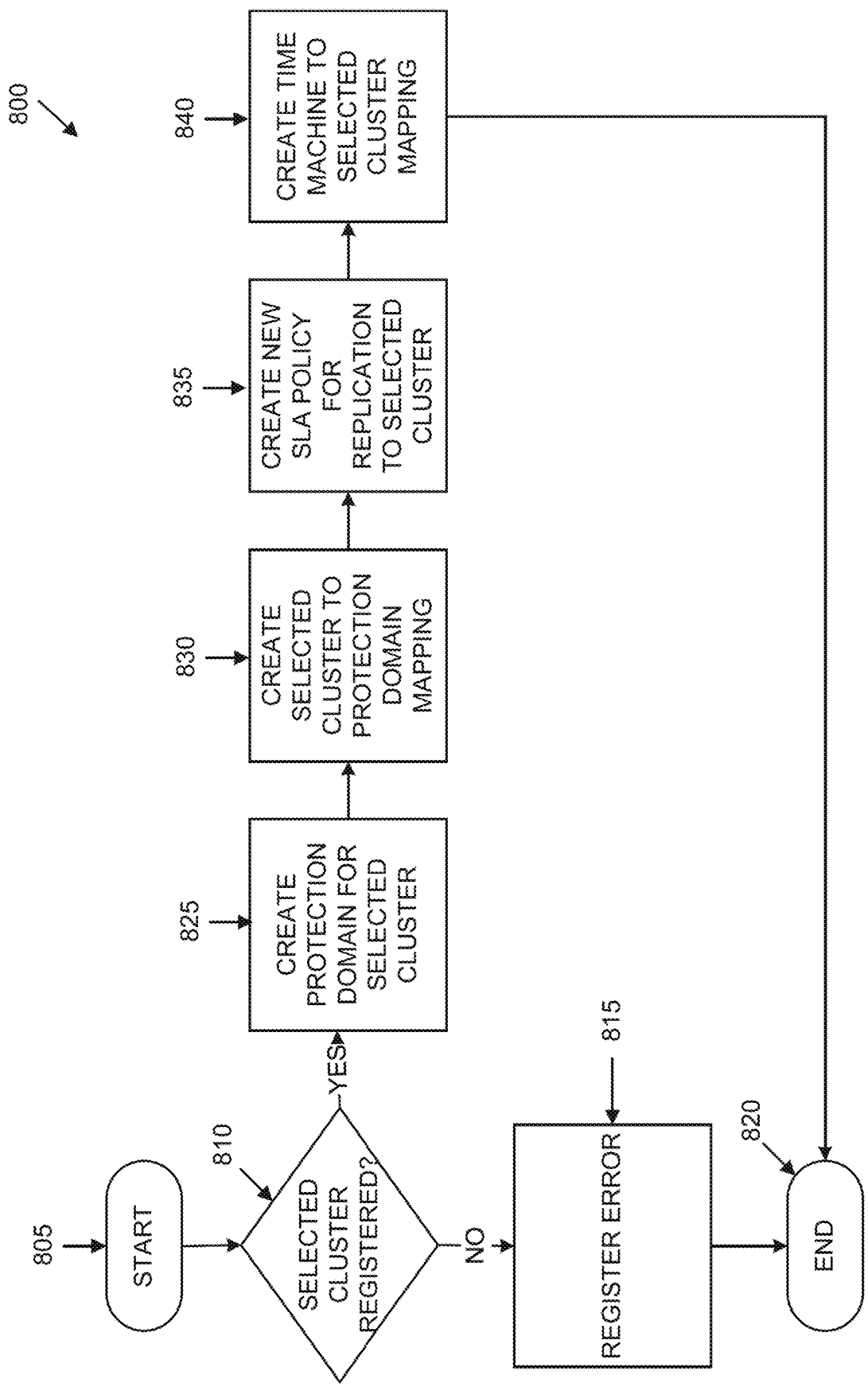
FIG. 8 is an example flowchart outlining operations for configuring a remote site for snapshot replication of a source database in the multi-cluster configuration of FIG. 4, in accordance with some embodiments of the present disclosure.

Turning now to FIG. 8, an example flowchart outlining operations of a process 800 is shown, in accordance with some embodiments of the present disclosure. The process 800 may be used for setting up a remote site for replicating a snapshot and/or transactional log to. The process 800 may include other or additional operations depending upon the particular embodiment. As discussed above, in some embodiments, a time machine (e.g., a database protection system) may be created for each source database that is created. The time machine may be configured to capture snapshots and/or transactional logs from the source database based upon an SLA (e.g., the SLA 660C) and a protection schedule (e.g., the protection schedule 660D). As also discussed above, in some embodiments, the snapshots and/or transactional logs may be replicated to a remote site. As an example, say a source database is provisioned on a cluster C1 of a source site. Snapshots and/or transactional logs captured of the source database may be desired to be replicated to a cluster C2 of a first remote site and a cluster C3 of a second remote site. In some embodiments, the time machine associated with the source database may be configured to replicate the snapshots and/or transactional logs from the cluster C1 to the clusters C2 and C3.

In some embodiments, before the time machine is able to replicate the snapshots and/or transactional logs to the clusters C2 and C3, those clusters have to be configured as a "remote site." The process 800 may be used to configure the clusters C2 and C3 as a remote site. In some embodiments, the process 800 may be repeated for each cluster that is to be designated as a remote site. In some embodiments, the process 800 may be implemented by the server 405 and/or the agent 415 (or the agent located on the cluster being designated as the remote site). In some embodiments, upon starting at operation 805, the server 405 determines whether a cluster (e.g., clusters C2, C3) to which the snapshots and/or transactional logs are desired to be replicated is registered with the server. In some embodiments, the server 405 may present a user interface to the user to select a cluster (e.g., clusters C2, C3) for the remote site. Upon receiving the selected cluster from the user, the server 405 may determine whether that selected cluster (e.g., clusters C2, C3) is registered with the server, and therefore configured as a remote site. In some embodiments, when a cluster is registered with the server 405, that cluster may be automatically configured as a remote site. In some embodiments, the server 405 may only present those cluster options to the user at the operation 810 that are already registered with the server. In such cases, the check of the operation 810 may not be needed.

In some embodiments, the server 405 may determine whether the selected cluster (e.g., clusters C2, C3) is registered with the server (and therefore configured as a remote site) by reviewing metadata that the server maintains. In some embodiments, the server 405 may maintain metadata associated with each cluster that is registered with the server. In some embodiments, the metadata may include information such as the identity of the cluster, the location of the cluster, the compute resources associated with the cluster, number of nodes on the cluster, whether the cluster is configured as a remote site, and any other details that may be needed or considered desirable. If the server 405 does not find any metadata associated with the selected cluster or the metadata indicates that the selected cluster was not configured as a remote site at the time of registration for some reason, the server may determine that the cluster is not configured as a remote site. If the server 405 determines that the selected cluster is not configured as a remote site (e.g., because that cluster is not yet registered with the server or the cluster is registered but was not configured as a remote site for some reason), the process 800 proceeds to operation 815 where the server issues an error and the process ends at operation 820. In some embodiments, the server 405 may present a user interface or provide a notification to request the user to select a different cluster for the remote site. By using only registered clusters as remote sites, the server 405 may ensure facilitation and management of the replicated snapshots and/or transactional logs even though those replicated snapshots and/or transactional logs may be located on another cluster.

On the other hand, if at the operation 810 the server 405 determines that the cluster (e.g., clusters C2, C3) is registered with the server as a remote site, at operation 825 the server creates a Protection Domain (PD) for the selected cluster. In some embodiments, the server 405 may use API endpoints exposed by the operating system platform to create the PD. In some embodiments, the snapshots and/or transactional logs may be stored in the PD. In some embodiments, the PD may be considered a container that stores the snapshots and/or transactional logs. In some embodiments, both snapshots and/or transactional logs may be stored in a single PD. In other embodiments, snapshots and transactional logs may be stored in separate PDs. In some embodiments, a PD may exist on the source site for storing the snapshots and/or transactional logs captured from the source site. Similarly, in some embodiments, to replicate the snapshots and/or transactional logs to a remote site, a PD may be created on the remote site to store the replicated snapshots and/or transactional logs.

Upon creating a PD on the selected cluster, at operation 830, the server 405 may create a mapping at the server between the selected cluster and the created PD. In some embodiments, the server 405 may maintain metadata associated with each time machine that is created. In some embodiments, the metadata may include information such as the identity of the source database, a time machine identifier, a location of the cluster on which the source database is located, SLA, protection schedule, and any other details that may be needed or considered desirable. In some embodiments, the server 405 may update the metadata (e.g., by creating a new entry in the metadata) for the time machine to map the selected cluster to the PD. In some embodiments, the mapping may be particularly beneficial when multiple clusters are designated as remote sites. In such cases, the mapping may enable the server 405 to keep track of which selected cluster corresponds to which PD. In some embodiments, each PD may be associated with a unique identifier and the mapping may include the identifier. In some embodiments, the PD and/or the selected cluster may be associated with a status. For example, in some embodiments, the status may be active, inactive, or frozen. An active status may indicate that the selected cluster (or PD) is functioning and that snapshots and/or transactional logs may be replicated to that selected cluster (or PD), while an inactive status may indicate that the selected cluster (or PD) is not functioning. A frozen status may indicate that the selected cluster (or PD) is functional but that no new snapshots and transactional logs are being replicated to that selected cluster (or PD). Other or additional statuses may be associated with the selected cluster and/or the PD associated therewith. The mapping may also include the current status.

In some embodiments, until the process 800 is complete, the status may be considered inactive. Once the process 800 completes successfully, the status may be changed to active. When the status is active, snapshots and/or transactional logs may be replicated to the PD of the selected cluster.

At operation 835, a new SLA may be defined for the selected cluster designated as a remote site. In some embodiments, and as discussed above, an SLA (e.g., the SLA 660C) may be defined for a source database. Snapshots and/or transactional logs may be captured from the source database based on that SLA. In some embodiments, all snapshots and/or transactional logs captured from the source database may be desired to be replicated to the remote site. In other embodiments, only a subset of the snapshots and/or transactional logs may be desired to be replicated to the remote site. In yet other embodiments, only snapshots and no transactional logs may be desired to be replicated to the remote site, and so on. Thus, in some embodiments, a new SLA may be defined to determine which snapshots and/or transactional logs to replicate to the remote site. Further, the new SLA may define the duration for which the replicated snapshots and/or transactional logs are to be maintained on the remote site. In some embodiments, the new SLA may also place a limit on the number of snapshots and/or transactional logs that may be maintained on the remote site. For example, the new SLA may say "retain snapshots for the last 7 days and up to a maximum of 10 snapshots." In such a case, the server 405 may be configured to delete snapshots (e.g., oldest snapshots) if the number of snapshots on the remote site for a particular source database go over 10 even if the snapshots are within the 7-day retention period. In some embodiments, the SLA for the remote site may be in the form of a DAM policy, discussed in greater detail below. In some embodiments, the SLA for the remote site may also indicate whether snapshots are to be sanitized before replication, as also discussed below.

In some embodiments, the server 405 may associate the new SLA with the time machine of the source database. In some embodiments, the server 405 may present one or more user interfaces at the operation 835 to receive the definition of the new SLA. In some embodiments, the new SLA may be created at the time of creating the source database via the process 500. In other embodiments, the new SLA may be defined after creating the source database but before replicating the snapshots and/or transactional logs. In some embodiments, the new SLA may be part of a Data Access Management (DAM) policy.

At operation 840, the server 405 updates the metadata (e.g., creates an entry) associated with the time machine to add another mapping. The mapping of the operation 840 may be between the time machine associated with the source database and the selected cluster designated as the remote site. For example, if the process 800 is used to configure the cluster C2 as a remote site for the snapshots and/or transactional logs of a source database, the mapping of the operation 840 may be between the time machine of the source database and the cluster C2. The mapping may enable the time machine to keep track of the clusters which are configured for snapshots and/or transactional logs replication for the associated source database. Further, in some embodiments and similar to the mapping of the operation 830, a status (e.g., active, inactive, frozen, etc.) may be associated with the mapping of the operation 840. In some embodiments, the status may be inactive while the process 800 is executing.

Upon successfully configuring the selected cluster as a remote site for receiving snapshots and/or transactional logs from a source database, the status of the cluster may be changed to active and the process 800 ends at the operation 820. Although all the operations of the process 800 have been described as being performed by the server 405, in some embodiments, at least some of the operations may be performed by the agent 415 or the agent on the selected cluster.

Figure 9:
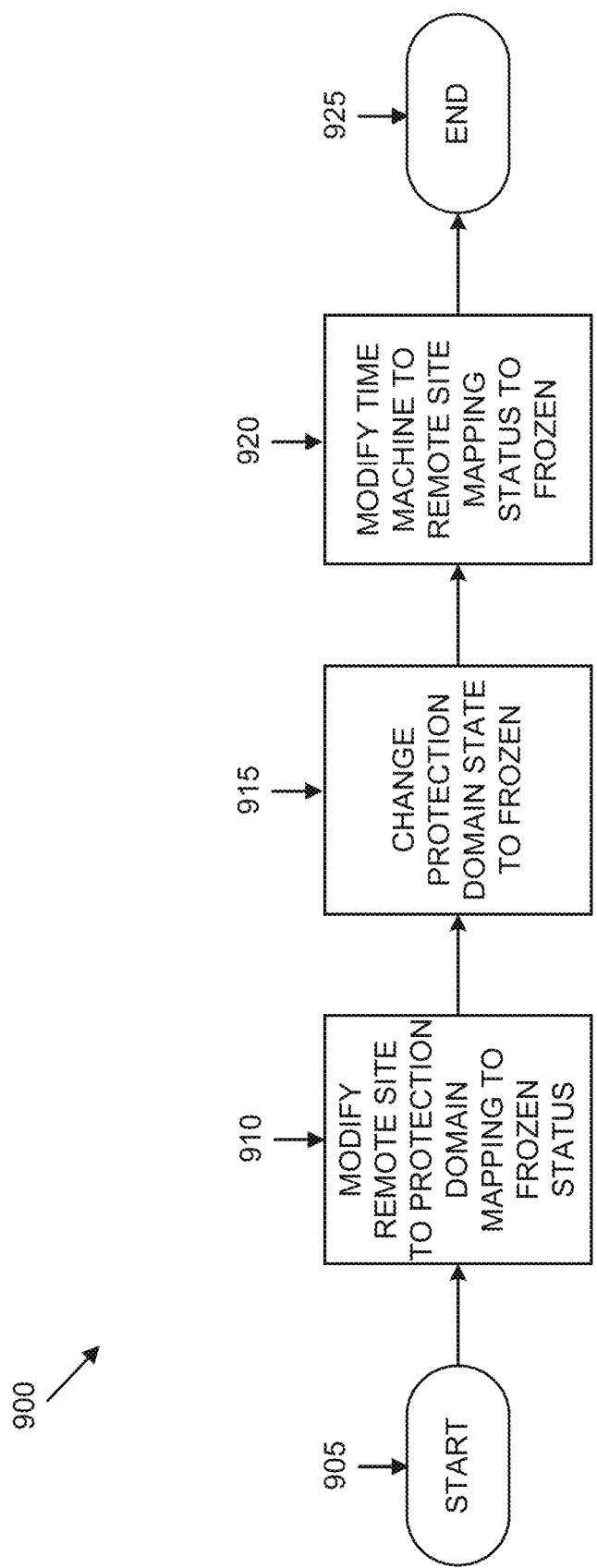
FIG. 9 is an example flowchart outlining operations for deregistering a remote site being used for snapshot replication of a source database in the multi-cluster configuration of FIG. 4, in accordance with some embodiments of the present disclosure.

Referring now to FIG. 9, an example flowchart outlining operations of a process 900 is shown, in accordance with some embodiments of the present disclosure. The process 900 may use other or additional operations depending upon the particular embodiment. The process 900 may be used to deregister a remote site. For example, if cluster C2 was setup for replication as a remote site using the process 800, and the user desires to replicate no more snapshots and transactional logs to that cluster, that cluster may be deregistered. When a cluster is deregistered, no new snapshots and transactional logs may be replicated to that cluster. However, the cluster may continue to be registered with the server 405 (including configured as a remote site by virtue of the registration) and may be used for replication again later. For example, if the cluster C2 is deregistered and that cluster is desired to be used as a remote site for replication again in the future for either the same source database or another source database, that cluster may again be set up using the process 800.

The snapshots and transactional logs that were replicated to the cluster being deregistered (e.g., the cluster C2) before deregistering may be maintained for the duration noted in the new SLA defined at the operation 835. Although all the operations of the process 900 are described as being performed by the server 405, in some embodiments, at least some of the operations may be performed by the agent 415 or the agent on the cluster C2 being deregistered by the process 900.

To deregister the cluster C2, upon starting at operation 905, the server 405 updates the metadata entry that was added in the operation 830 to "frozen" at operation 910. When the status is changed to frozen, no new snapshots and transactional logs may be replicated to the cluster C2. At operation 915, the server 405 suspends the PD created at the operation 825 of the cluster C2. In some embodiments, the server 405 may suspend the PD of the cluster C2 by changing a state of the PD to be frozen. At operation 920, the server 405 updates the metadata entry that was created at the operation 840 to "frozen." In other words, the server 405 updates the mapping between the time machine of the source database and the cluster C2 to a frozen state, thereby indicating that no new snapshots and transactional logs are to be replicated to the cluster C2. The process 900 ends at operation 925.

Figure 10:
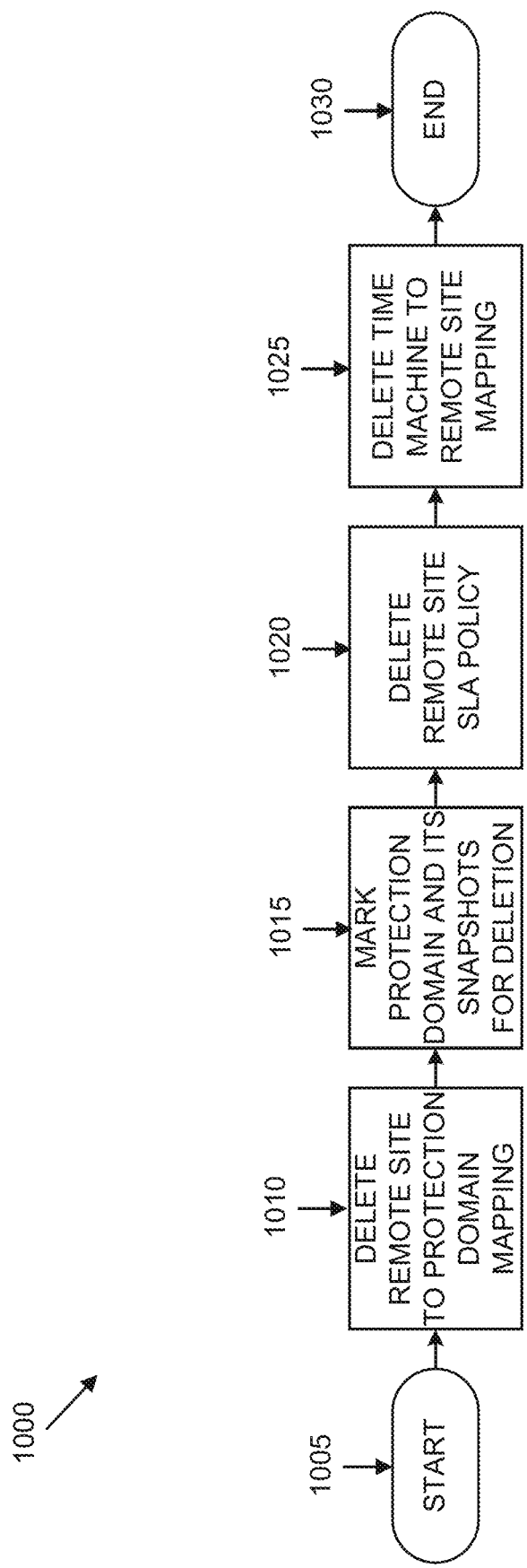
FIG. 10 is an example flowchart outlining operations for deleting a remote site being used for snapshot replication of a source database in the multi-cluster configuration of FIG. 4, in accordance with some embodiments of the present disclosure.

Referring now to FIG. 10, an example flowchart outlining operations of a process 1000 is shown, in accordance with some embodiments of the present disclosure. The process 1000 may use other or additional operations depending upon the particular embodiment. The process 1000 may be used to delete, remove, or curate a remote site being used for replication. For example, if cluster C2 is set up for replication as a remote site using the process 800, and the user desires to delete all snapshots and transactional logs from that cluster and no longer use that cluster for replication, that cluster may be deleted. Thus, there is a difference between deleting a remote site and deregistering a remote site. When deregistering a remote site, no new snapshots and transactional logs are replicated to the remote site. However, any previously replicated snapshots and transactional logs may be maintained on the remote site for the duration defined in the SLA of the operation 835. When a remote site is deleted, all snapshots and transactional logs from the remote site are deleted and the remote site is no longer used for replication of snapshots and transactional logs of the source database. It is to be understood that when a cluster is deleted as a remote site, that cluster continues to be registered with the server 405 (e.g., similar to the deregistering case above) and may be used for replication again in the future.

Although all the operations of the process 1000 have been described as being performed by the server 405, in some embodiments, at least some of the operations may be performed by the agent 415 or the agent on the cluster being deleted by the process 1000.

To delete the cluster C2, the operations of the process 800 may be undone. For example, upon starting at operation 1005, the server 405 updates the metadata entry to delete the mapping between the remote site (e.g., the cluster C2) and the PD on the cluster C2 of the operation 830. At operation 1015, the server 405 designates the snapshots and transactional logs on the PD of the cluster C2 to be deleted. In some embodiments, the server 405 may ask the agent on the cluster C2 to delete the snapshots and transactional logs in the PD of the cluster C2. At operation 1020, the server 405 deletes the SLA of the operation 835 associated with the cluster C2. At operation 1025, the server 405 updates the metadata entry to delete the time machine to remote site mapping that was defined at the operation 840. Upon performing the operations 1005 to 1025, the cluster C2 may no longer be designated as a remote site for replicating snapshots and transactional logs of the associated source database. The process 1000 ends at operation 1030.

Figure 11:
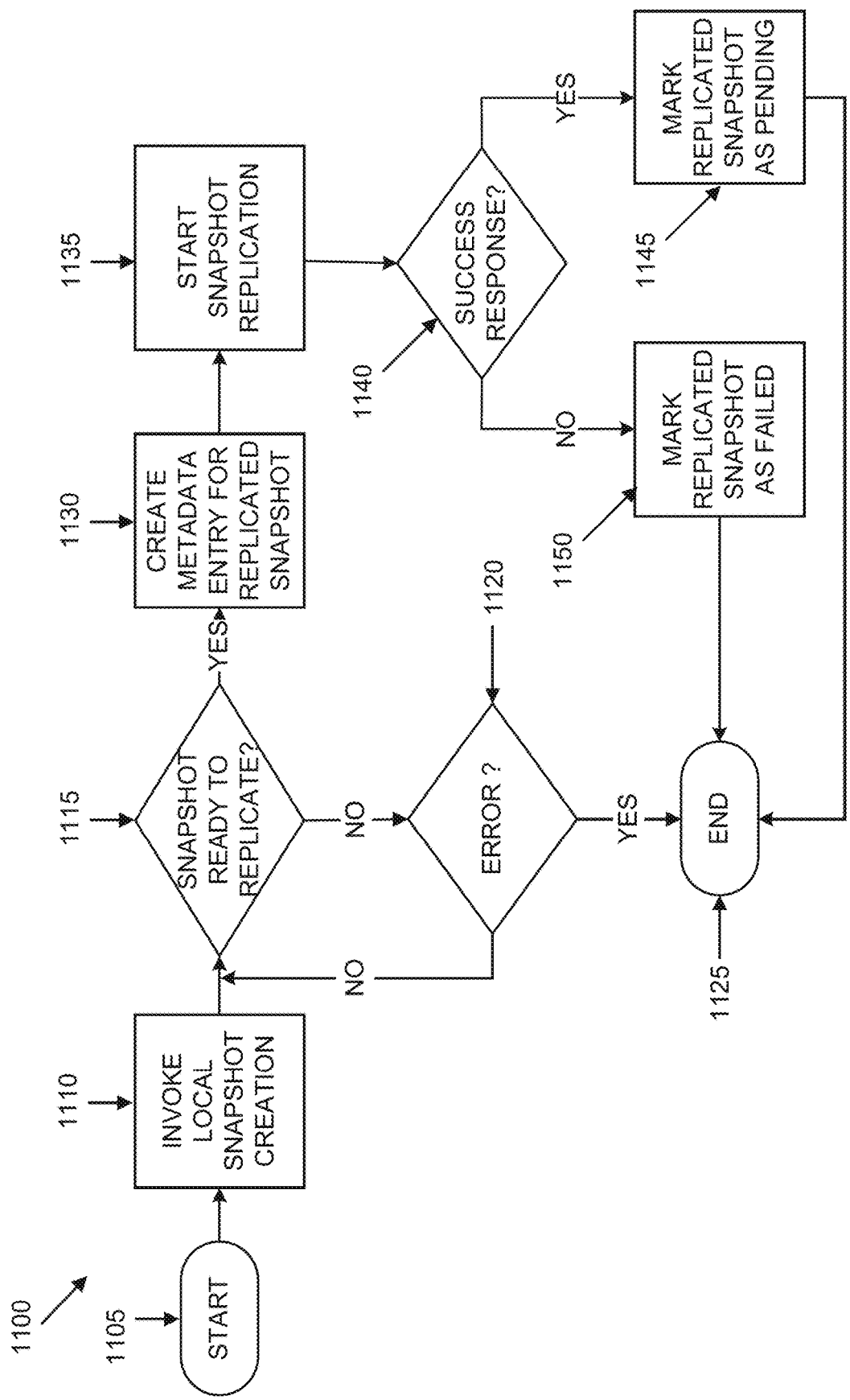
FIG. 11 is an example flowchart outlining operations for replicating a snapshot of a source database to a remote site in the multi-cluster configuration of FIG. 4, in accordance with some embodiments of the present disclosure.

Referring now to FIG. 11, an example flowchart outlining operations of a process 1100 is shown, in accordance with some embodiments of the present disclosure. The process 1100 may use other or additional operations depending upon the particular embodiment. The process 1100 may be used to replicate a snapshot of a source database from a source site to a remote site. For purposes of explanation, the process 1100 describes replicating a snapshot from a cluster C1 on the source site to a cluster C2 on a remote site. Although all the operations of the process 1100 have been described as being performed by the server 405, in some embodiments, at least some of the operations may be performed by the agent on the cluster C1 or the agent on the cluster C2.

As indicated above, snapshots of a source database may be captured in accordance with an SLA (e.g., the SLA 660C) and a protection schedule (e.g., the protection schedule 660D). Thus, upon starting at operation 1105, the time machine associated with the source database captures a snapshot from the source database at operation 1110. In some embodiments, the time machine may capture a full snapshot or an incremental snapshot. For example, in some embodiments, a first snapshot captured from the source database may be a full snapshot. In other embodiments, a full snapshot may be captured periodically. The full snapshot may be captured by capturing images of the virtual machines, storage containers, virtual disks, volume groups, etc. associated with the source database on the cluster C1. An incremental snapshot may be captured after a full snapshot is available. An incremental snapshot may capture only the changes that may have occurred in the source database since the capture of the full snapshot or the changes since a previous snapshot capture (which may also have been an incremental snapshot). In some embodiments, the snapshot (whether full or incremental) that is captured may be assigned a snapshot identifier.

Upon capturing the snapshot at the operation 1110, the time machine associated with the source database determines whether the snapshot captured at the operation 1110 is ready for replication at operation 1115. As discussed above, in some embodiments, not every snapshot captured from the source database may be replicated to the remote site. The snapshots that are to be replicated to the remote site (e.g., cluster C2) may be determined based upon the SLA defined for the remote site at the operation 835. If the snapshot captured at the operation 1110 is not intended to be replicated to the remote site (e.g., cluster C2), the process 1100 proceeds to operation 1120. In some embodiments, the snapshot captured at the operation 1110 may be a snapshot that is to be replicated to the remote site. However, in some embodiments, the snapshot capture from the source database may have been unsuccessful. In such cases, the process 1100 may again proceed to the operation 1120. In yet other embodiments, the snapshot may take a long time to be captured (e.g., a full snapshot may take longer than an incremental snapshot). So, the operations 1115 and 1120 may wait for the snapshot capture to be completed.

If the process 1100 reaches the operation 1120 and the time machine decides that an error has occurred, the time machine returns an error to the user and the process ends at operation 1125. On the other hand, if the snapshot captured at the operation 1110 is intended to be replicated to the remote site and is successfully captured, the process 1100 proceeds to operation 1130. At the operation 1130, the time machine creates a metadata entry for the snapshot being replicated (e.g., the snapshot captured at the operation 1110). In some embodiments, the metadata entry for the snapshot being replicated may be created in the metadata that the server 405 maintains. For example, in some embodiments, the server 405 may maintain a snapshots table for each source database. The metadata associated with snapshots of the source database that are replicated to a remote site may be recorded in the snapshots table of the server 405. Thus, in some embodiments, the server 405 may create a new metadata entry in the snapshots table for the snapshot captured at the operation 1110 that is to be replicated to the remote site.

In some embodiments, the metadata entry may include the snapshot identifier, the remote site where the snapshot is being replicated to, a schedule identifier for the replication session, and any other information that may be needed or considered desirable. In some embodiments, the metadata entry may also be associated with a status of the replication. At operation 1135, the time machine starts the replication process. Specifically, at the operation 1135, the time machine reaches out to the remote site (e.g., the cluster C2) to start the replication process and push the snapshot being replicated to the remote site. At operation 1140, the time machine determines if a response is received from the remote site.

In some embodiments, the remote site may be down or non-operational or unable to accept the snapshot being replicated for some reason. In such cases, the time machine on the source site (e.g., the cluster C1) may either not receive a response (e.g., within a predetermined period of time) from the remote site or receive an error message. In other embodiments, the time machine may receive a success message indicating that the remote site is ready to accept the snapshot for replication. In some embodiments, the response may be an API response. If the time machine receives a success message, then at operation 1145, the time machine sends the schedule identifier for the replication to the remote site to track the status of the replication. Further, in some embodiments, the time machine may update the metadata entry that was created at the operation 1130 for the snapshot being replicated. For example, upon receiving the success message at the operation 1140, the time machine may mark the status of the replication as "pending" in the metadata entry, indicating that the snapshot replication is to occur but is not complete yet. Upon completing replication, the time machine may again update the metadata entry to change the status to "success" or "complete" indicating that the snapshot was successfully replicated to the remote site. The process 1100 then ends at the operation 1125.

On the other hand, if at the operation 1140, the time machine receives no message from the remote site or receives an error message, at operation 1150, the time machine aborts (or at least postpones) the snapshot replication process. The time machine may update the metadata entry created at the operation 1130 and mark the status of the replication as "failed." If the time machine reties the replication later, the time machine may update the status of the replication. The process 1100 then ends at the operation 1125. Upon replication, the replicated snapshot may be stored within a PD on the remote site associated with the cluster C2.

Figure 12:
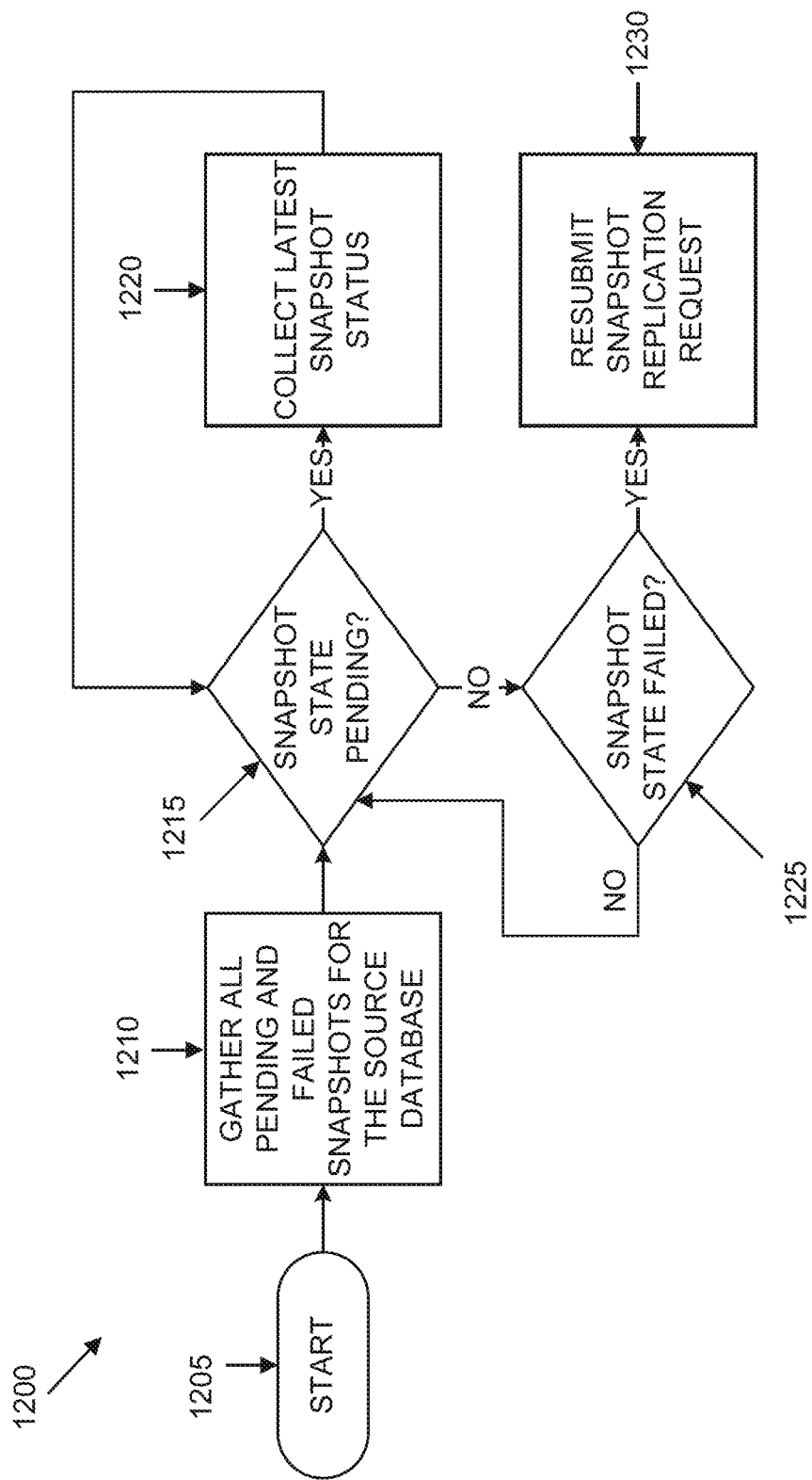
FIG. 12 is an example flowchart outlining operations for determining a status of snapshot replication to a remote site in the multi-cluster configuration of FIG. 4, in accordance with some embodiments of the present disclosure.

Referring now to FIG. 12, an example flowchart outlining operations of a process 1200 is shown, in accordance with some embodiments of the present disclosure. The process 1200 may use other or additional operations depending upon the particular embodiment. The process 1200 may be used to determine a status of replication of a snapshot being replicated from a source site (e.g., cluster C1) to a remote site (e.g., cluster C2). Although all the operations of the process 1200 have been described as being performed by the server 405 (e.g., the time machine of the source database), in some embodiments, at least some of the operations may be performed by the agent on the cluster C1 or the agent on the cluster C2.

As discussed in FIG. 11, a metadata entry is created at the operation 1130 for the snapshot being replicated to the remote site. The metadata entry may be updated at the operations 1145 or 1150 to update a status of replication (e.g., pending, failed, etc.). Thus, the metadata entry may be used to track the status of replication of the snapshot, thereby maintaining consistency of operation. In some embodiments, malfunctions during replication of the snapshot may prevent the replication from the source site to the remote site from being completed. For example, during replication, if either the source site or the remote site goes down, the replication may remain uncompleted. In some cases, network issues (e.g., bandwidth, etc.) may prevent the snapshot from being replicated. In such cases, tracking the status of replication may be beneficial insofar as additional actions may be taken to either retry the replication, monitor the replication, or abort the replication.

Thus, upon starting at operation 1205, the server 405 reviews the metadata entries for the source database at operation 1210. In some embodiments, the server 405 may review the metadata entries periodically. By reviewing the metadata entries, the server 405 may identify all metadata entries that have a status of replication of either pending or failed. Specifically, if a snapshot successfully replicated from the source site to the remote site, the replication process is complete and no further replication action is needed. However, if a snapshot is still being replicated or the replication has failed, additional action may need to be taken. Thus, at the operation 1210, the server 405 identifies all the snapshots being replicated having a status of pending or failed. The status may have been set at the operations 1145 and 1150.

For each snapshot that the server 405 identifies at the operation 1210, the server determines at operation 1215 whether the status of that snapshot is pending. If the status is pending, the process 1200 proceeds to operation 1220 where the server 405 determines the current status of the replication of that snapshot. In some embodiments, the server 405 may determine the current status of the replication of the snapshot by invoking an API that provides various details about the snapshot being replicated, including the current status of replication. In other embodiments, the server 405 may use other mechanisms to determine the current status of replication of the snapshot. If the server 405 determines that the snapshot is still being replicated, the server keeps the status of replication as pending and continues to monitor the snapshot replication. The process 1200 then loops back to the operation 1215 to evaluate the next snapshot having the status of replication as pending or failed. At the operation 1215, if the snapshot being evaluated does not have a status of pending, then the process 1200 proceeds to operation 1225 where the server 405 determines if the snapshot has a status of failed. If the snapshot does not have a status of failed, the process 1200 loops back to the operation 1215. Otherwise, at operation 1230, the server 405 retries replicating the snapshot to the remote site. To retry replication, the server 405 may repeat the operations 1135 to 1150 and then loops back to the operation 1215.

Figure 13:
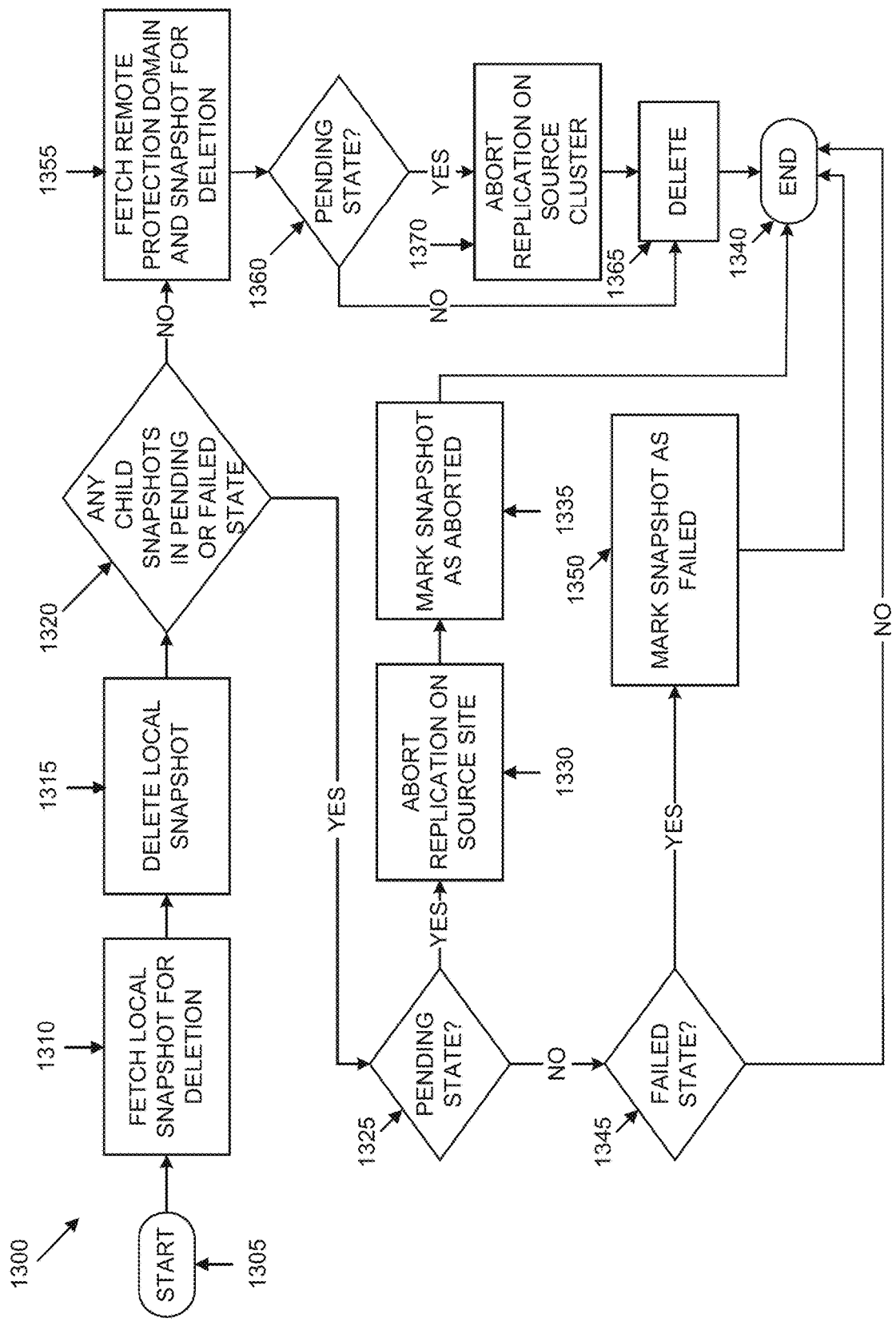
FIG. 13 is an example flowchart outlining operations for deleting snapshots in the multi-cluster configuration of FIG. 4, in accordance with some embodiments of the present disclosure.

Turning to FIG. 13, an example flowchart outlining operations of a process 1300 is shown, in accordance with some embodiments of the present disclosure. The process 1300 may use other or additional operations depending upon the particular embodiment. The process 1300 may be used to delete a snapshot. Although all the operations of the process 1300 have been described as being performed by the server 405 (e.g., the time machine of the source database), in some embodiments, at least some of the operations may be performed by the agent on the source site (e.g., cluster C1) or the agent on the remote site (e.g., cluster C2).

Upon starting at operation 1305, the server 405 (e.g., the time machine of a source database) identifies a snapshot to be deleted on the source site. For example, say the source database is located on cluster C1 (e.g., source site) and snapshots of the source database are replicated to clusters C2 and C3 (remote sites). As discussed above, each of the clusters C1, C2, and C3 may be associated with an SLA (e.g., see the operation 835). In some embodiments, the SLA associated with the cluster C1 may be different than the SLA associated with the clusters C2 and/or C3. Similarly, the SLA of the cluster C2 may be different from the SLA of the cluster C3. Each SLA may define the retention policy of the snapshots. Thus, by reviewing the SLAs of each of the clusters C1, C2, and C3, the server 405 may determine which snapshots are to be deleted. At operation 1310, the server 405 identifies a snapshot on the cluster C1 to be deleted.

At operation 1315, the server 405 deletes the snapshot identified to be deleted at the operation 1310. Once a snapshot has been replicated to designated remote sites, the replicated snapshot may be considered a separate entity and detached from the snapshot on the source site. As a result, a snapshot may be deleted on the source site without impacting the replicated snapshots on the remote sites. At operation 1320, the server 405 determines if that snapshot was designated to be replicated to a remote site. For example, in some embodiments, the server 405 may review the metadata entry of the snapshot (e.g., the metadata entry created at the operation 1130) to determine if the status of replication is either pending or failed. If the status of replication is either pending or failed indicating the snapshot was designated to be replicated to a remote site (e.g., the clusters C2 and/or C3) but the replication did not complete, the process 1300 proceeds to operation 1325. At the operation 1325, if the status of replicating is pending, at operation 1330, the server 405 aborts the replication process (e.g., using an API designated for aborting) from the source site to the remote site(s) and updates the metadata entry at operation 1335 from pending to aborted. In some embodiments, the metadata entry corresponding to "aborted" snapshot may also be deleted. In some embodiments, an "aborted" status may be considered different from a "failed" status. A "failed" status may indicate that the replication of the snapshot failed (e.g., due to an error on the remote site, etc.), while an "aborted" status may indicate that a user initiated the replicated process and aborted the replication process before replication could complete. The process 1300 then ends at operation 1340.

If at the operation 1325, the status of replication is not pending, the process 1300 proceeds to operation 1345. At the operation 1345, the server 405 determines if the snapshot has a status of replication as failed. If yes, at operation 1350, the server 405 updates the metadata entry to mark the snapshot as failed and the process 1300 ends at the operation 1340. If the snapshot does not have a status of replication of failed at the operation 1345, no updates to the metadata entry are needed and the process 1300 ends at the operation 1335.

At the operation 1320, if the snapshot has a status of replication other than pending or failed, the process 1300 proceeds to operation 1355 where the server 405 identifies the PD on the remote site(s) associated with the snapshot being deleted at the operation 1310. At operation 1360, the server 405 determines if the snapshot(s) in the PD are in pending state of replication. If no, the snapshot(s) in the PD are deleted at operation 1365 and the process 1300 ends at the operation 1340. If the snapshot(s) in the PD are in a pending state of replication, at operation 1370, the replication on the source site (e.g., the cluster C1) is aborted and the snapshot(s) is(are) deleted at the operation 1365.

Figure 14:
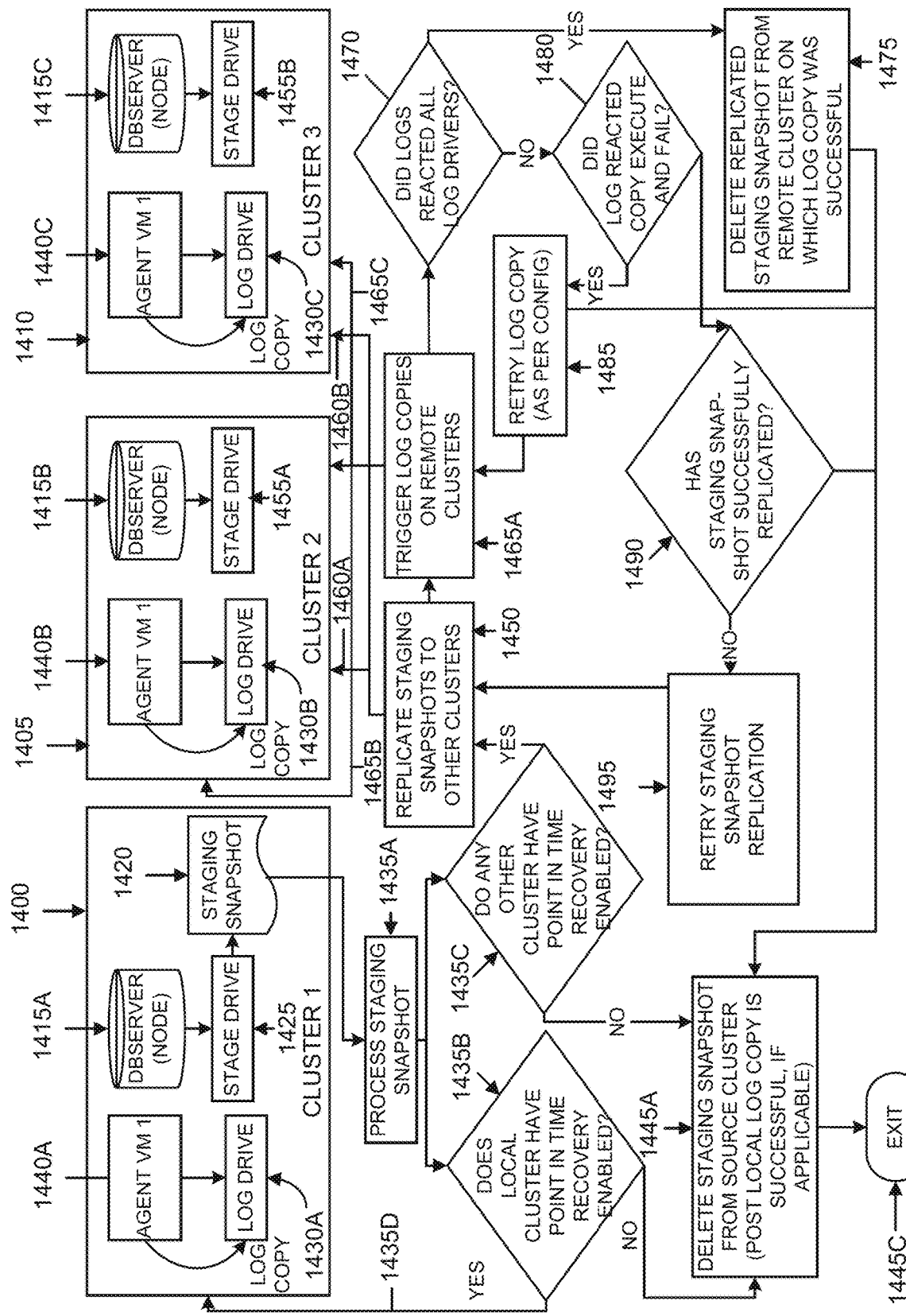
FIG. 14 is an example flowchart outlining operations for replicating transactional logs of a source database to a remote site in the multi-cluster configuration of FIG. 4, in accordance with some embodiments of the present disclosure.

As discussed above, in addition to snapshot, in some embodiments, transactional logs may also be replicated from a source site to a remote site. FIG. 14 describes the replication of transactional logs in greater detail. Thus, referring to FIG. 14, an example combined block diagram and flow diagram is shown, in accordance with some embodiments of the present disclosure. FIG. 14 shows a first cluster 1400, a second cluster 1405, and a third cluster 1410. In some embodiments, greater than or fewer than three clusters may be present. In some embodiments, the first cluster 1400 may be a source site. Further, in some embodiments, the second cluster 1405 and the third cluster 1410 may be remote sites. Thus, in some embodiments, a source database may be located on a node 1415A of the first cluster 1400. The source database may be replicated to each of the second cluster 1405 and the third cluster 1410, on nodes 1415B and 415C, respectively.

In some embodiments, transactional logs may be captured from the source database on the first cluster 1400. In some embodiments, the frequency and schedule of capturing the transactional logs may be defined by the SLA (e.g., the SLA 660C) associated with the source database. In some embodiments, transactional logs may be captured by capturing a staging snapshot 1420. In some embodiments, based upon the SLA (e.g., the SLA 660C), the server 405 may trigger a log catch up operation and send that operation to the node 1415A. Drivers associated with the node 1415A may collect transactional logs from the source database and store those transactional logs in a stage drive 1425. The drivers may also cause a snapshot to be captured from the stage drive 1425. This snapshot may be the staging snapshot 1420. In some embodiments, the staging snapshot 1420 may be desired to be stored in a log drive 1430A on the first cluster 1400. Thus, in some embodiments, the stage drive 1425 may be considered a temporary storage location for the transactional logs and the log drive 1430A may be considered a final storage destination for those transactional logs. The staging snapshot 1420 may also be replicated to a log drive 1430B on the second cluster 1405 and/or a log drive 1430C on the third cluster 1410. The drivers may also send the staging snapshot 1420 to the server 405.

To store the staging snapshot 1420 in the log drives 1430A-1430C, the server 405 processes the staging snapshot at operation 1435A. For example, in some embodiments and similar to snapshots being replicated, the server 405 may maintain metadata for the transactional logs being replicated to a remote site. At the operation 1435A, the server 405 may create (or update) an entry for the staging snapshot 1420. At operation 1435B, the server 405 determines whether the staging snapshot 1420 is to be stored on the first cluster 1400 and at operation 1435C the server determines whether the staging snapshot is to be replicated to other clusters (e.g., the second cluster 1405 and/or the third cluster 1410). For example, in some embodiments, the server 405 may determine whether the source database has a point in time recovery enabled on the first cluster 1400. In some embodiments, the server 405 may determine whether the source database has a point in time recovery enabled by reviewing the SLA (e.g., the SLA 660C) associated with the source database on the first cluster 1400. For example, if the SLA for the first cluster 1400 defines a continuous protection for 30 days and the day on which the associated transactional logs are captured correspond to a day when continuous protection is desired, the server 405 may determine that the source database has a point in time recovery enabled on the first cluster 1400. Thus, if the server determines that the point in time recovery is enabled on the first cluster 1400, the server 405 dispatches a log copy operation, at operation 1435D, to an agent 1440A on the first cluster. In some embodiments, the server 405 may also send the staging snapshot 1420 to the agent 1440A. In other embodiments, the server 405 may let the agent 1440A know the location of the stage drive 1425 from where the agent may retrieve the staging snapshot 1420. Upon receiving the log copy operation, the agent 1440A stores the staging snapshot 1420 within the log drive 1430A.

If at the operation 1435B, the server 405 determines that no point in time recovery is enabled on the first cluster (and therefore the transactional logs are not to be stored on the first cluster), at operation 1445A the server deletes the staging snapshot 1420 from the stage drive 1425. In some embodiments, the server 405 may wait until the staging snapshot 1420 has been replicated to all the clusters where it needs to be replicated before deleting.

Similarly, at the operation 1435C, the server 405 determines if the staging snapshot 1420 also needs to be copied to other clusters (e.g., the second cluster 1405 and/or the third cluster 1410). In some embodiments, the server 405 may determine whether the staging snapshot is to be replicated to a cluster by reviewing the SLA defined for that cluster (e.g., the SLA defined at the operation 835). If the staging snapshot 1420 is not to be replicated to any other cluster, the server 405 deletes the staging snapshot from the stage drive 1425 at the operation 1445A and the process ends at operation 1445C. Otherwise, at operation 1450, the server 405 dispatches an operation to each cluster to copy the staging snapshot 1420 to that cluster.

In some embodiments, the server 405 may send a replication operation to the agent on the cluster to which the staging snapshot 1420 is to be replicated. For example, to replicate the staging snapshot 1420 to the second cluster 1405 and the third cluster 1410, the server 405 stores the staging snapshot in a stage drive 1455A on the second cluster and on a stage drive 1455B on the third cluster, as shown at 1460A and 1460B, respectively. Upon completing the replication, at operation 1465A, the server 405 triggers a log copy operation to an agent 1440B on the second cluster 1405 and to an agent 1440C on the third cluster 1410, as indicated at 1465B and 1465C, respectively. The agent 1440B may store the staging snapshot 1420 from the stage drive 1455A to the log drive 1430B. Similarly, the agent 1440C may store the staging snapshot 1420 from the stage drive 1455B to the log drive 1430C.

At operation 1470, the server 405 determines if the log copy operation on all the clusters succeed. In other words, the server 405 determines whether the staging snapshot 1420 was successfully replicated to the log drive 1430B of the second cluster 1405 and to the log drive 1430C of the third cluster 1410. In some embodiments, the server 405 may receive an acknowledgement from the agent 1440B and the agent 1440C indicating that the log copy operation was successful. In other embodiments, the server 405 may determine whether the log copy operation was successful in other ways. For each cluster on which the log copy operation was successful, the server 405 deletes the staging snapshot 1420 from the stage drive of that cluster at operation 1475. For example, if the log copy operation was successful on the second cluster 1405 but not the third cluster 1410, the server 405 may delete the staging snapshot 1420 from the stage drive 1455A but not from the stage drive 1455B. Upon deleting the staging snapshot 1420 from the stage drive 1455A, the staging snapshot may also be deleted from the stage drive 1425 (e.g., if no other cluster remains on which the log copy operation was not successful) and the process ends at the operation 1445C.

For each cluster where the log copy operation failed, the server 405 determines whether the log copy operation executed and failed at operation 1480. The log copy operation may fail for a variety of reasons. For example, in some embodiments, the log copy operation may fail if the remote location where the log copy operation is being performed is out of storage space. In other embodiments, the log copy operation may fail for other reasons. If the log copy operation fails, the server 405 re-tries the log copy operation on that cluster. For example, if the log copy operation fails at the third cluster 1410, the server 405 dispatches another log copy operation to the agent 1440B at operation 1485. In some embodiments, the server 405 may try a predetermined number of times to replicate the staging snapshot 1420 to the cluster (e.g., the third cluster 1410) where the log copy operation failed. To retry, the process loops back to the operation 1465A. If the log copy operation continues to fail after the predetermined number of tries, the server 405 may retry at a different time or indicate (e.g., to a user) that the replication of the staging snapshot on that cluster has failed.

On the other hand, if the replication was unsuccessful for other reasons (e.g., because the staging snapshot 1420 did not replicate to the stage drive on that cluster, etc.), at operation 1490, the server 405 determines whether the staging snapshot successfully replicated to the cluster (e.g., the third cluster 1410) where the log copy operation failed. If the replication of the staging snapshot 1420 was successful, the server 405 may determine that the replication of the staging snapshot to that cluster (e.g., the third cluster 1410) has failed (e.g., because the cluster was down, etc.). The server 405 may then delete the staging snapshot 1420 from the stage drive (e.g., the stage drive 1455B) of the failed cluster (e.g., the third cluster 1410) and/or from the stage drive 1425 of the first cluster 1400.

If the log copy operation failed because of an unsuccessful replication of the staging snapshot 1420 to the cluster (e.g., the third cluster 1410) where the log copy operation failed, at operation 1495, the server 405 re-tries to replicate the staging snapshot to that cluster by looping back to the operation 1450. In some embodiments, the server 405 may re-try a predetermined number of times. If the replication is still not successful after the predetermined number of times, the server 405 may consider that the replication has failed and that the staging snapshot may not be replicated to that cluster.

Thus, FIG. 14 provides a mechanism where the transactional logs are captured on a single cluster and then replicated to the other clusters. This way, transactional logs need not be captured on each cluster where the source database is located. The replicated snapshots and transactional logs may be used for a variety of purposes.

As discussed above, in some embodiments, snapshots and/or transactional logs may be captured from a source database and those snapshots and/or transactional logs may be replicated to one or more remote sites. These replicated snapshots and/or transactional logs may be used to create backups or clones of the source database. In some embodiments, these backups or clones of the source database may be used for purposes that are different from the purpose for which the source database is used. For example, in some embodiments, the backups or clones of the source database may be used for testing, validating, application development, auditing, archiving, etc. In some embodiments and depending upon the purpose for which the backups or clones of the source database are used, not all information from the source database may be needed on the backups or clones of the source database. For example, in some embodiments, sensitive information such as social security number, salary information, health information, etc. may not be needed and may be desired to be redacted or omitted from the backups or clones of the source database.

In other embodiments, customers may need to abide by various state and federal regulations and policies that mandate that certain sensitive information not leave particular geographic boundaries. In such cases, depending upon the location of the remote sites, certain information may need to be redacted or omitted. As discussed above, in some embodiments, snapshots and/or transactional logs may be replicated across datacenters. For example, a customer may have a datacenter in US and another one in Germany. A source database located in the US datacenter may be desired to be replicated to the German datacenter to create backups or clones of the source database for access in Germany. In such cases, before the snapshots and transactional logs may be replicated from the US datacenter to the German datacenter, certain types of information may need to be removed.

To provide the ability to remove information from a snapshot before replication to a remote site (whether in the same datacenter as the source site or in a different datacenter), the present disclosure provides a sanitization policy and a Data Access Management ("DAM") policy. The sanitization policy and the DAM policy may be set by a customer and implemented by the server 405 (and particularly by the time machine associated with a particular source database). Using the sanitization policy and the DAM policy, the customer may indicate which snapshots and/or transactional logs to be replicated to the remote site, for how long to maintain the snapshots and/or transactional logs on the remote site, whether the snapshots are to be sanitized before replication, and any other information that may be needed or considered desirable. Although the description below is for sanitization of snapshots, in some embodiments, transactional logs may also be sanitized similar to snapshots. In some embodiments, the DAM policy may be used to provide the SLA for the remote site at the operation 835. Some aspects (e.g., related to selecting snapshots and/or transactional logs to replicate, duration for which the snapshots and/or transactional logs are to be maintained on the remote site, etc.) of the DAM policy are described above. Sanitizing of the snapshots is described below.

Sanitized snapshots provide data masking capabilities. As discussed above, in some embodiments, a user may desire to remove certain data from the snapshots before replicating to a remote site. In such cases, sanitization may be used to remove that data. In some embodiments, the customer may use the DAM policy to indicate whether the snapshots selected for replication are to be sanitized before replication. The sanitization policy may indicate what data is to be removed during the sanitizing. In some embodiments, snapshots that have been sanitized may be called masked or sanitized snapshots. In some embodiments, sanitization may be performed by applying a user selected masking script to the snapshots. The masking script may indicate what data in the snapshots has to be sanitized. In some embodiments, the masking script may be associated with the sanitization policy.

In some embodiments, the same masking script may be applied to all the snapshots that are being replicated from a particular source database. In yet other embodiments, different masking scripts may be applied to certain ones of the snapshots. For example, in some embodiments, if two snapshots captured on Monday and Friday are to be replicated, in some embodiments, a first masking script may be applied to the Monday snapshot before replication and a second masking script may be applied to the Friday snapshot before replication. In other embodiments, the server 405 may receive inputs from the user indicating which data is to be sanitized and create a masking script therefrom.

Further, in some embodiments, to create a masked snapshot, a snapshot from the source database may be captured and a copy of that captured snapshot may be taken. The masking script may be run on the copy of the snapshot to create the masked snapshot. In some embodiments, three approaches may be used to create sanitized snapshots.

In one approach, a default masking script may be configured against a time machine of a source database. In some embodiments, the time machine may be expanded to include a DAM policy. The DAM policy may provide an option for capturing a sanitized snapshot in addition to, or instead of, a regular snapshot. For example, in the DAM policy, a user may select a weekly snapshot to be sanitized. Then, when the time machine captures a weekly snapshot, the time machine may determine whether a DAM policy is associated with the time machine. If a DAM policy is associated, the time machine may determine whether the captured weekly snapshot is to be replicated, and if so, whether that snapshot is to be sanitized. If the time machine determines that the weekly snapshot is to be sanitized, the time machine may create an additional copy of that snapshot for sanitization. Thus, for the weekly snapshot, both a regular (e.g., non-sanitized) snapshot and a sanitized snapshot may exist. In some embodiments, the DAM policy may specify a retention period for retaining the sanitized snapshots on the remote site(s). Upon determining that the weekly snapshot is to be sanitized, the time machine may apply the sanitization policy (e.g., the masking script) to that snapshot to obtain a sanitized snapshot. Thus, in some embodiments, sanitized snapshots may be automatically created based upon the DAM policy and the sanitization policy as snapshots are captured.

Another approach may be to sanitize existing snapshots. For example, if the user desires to sanitize an existing snapshot that was previously captured by the time machine, the user may manually select that snapshot for sanitization. The user may apply the sanitization policy (e.g., the masking script) on the selected snapshot. Thus, in some embodiments, sanitization may be manual. Yet another approach may be to sanitize at snapshot creation time. In some embodiments, the time machine may be configured to automatically capture snapshots based upon the SLA and the protection schedule. In other embodiments, a user may desire to capture a manual snapshot. When capturing a manual snapshot, in some embodiments, the user may desire to sanitize that snapshot based on a masking script.

Thus, in some embodiments, snapshots may be sanitized automatically (e.g., at the time of capturing the snapshots) or manually (e.g., to sanitize a previously captured snapshot, sanitize a manually captured snapshot, etc.). Further, in some embodiments, snapshots (e.g., regular, non-sanitized snapshots) may be stored in a different PD than sanitized snapshots, as shown in FIG. 15 below.

Figure 15:
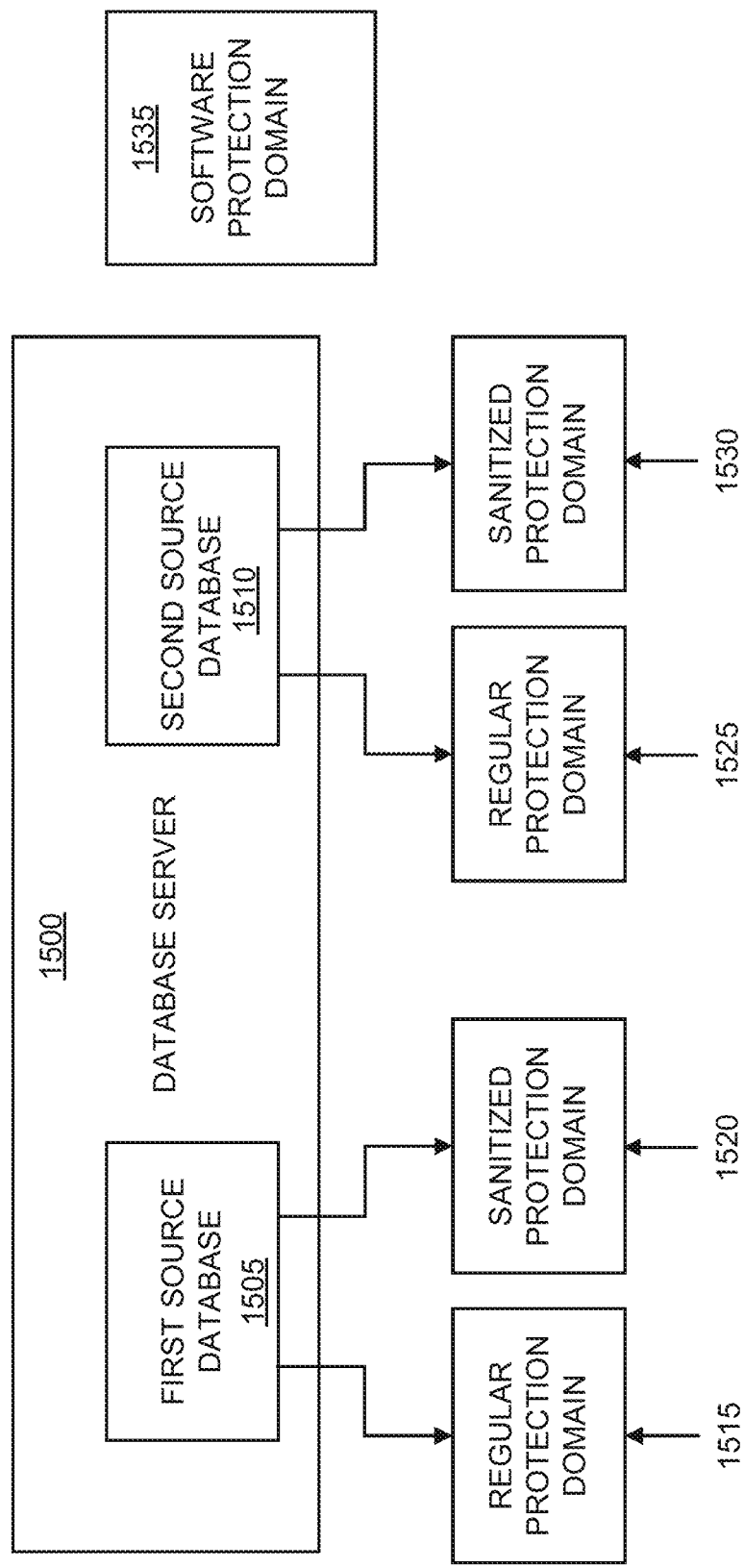
FIG. 15 is an example block diagram showing protection domains for storing sanitized snapshots of a source database in the multi-cluster configuration of FIG. 4, in accordance with some embodiments of the present disclosure.

Thus, referring to FIG. 15, an example block diagram showing how sanitized snapshots are stored is shown, in accordance with some embodiments of the present disclosure. FIG. 15 shows a database server 1500 on which a first source database 1505 and a second source database 1510 are located. The database server 1500 may be a database virtual machine. Although only two source databases are shown on the database server 1500, in other embodiments, greater than or fewer than two source databases may be present on the database server. In some embodiments, a sanitization policy may be in place for each of the first source database 1505 and the second source database 1510. In some embodiments, separate protection domains (PDs) may be configured for each of the first source database 1505 and the second source database 1510 for storing regular (e.g., non-sanitized) and sanitized snapshots.

For example, in some embodiments, the first source database 1505 may include a first regular PD 1515 for storing regular snapshots and a first sanitized PD 1520 for storing sanitized snapshots. Similarly, the second source database 1510 may include a second regular PD 1525 for storing regular snapshots and a second sanitized PD 1530 for storing sanitized snapshots. Each of the first regular PD 1515, the first sanitized PD 1520, the second regular PD 1525, and the second sanitized PD 1530 may be configured to store data associated with the first source database 1505 and the second source database 1510. In some embodiments, the first regular PD 1515 and the second regular PD 1525 may be considered "static" PDs because the data (e.g., disks) within those PDs does not change once the snapshots are captured and stored therein. On the other hand, the first sanitized PD 1520 and the second sanitized PD 1530 may be considered "dynamic" PDs because the data stored within those PDs may change.

In other words, to create a sanitized snapshot, say from the first source database 1505, a regular snapshot (non-sanitized) of the data disks of the first source database may be captured. This snapshot may be stored within the first regular PD 1515. To create a sanitized snapshot, the data disks of the first source database 1505 may be cloned. In some embodiments, a clone of the first source database 1505 may be created from the regular snapshot captured from the first source database. In some embodiments, data disks associated with the cloned first source database may be temporarily stored within the first sanitized PD 1520. The data that needs to be masked (e.g., by running a masking script) may be masked in the data disks associated with the cloned first source database. Upon removing the data to be masked to get sanitized data disks, a snapshot of the sanitized data disks may be taken and stored within the first sanitized PD 1520. The snapshot of the sanitized data disks may be a sanitized snapshot. Further, upon storing the sanitized snapshot, the cloned first source database and the data disks temporarily stored within the first sanitized PD 1520 may be deleted. A sanitized transactional log may be created in the same way.

Further, in some embodiments, the database server 1500 may be associated with a software PD 1535. The software PD 1535 may be shared by all the source databases on the database server 1500. The software PD 1535 may be configured to store software (e.g., operating system, etc.) related snapshots that are common to and shared by all the source databases on that database server.

Figure 16:
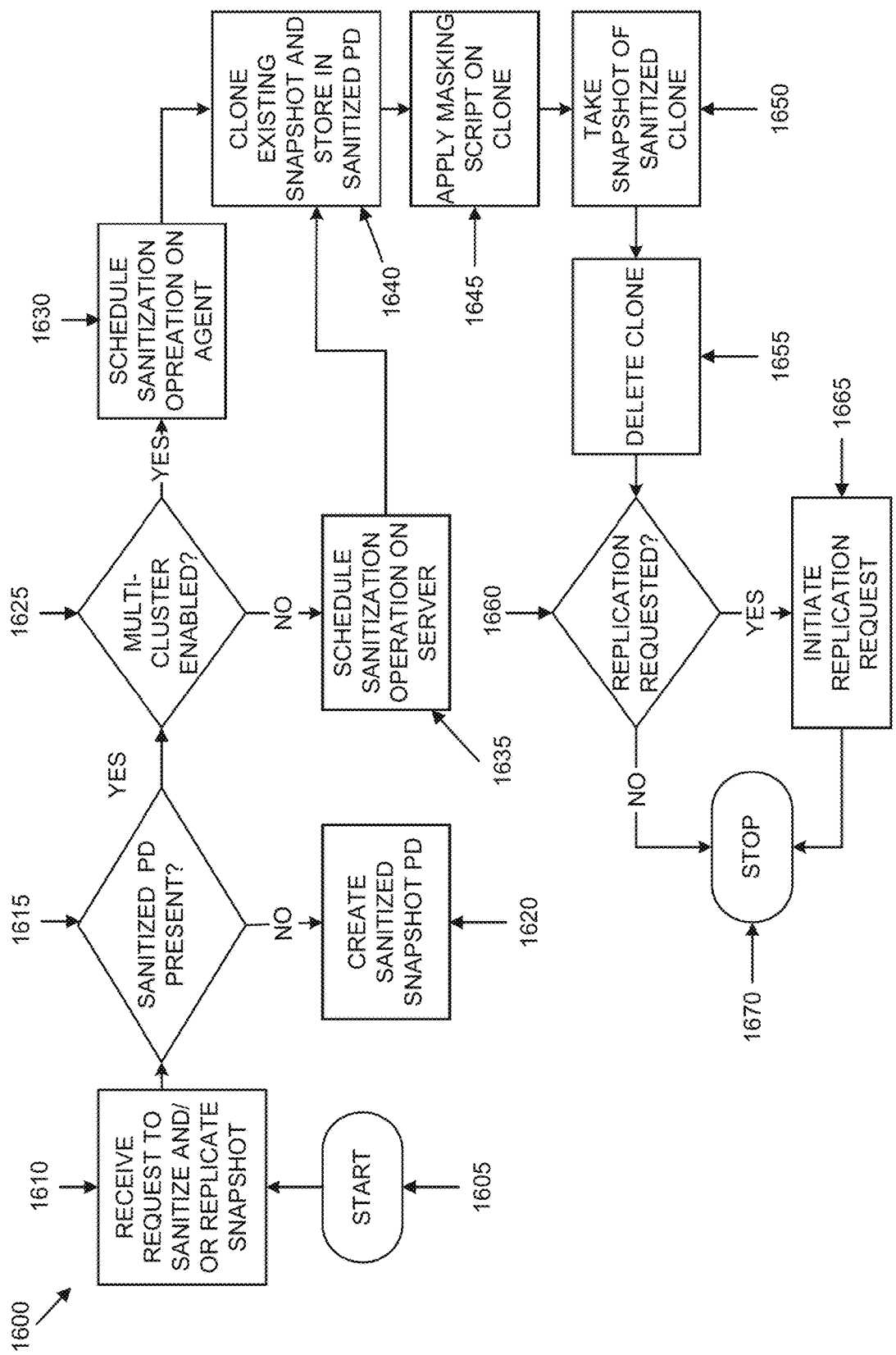
FIG. 16 is an example flowchart outlining operations for creating sanitized snapshots of a source database before replicating to a remote site in the multi-cluster configuration of FIG. 4, in accordance with some embodiments of the present disclosure.

Turning now to FIG. 16, an example flowchart outlining operations of a process 1600 is shown, in accordance with some embodiments of the present disclosure. The process 1600 may include other or additional operations depending upon the particular embodiment. The process 1600 may be performed by the server 405 and/or one or more of the agents. The process 1600 may be used to create sanitized snapshots. Thus, upon starting at operation 1605, the server 405 receives a request (e.g., an automatic or manual request) for a sanitized snapshot at operation 610. In some embodiments, the request may be an API request to the server 405. In some embodiments, the request may also include a request to replicate the sanitized snapshot to a remote site. In other embodiments, the request for creating the sanitized snapshot and the request for replicating the sanitized snapshot may be separate requests. In some embodiments, the request for the sanitized snapshot may also identify the snapshot to be sanitized, the identity of the source database from which the snapshot is captured, the sanitization policy, the DAM policy, and/or any other details that may be needed or considered desirable to have.

Upon receiving the request at the operation 1610, the server 405 determines if a sanitized PD exists for the source database associated with the snapshot that is to be sanitized at operation 1615. If the server 405 determines that the source database does not have a sanitized PD, at operation 1620, the server creates a sanitized PD for the source database. In some embodiments, to create the sanitized PD, the server 405 may send an operation to the agent located on the cluster on which the source database is located. The agent may then create a sanitized PD for the source database. In some embodiments, the sanitized PD may be created in a similar manner as a regular PD, for example, by invoking an API designated to create PDs. If, at the operation 1615, the server 405 determines that the source database already has a sanitized PD or upon creating the sanitized PD at the operation 1620, at operation 1625, the server 405 determines if a multi-cluster configuration is enabled. In other words, the server 405 may determine if the cluster on which the source database is hosted is registered with the server and whether an agent exists on that cluster.

If the server 405 determines that the multi-cluster configuration is enabled (e.g., the cluster on which the source database is located is registered with the server), at operation 1630, the server creates an operation (e.g., a "sanitize snapshot operation") for the agent on the cluster on which the regular snapshot is stored. In some embodiments, the regular snapshot may be stored on the same cluster as the cluster on which the source database is hosted. In other embodiments, the regular snapshot may be stored on another cluster than the cluster on which the source database is hosted. If, at the operation 1625, the server 405 determines that the multi-cluster configuration is not enabled, at operation 1635, the server may schedule an operation to handle the sanitization itself.

Operation 1640 may be performed by the server 405 (e.g., if multi-cluster configuration is not enabled) or by the agent (e.g., if multi-cluster configuration is enabled). At the operation 1640, the server or the agent creates a clone of the source database from the snapshot to be sanitized and stores the clone in the sanitized PD created at the operation 1620 or the sanitized PD identified at the operation 1615. In some embodiments, the request of the operation 1610 may identify the snapshot to be sanitized. On the clone of the source database, the server 405 or the agent applies the masking script at operation 1645. Upon applying the masking script, the data disks associated with the clone of the source database may be considered sanitized data disks with the data being masked removed. At operation 1650, the server 405 or the agent captures a snapshot from the sanitized data disks and at operation 1655, the server or the agent deletes the clone of the source database that was created at the operation 1640.

At operation 1660, the server 405 or the agent determines if the sanitized snapshot is to be replicated to a remote site. For example, in some embodiments, if a DMA policy exists for replicating the sanitized snapshot to a remote site, the server 405 or the agent may determine that the sanitized snapshot is to be replicated to the remote site. If so, at operation 1665, the server 405 or the agent initiate the replication operation and the process 1600 ends at operation 1670.

Figure 17:
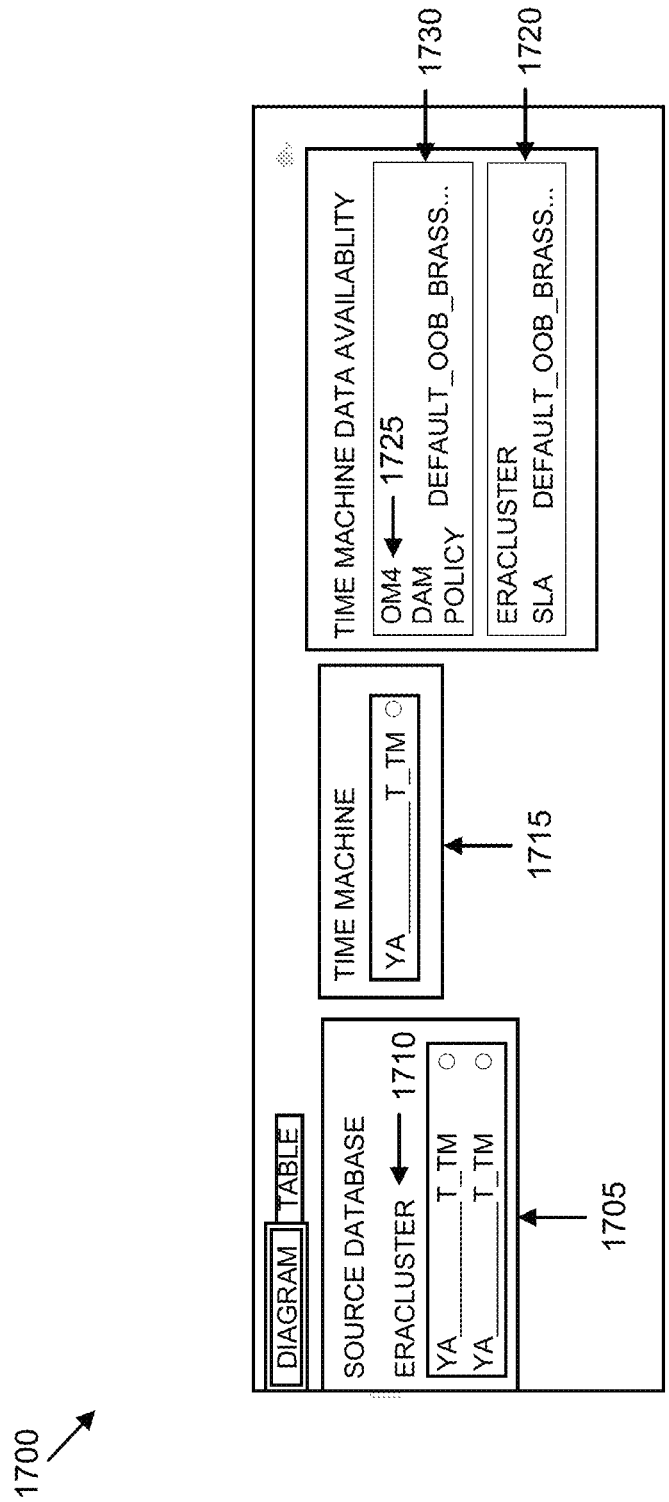
FIGS. 17-19 show example user interfaces of a data access management policy associated with a source database in the multi-cluster configuration of FIG. 4, in accordance with some embodiments of the present disclosure.

Turning to FIG. 17, an example user interface 1700 is shown, in accordance with some embodiments of the present disclosure. The user interface 1700 shows a source database 1705 that is located on a cluster 1710. The source database 1705 may be associated with a time machine 1715. As discussed above, the time machine 1715 may be created at the time of provisioning the source database 1705 on the cluster 1710. As also discussed above, the time machine 1715 may be associated with an SLA 1720 (e.g., SLA 660C) that defines capturing of snapshots and/or transactional logs from the source database 1705 on the cluster 1710. In addition, in some embodiments, at least some of the captured snapshots and/or transactional logs may be desired to be replicated to a remote site 1725. In such cases, a DAM policy 1730 may be associated with the time machine 1715 to replicate at least some of the snapshots and/or transactional logs from the cluster 1710 to the remote site 1725. In some embodiments, the DAM policy 1730 may be configured at the time of creating the time machine 1715. In other embodiments, the DAM policy 1730 may be added after the creation of the time machine 1715. In some embodiments, a different DAM policy may be configured for each remote site to which the snapshots and/or transactional logs may be desired to be replicated. In some embodiments, the DAM policy 1730 may include an SLA that defines which snapshots and/or transactional logs to replicate to the remote site 1725, the duration for which those replicated snapshots and/or transactional logs are to be maintained on the remote site, and/or whether those snapshots and/or transactional logs are to be sanitized before replication.

Figure 18:
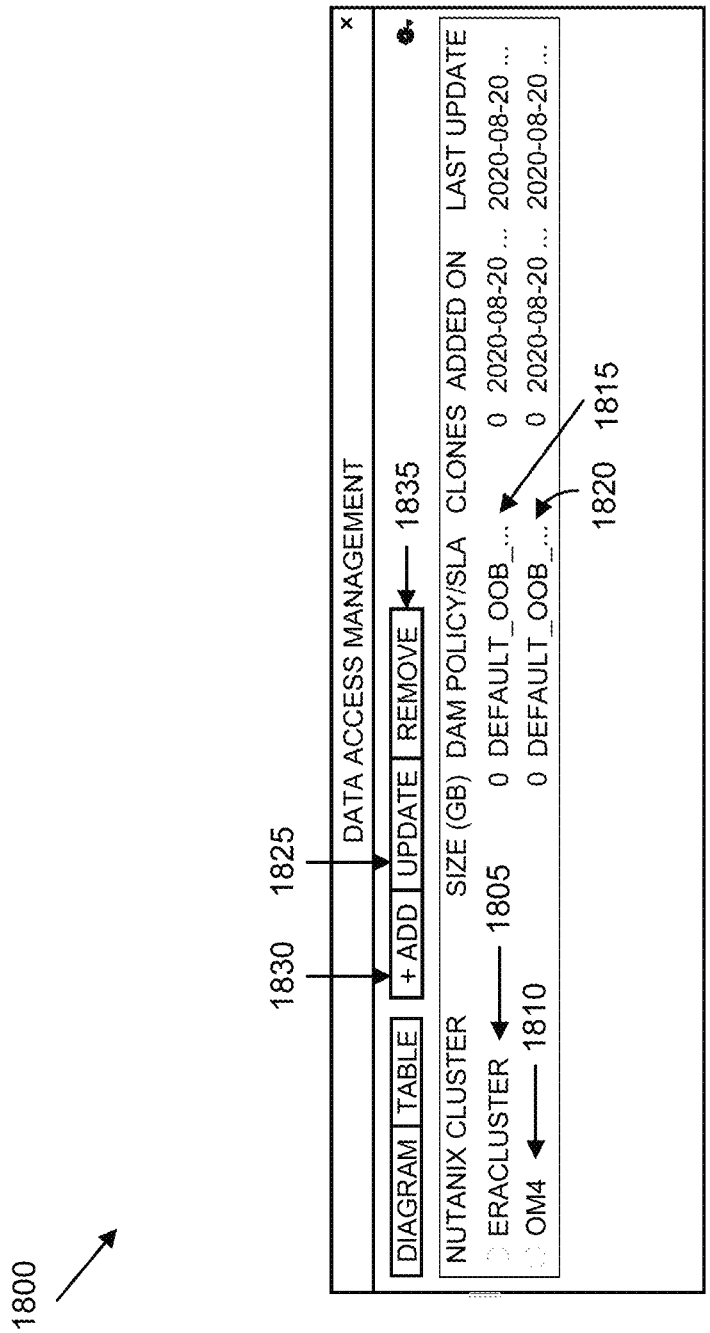

Turning to FIG. 18, an example user interface 1800 is shown in accordance with some embodiments of the present disclosure. The user interface 1800 may be associated with a source cluster. Thus, the user interface 1800 shows a first remote site 1805 and a second remote site 1810 to which snapshots and/or transactional logs from the source site on which the source database is located may be replicated. The first remote site 1805 may be associated with a first DAM policy 1815 and the second remote site 1810 may be associated with a second DAM policy 1820. Thus, each remote site may be associated with its own DAM policy. To update either the first DAM policy 1815 or the second DAM policy 1820, an update button 1825 may be used. By updating a DAM policy, the remote site to which the snapshots and/or transactional logs are replicated may be changed. In some embodiments, the snapshots and/or transactional logs that are to be replicated may also be changed. Further, in some embodiments, the duration for which the replicated snapshots and/or transactional logs are maintained on the remote site and/or whether those snapshots and/or transactional logs are to be sanitized may be varied as well.

Similarly, to add a new DAM policy, an add button 1830 may be used, and to delete and existing DAM policy, a remove button 1835 may be used.

Figure 19:
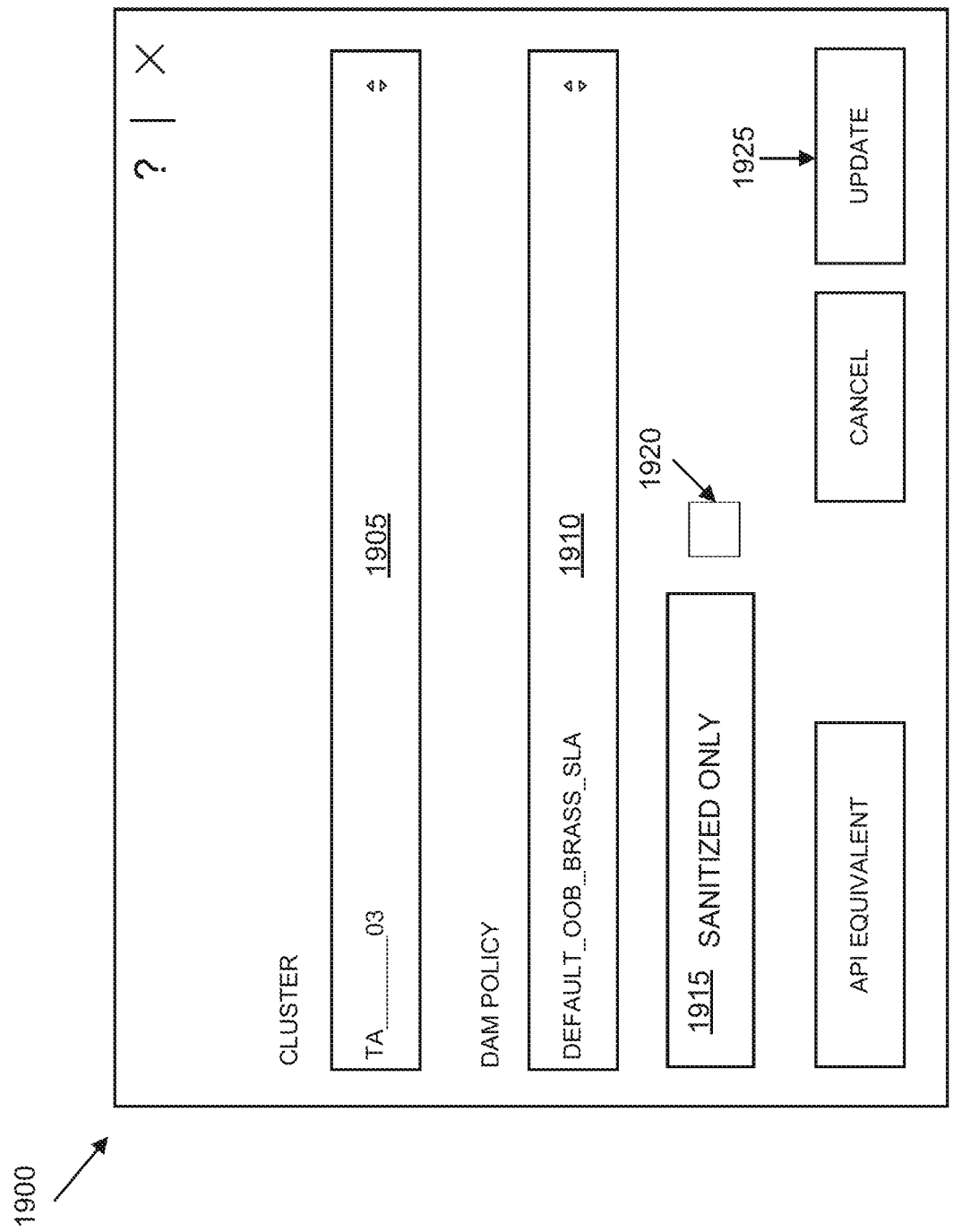

Referring to FIG. 19, an example user interface 1900 is shown, in accordance with some embodiments of the present disclosure. The user interface 1900 may be used to add a new DAM policy. The user interface 1900 may be reached by clicking on the add button 1830. Through the user interface 1900, a user may select a remote site 1905 to replicate snapshots and/or transactional logs to from the source database. In addition, a user may select a DAM policy 1910. In some embodiments, various levels of DAM policy may be pre-defined similar to the SLA 660C. In some embodiments, these pre-defined levels of the DAM policy may be available to the user to select from. In other embodiments, the user may be able to set a customized DAM policy and/or modify one of the pre-defined levels of the DAM policy.

The user interface 1900 may also indicate whether the snapshots are to be sanitized before replication. For example, the DAM policy being added by the user interface 1900 may provide a sanitization option 1915 to indicate whether the snapshots are to be sanitized before replication or not. For example, box 1920 may be unchecked to indicate no sanitization and that box may be checked to indicate that the snapshots have to be sanitized before replication. To apply the DAM policy 1910 to the remote site 1905, the user may click on an add button 1925.

The user interface to update an existing DAM policy may be similar to the user interface 1900. Thus, in some embodiments, the user may click on the update button 1825 to open a user interface similar to the user interface 1900. In the user interface to update an existing DAM policy, the user may change the remote site (e.g., the remote site 1905) to which the snapshots and/or transactional logs are replicated and/or change the DAM policy (e.g., the DAM policy 1910). Instead of the add button 1925 of the user interface 1900, the user interface to update the DAM policy may have an update button. Although not shown, in some embodiments, the user interface 1900 may have an option to select whether to sanitize snapshots and/or transactional logs.

Figure 20:
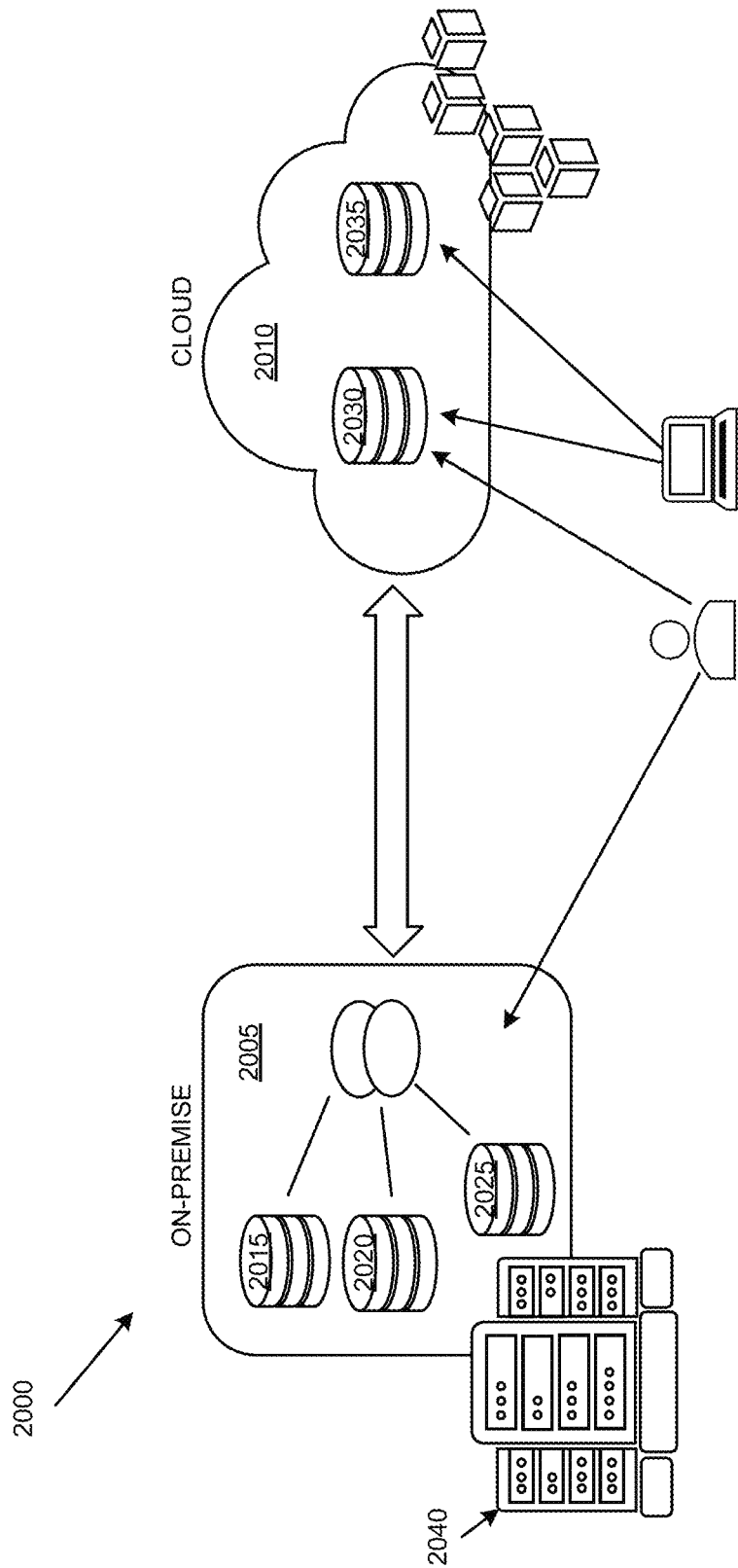
FIG. 20 is an example block diagram showing a hybrid cloud approach of the multi-cluster configuration of FIG. 4, in accordance with some embodiments of the present disclosure.

Turning now to FIG. 20, an example block diagram showing a multi-cluster approach of a database system 2000 is shown, in accordance with some embodiments of the present disclosure. Although not shown, the database system 2000 is intended to include the elements discussed above in FIG. 2. As also discussed above, in some embodiments, the database system 2000 may be configured to manage databases spread across multiple clusters (e.g., similar to the cluster 100). In some embodiments, the multiple clusters may be spread across one or more datacenters (e.g., as discussed in FIG. 3 above). Further, in some embodiments, the databases may be located on a cloud. For example and as shown in FIG. 20, the database system 2000 may include an on-premise environment 2005 and a cloud environment 2010. In an "on-premise" environment, resources (e.g., databases) may be deployed locally (e.g., in-house) on an enterprise's computers and servers, and be managed internally. The on-premise environment (e.g., the on-premise environment 2005) and the cloud environment (e.g., the cloud environment 2010) may each include one or more datacenters and one or more clusters in each datacenter (e.g., the configuration of FIG. 3). In a cloud environment, resources (e.g., databases) may be hosted by a service provider and may be accessed via a network (e.g., the internet) using, for example, a web-based browser. In some embodiments, the service provider may be associated with the enterprise of the on-premise environment 2005. In other words, in some embodiments, the cloud environment 2010 may be managed by the enterprise managing the on-premise environment 2005. In some embodiments, the cloud environment 2010 may be managed by a third-party site provider. The cloud environment 2010, may thus, a public cloud (e.g., Amazon Web Services, Microsoft Azure, Google Cloud, etc.), a private cloud (e.g., cloud managed by a particular enterprise for their own use), or a hybrid cloud (e.g., a combination of public and private clouds).

Databases that are provisioned in the database system 2000 may be located on the on-premise environment 2005, the cloud environment 2010, or both. For example, a database 2015 is shown as being located only on the on-premise environment 2005. Thus, the database 2015 does not reside on the cloud environment 2010 and may not be accessed from the cloud environment. The database 2015 may be located on one or more nodes of one or more clusters on the on-premise environment 2005, but all of those nodes/clusters may be associated with the on-premise environment 2005. On the other hand, database 2020 and database 2025 may be located on both the on-premise environment 2005, as well as on the cloud environment 2010. For example, the database 2020 may reside as database 2030 on the cloud environment 2010, while the database 2025 may reside as database 2035 on the cloud environment. In other words, the database 2030 may be a copy of the database 2020 and the database 2035 may be a copy of the database 2025. More specifically, the database 2020 may be provisioned as a two-node database, with one node being located on the on-premise environment 2005 and the other node being located on the cloud environment 2010. The database 2020 may then be located on the node in the on-premise environment 2005 and the database 2030 may be located on the node in the cloud environment 2010. The database 2025 and the database 2035 may be similarly configured. By virtue of being located on both the on-premise environment 2005 and the cloud environment 2010, the database 2020 and the database 2025 may be accessed from both the on-premise environment 2005 and from the cloud environment 2010.

By virtue of being located on multiple environments (e.g., the on-premise environment 2005 and the cloud environment 2010), the database system 2000 provides high availability. In some embodiments, the databases on the cloud environment 2010 may be structured using the cluster 100 and the multi-cluster configuration described above. If either the on-premise environment 2005 or the cloud environment 2010 goes down, the databases that are on both may be accessed from the other location that may still be operational. Thus, the database system 2000 may be considered an Always On Availability Group (AAG).

For an AAG cluster to operate, in some embodiments, a witness disk may need to be provisioned. The witness disk may be a storage volume that may be accessed by all the database nodes associated with a source database—whether those nodes are on the on-premise environment 2005 or the cloud environment 2010. In some embodiments, the witness disk may be hosted on a cluster that is not part of the source database and that witness disk may be accessible by the on-premise environment 2005 and the cloud environment 2010. In some embodiments, the cluster on which the witness disk is hosted may be located on the on-premise environment 2005 but separate from the cluster on which the source database is located. In other embodiments, the witness disk may be located on the cloud environment 2010, but separate from the cluster on which the source database is located. In some embodiments, the witness disk may be hosted on a cluster designated as a primary cluster (e.g., the first cluster to be provisioned for a source database). In some embodiments, the witness disk may be stored at a highly available location to ensure that the witness disk is always available. In some embodiments, the cluster that is selected for the witness disk may be a cluster that is registered with the server 405.

Further, the databases 2015-2035 may be managed by a database management system 2040. The database management system 2040 is similar to the database management system 345 and 205, and therefore, not described again. Thus, one instance of the database management system 2040 may be configured to manage databases spread across not just multiple cluster and multiple datacenters, but also across the on-premise environment 2005 and the cloud environment 2010. However, certain aspects of managing databases located on the on-premise environment 2005 and the cloud environment 2010 may be different.

For example, in some embodiments, different networking paradigms may be used in the on-premise environment 2005 and the cloud environment 2010. To ensure proper management of the databases 2015-2035 that are spread across the on-premise environment 2005 and the cloud environment 2010, the database management system 2040 needs to be able to handle the different networking paradigms. Alternatively, in some embodiments, different instances of the database management system 2040 may be installed on the on-premise environment 2005 and the cloud environment 2010 such that the instance of the database management system on the on-premise environment manages the databases located on the on-premise environment and the instance of the database management system located on the cloud environment manages the databases located on the cloud environment. However, such different instances may require increased maintenance, increased complexity in managing and protecting databases, expensive, and therefore, overall undesirable.

To allow the single instance of the database management system 2040 to manage databases spread across all datacenters and across the on-premise environment 2005 and the cloud environment 2010, the network paradigms may be modified. One network paradigm that is used when databases are provisioned across multiple nodes, multiple clusters, multiple datacenters, on-premise environment, or cloud environment includes a static Internet Protocol ("IP") address. In some embodiments, each virtual machine, node, cluster, device, etc. in a datacenter in the on-premise environment 2005 and the cloud environment 2010 may be associated with an IP address that identifies the virtual machine, node, cluster, device, etc. in the datacenter. In some embodiments, the datacenter itself, as well as the on-premise environment 2005 and the cloud environment 2010 may be associated with a static IP address. When a database is provisioned, users specific a network profile for the databases. The network profile may include the static IP address and may identify the network location of the virtual machine on which the database being provisioned resides to facilitate access to the database after provisioning. In some embodiments, a network profile may need to be provided for each location (e.g., each virtual machine) where the database is to reside. For example, if a database is being provisioned as a two-node database, with one node being on a node in the on-premise environment 2005 and another database being on another node in the cloud environment 2010, two network profiles—one for the virtual machine in the on-premise environment and one for the virtual machine in the cloud environment—may be provided. With static IP addressing, the IP assignment is under the user's control. In other words, the suer can specify the IP address of the database virtual machines.

Another networking paradigm includes a dynamic network address or Dynamic Host Configuration Protocol ("DHCP"). With DHCP, a user does not have control over the IPs that get assigned to the database virtual machines. The IP addresses get assigned from a specific network/VLAN, but the exact IP address is out of the user's control. Some types of the cloud environment 2010 (e.g., AWS) only use DHCP, making it difficult for users to control IP addressing of their databases. To provide the ability to users to control IP addressing on the cloud environment 2010, the database management system 2040 provides a mechanism where a DHCP network may be used for static IP addressing. Specifically, the database management system 2040 reserves a block of IPs from the DHCP network. This block of IPs is then managed by the database management system 2040 and may be used for static IP needs by users for creating database virtual machines. The unreserved IPs may be managed or assigned via DHCP. Thus, in essence, the same network has now been carved up to be partly used as a DHCP network and partly as a static network.

Additionally, the database management system 2040 uses a concept called clustered network profile for managing the network locations of databases that are spread across multiple nodes, clusters, datacenters, etc. As mentioned above, different locations have different network addresses. For instance, if a user creates a 3 node Postgres database cluster, those 3 nodes may be spread across different clusters of the on-premise environment 2005 and/or the cloud environment 2010 and may have different network IP addresses. As the number of database nodes or clusters go up, it becomes cumbersome for users to keep track of which network is applicable on which cluster. To simply network managing for users, the database management system 2040 implements a clustered network profile. As discussed above, a network profile allows a user to create a template for a particular database engine using a particular network. This template/profile may be used repeatedly during provisioning or cloning and without needing to provide network information repeatedly. The clustered network profile may now be used to store multiple network profiles for multiple clusters/clouds.

As an example, a clustered network profile for a 3-cluster system may look be configured as follows:
Name: pg-multicloud-network
Properties:
{
  [
    {
      "cluster": "c1",
      "network": "n1"
    },
    {
      "cluster": "c2",
    "network": "n2"
    },
    {
      "cluster": "c3",
      "network": "n3"
    }
  ]
}

In the definition of the clustered network profile above, the three clusters, c1, c2, and c3 are identified where a database is to reside, and the network profile, n1, n2, and n3, is specified for each of the clusters, respectively. Once the clustered network profile is created, a user may provide the clustered network profile (e.g., pg-multicloud-network) during provisioning instead of providing network details for each cluster separately, thereby simplifying the network addressing of databases spread across multiple locations.

Figure 21:
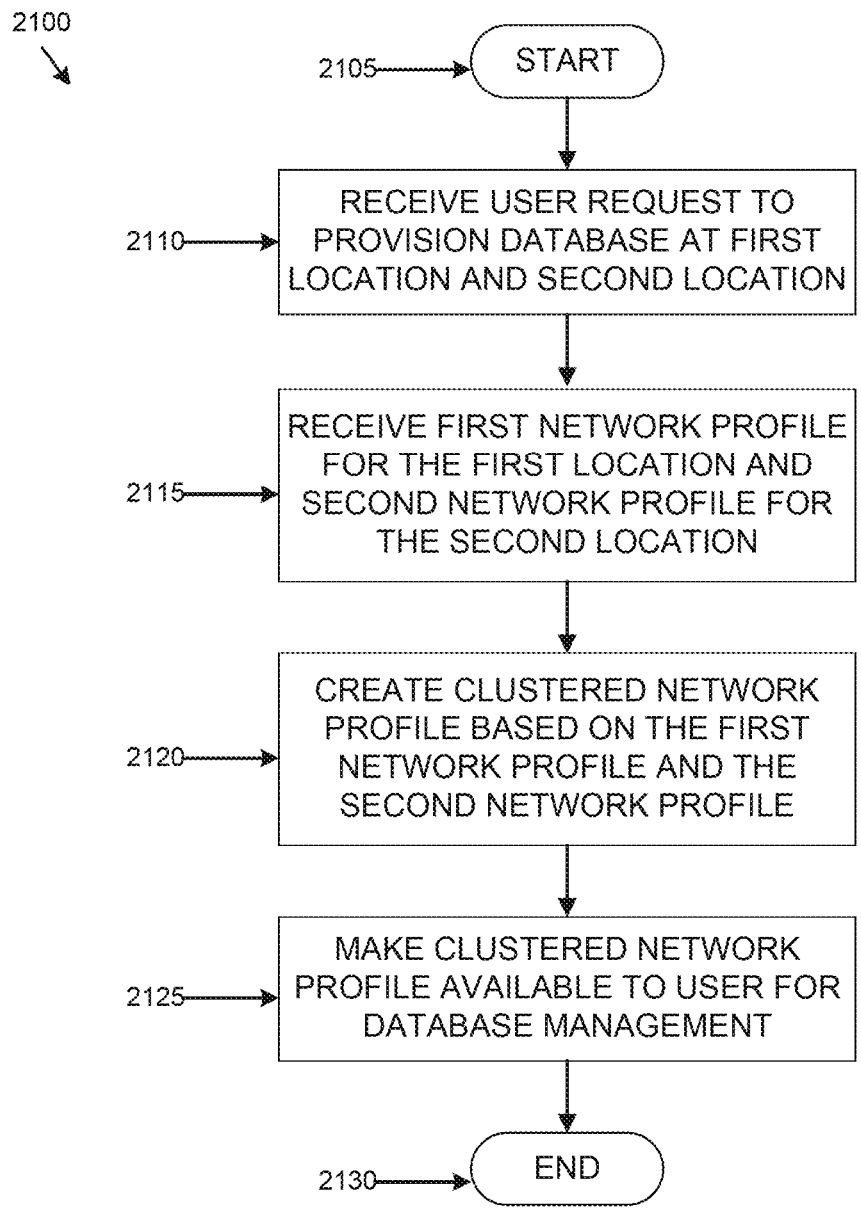
FIG. 21 is an example flowchart outlining operations of a process for creating a clustered network profile for using in the hybrid cloud approach of FIG. 20, is shown in accordance with some embodiments of the present disclosure.

Referring to FIG. 21, an example flowchart outlining operations of a process 2100 for creating a clustered network profile is shown, in accordance with some embodiments of the present disclosure. Upon starting at operation 2105, the database management system 2040 receives a request to provision a database across multiple locations at operation 2110. For example, the database management system 2040 may receive a request to provision a 2-node database with one node being in the on-premise environment 2005 and the other node being in the cloud environment 2010. At operation 2115, the database management system 2040 receives from the user a first network profile identifying the first location and a second network profile identifying the second location. At operation 2120, the database management system 2040 creates a clustered network profile from the first network profile and the second network profile, as explained above. In some embodiments, the database management system 2040 may assign a name to the clustered network profile, and at operation 2125, the database management system makes the clustered network profile available to the user. The user may then use the clustered network profile to manage the databases in the first location and the second location, thereby avoiding the need for the user to remember the first network profile and the second network profile. The process 2100 ends at operation 2130.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a memory having computer-readable instructions thereon; and
a processor of a server executing the computer-readable instructions to:
capture one or more transactional logs from a source database stored on a first cluster of a plurality of clusters;
determine which of the one or more transactional logs to replicate from the first cluster to a second cluster of the plurality of clusters; and
replicate, to the second cluster, the one or more transactional logs to be replicated to the second cluster, wherein to replicate the one or more transactional logs to the second cluster, the processor further executes computer-readable instructions to:
store the one or more transactional logs into a stage drive on the first cluster;
capture a staging snapshot of the stage drive on the first cluster;
replicate the staging snapshot from the stage drive on the first cluster to a stage drive on the second cluster; and
move the staging snapshot from the stage drive on the second cluster to a log drive on the second cluster.

2. The system of claim 1, wherein the first cluster and the second cluster are part of a same datacenter.

3. The system of claim 1, wherein the first cluster and the second cluster are part of different datacenters.

4. The system of claim 1, wherein the first cluster is part of an on-premise environment and the second cluster is part of a cloud environment.

5. The system of claim 1, wherein the one or more transactional logs to replicate from the first cluster to the second cluster are determined based on a policy, and wherein to define the policy, the processor further executes computer-readable instructions to:
receive a first user selection of the second cluster;
receive a second user selection of a data access management policy to define a duration for which the one or more transactional logs being replicated to the second cluster are to be retained on the second cluster; and
apply the data access management policy to the second cluster.

6. The system of claim 1, wherein the processor further executes computer-readable instructions to:
capture one or more snapshots from the source database;
determine which of the one or more snapshots to replicate from the first cluster to the second cluster; and
replicate the one or more snapshots to be replicated to the second cluster.

7. The system of claim 6, wherein the processor further executes computer-readable instructions to apply a sanitization policy to the one or more snapshots to be replicated, wherein the sanitization policy is created based on a masking script, and wherein the masking script is received as a user selection in response to an indication that the one or more snapshots to be replicated are to be sanitized before replication.

8. The system of claim 7, wherein to apply the sanitization policy, the processor further executes computer-readable instructions to:
create a clone of the one or more snapshots to be replicated;
apply the masking script to the clone;
capture one or more sanitized snapshots from the clone; and
delete the clone upon capture of the one or more sanitized snapshots.

9. The system of claim 1, wherein the one or more transactional logs are captured from the source database based on a policy that comprises a Service Level Agreement defining a protection level for protecting the source database and a protection schedule for defining a frequency of capturing the one or more transactional logs.

10. The system of claim 1, wherein each of the plurality of clusters comprises an agent that performs operations on a respective one of the plurality of clusters on which the agent is located under control of the server.

11. The system of claim 1, wherein the processor further executes computer-readable instructions to:
capture one or more snapshots from the source database stored on the first cluster; and
replicate the one or more snapshots to the second cluster by:
creating a metadata entry on the first cluster for a replicated snapshot for each of the one or more snapshots;
sending the one or more snapshots to the second cluster; and
updating the metadata entry upon receiving an indication from the second cluster that the one or more snapshots are successfully replicated to the second cluster.

12. A method comprising:
capturing, by a processor of a server executing computer-readable instructions, one or more transactional logs from a source database stored on a first cluster of a plurality of clusters;
determining, by the processor, which of the one or more transactional logs to replicate from the first cluster to a second cluster of the plurality of clusters; and
replicating, by the processor, the one or more transactional logs to be replicated to the second cluster by:
storing, by the processor, the one or more transactional logs into a stage drive on the first cluster;
capturing, by the processor, a staging snapshot of the stage drive on the first cluster;
replicating, by the processor, the staging snapshot from the stage drive on the first cluster to a stage drive on the second cluster; and
moving, by the processor, the staging snapshot from the stage drive on the second cluster to a log drive on the second cluster.

13. The method of claim 12, wherein the one or more transactional logs to replicate from the first cluster to the second cluster are determined based on a policy, and wherein to define the policy, the method further comprises:
receiving, by the processor, a first user selection of the second cluster;
receiving, by the processor, a second user selection of a data access management policy for defining a duration for which the one or more transactional logs being replicated to the second cluster are to be retained on the second cluster; and
applying, by the processor, the data access management policy to the second cluster.

14. The method of claim 12, further comprising:
capturing, by the processor, one or more snapshots from the source database stored on the first cluster; and
replicating, by the processor, the one or more snapshots to the second cluster by:
creating, by the processor, a metadata entry on the first cluster for a replicated snapshot for each of the one or more snapshots;

sending, by the processor, the one or more snapshots to the second cluster; and updating, by the processor, the metadata entry upon receiving an indication from the second cluster that the one or more snapshots are successfully replicated to the second cluster.

15. The method of claim 12, wherein the first cluster and the second cluster are part of a same datacenter.

16. The method of claim 12, wherein the first cluster and the second cluster are part of different datacenters.

17. The method of claim 12, wherein the first cluster is part of an on-premise environment and the second cluster is part of a cloud environment.

18. The method of claim 12, further comprising:
capturing, by the processor, one or more snapshots from the source database;
determining, by the processor, which of the one or more snapshots to replicate from the first cluster to the second cluster; and
replicating, by the processor, the one or more snapshots to be replicated to the second cluster.

19. The method of claim 18, further comprising applying, by the processor, a sanitization policy to the one or more snapshots to be replicated, wherein the sanitization policy is created based on a masking script, and wherein the masking script is received as a user selection in response to an indication that the one or more snapshots to be replicated are to be sanitized before replication.

20. The method of claim 19, wherein to apply the sanitization policy to the one or more snapshots, the method further comprises:
creating, by the processor, a clone of the one or more snapshots identified in the first user selection;
applying, by the processor, the masking script to the clone;
capturing, by the processor, one or more sanitized snapshots from the clone; and
deleting, by the processor, the clone upon capturing the one or more sanitized snapshots.

21. The method of claim 12, wherein the one or more transactional logs are captured from the source database based on a policy that comprises a Service Level Agreement defining a protection level for protecting the source database and a protection schedule for defining a frequency of capturing the one or more transactional logs.

22. The method of claim 12, wherein each of the plurality of clusters comprises an agent that performs operations on a respective one of the plurality of clusters on which the agent is located under control of the server.

23. A non-transitory computer readable media comprising computer-readable instructions stored thereon that when executed by a processor of a server causes the processor to:
capture one or more transactional logs from a source database stored on a first cluster of a plurality of clusters;
determine which of the one or more transactional logs to replicate from the first cluster to a second cluster of the plurality of clusters; and
replicate, to the second cluster, the one or more transactional logs to be replicated to the second cluster, wherein to replicate the one or more transactional logs to the second cluster, the processor further executes computer-readable instructions to:
store the one or more transactional logs into a stage drive on the first cluster;
capture a staging snapshot of the stage drive on the first cluster;
replicate the staging snapshot from the stage drive on the first cluster to a stage drive on the second cluster; and
move the staging snapshot from the stage drive on the second cluster to a log drive on the second cluster.

24. The non-transitory computer readable media of claim 23, wherein the first cluster and the second cluster are part of a same datacenter.

25. The non-transitory computer readable media of claim 23, wherein the first cluster and the second cluster are part of different datacenters.

26. The non-transitory computer readable media of claim 23, wherein the first cluster is part of an on-premise environment and the second cluster is part of a cloud environment.

27. The non-transitory computer readable media of claim 23, wherein the one or more transactional logs to replicate from the first cluster to the second cluster are determined based on a policy; and wherein to define the policy, the processor further executes computer-readable instructions to:
receive a first user selection of the second cluster;
receive a second user selection of a data access management policy to define a duration for which the one or more transactional logs being replicated to the second cluster are to be retained on the second cluster; and
apply the data access management policy to the second cluster.

28. The non-transitory computer readable media of claim 23, wherein the processor further executes computer-readable instructions to:
capture one or more snapshots from the source database;
determine which of the one or more snapshots to replicate from the first cluster to the second cluster; and
replicate the one or more snapshots to be replicated to the second cluster.

29. The non-transitory computer-readable media of claim 28, wherein the processor further executes computer-readable instructions to apply a sanitization policy to the one or more snapshots to be replicated, wherein the sanitization policy is created based on a masking script, and wherein the masking script is received as a user selection in response to an indication that the one or more snapshots to be replicated are to be sanitized before replication.

30. The non-transitory computer-readable media of claim 29, wherein the processor further executes computer-readable instructions to
create a clone of the one or more snapshots to be replicated;
apply the masking script to the clone;
capture one or more sanitized snapshots from the clone; and
delete the clone upon capture of the one or more sanitized snapshots.

31. The non-transitory computer readable media of claim 23, wherein the one or more transactional logs are captured from the source database based on a policy that comprises a Service Level Agreement defining a protection level for protecting the source database and a protection schedule for defining a frequency of capturing the one or more transactional logs.

32. The non-transitory computer readable media of claim 23, wherein each of the plurality of clusters comprises an agent that performs operations on a respective one of the plurality of clusters on which the agent is located under control of the server.

33. The non-transitory computer-readable media of claim 23, wherein the processor further executes computer-readable instructions to:
- capture one or more snapshots from the source database stored on the first cluster; and
- replicate the one or more snapshots to the second cluster by:
- creating a metadata entry on the first cluster for a replicated snapshot for each of the one or more snapshots;
- sending the one or more snapshots to the second cluster; and
- updating the metadata entry upon receiving an indication from the second cluster that the one or more snapshots are successfully replicated to the second cluster.

\* \* \* \* \*